(12) United States Patent
Fett et al.

(10) Patent No.: US 12,441,679 B2
(45) Date of Patent: Oct. 14, 2025

(54) ACRYLAMIDE-SUBSTITUTED INDANE COMPOUNDS AND THERAPEUTIC USE THEREOF

(71) Applicant: Sanofi, Paris (FR)

(72) Inventors: Eykmar Fett, Paris (FR); Olivier Venier, Paris (FR)

(73) Assignee: Sanofi, Paris (FR)

( * ) Notice: Subject to any disclaimer, the term of this patent is extended or adjusted under 35 U.S.C. 154(b) by 479 days.

(21) Appl. No.: 18/018,459

(22) PCT Filed: Jul. 29, 2021

(86) PCT No.: PCT/EP2021/071237
§ 371 (c)(1),
(2) Date: Jan. 27, 2023

(87) PCT Pub. No.: WO2022/023460
PCT Pub. Date: Feb. 3, 2022

(65) Prior Publication Data
US 2023/0265047 A1  Aug. 24, 2023

(30) Foreign Application Priority Data
Jul. 30, 2020  (EP) ..................................... 20305876

(51) Int. Cl.
*C07C 233/09* (2006.01)
(52) U.S. Cl.
CPC ........ *C07C 233/09* (2013.01); *C07C 2602/08* (2017.05)
(58) Field of Classification Search
CPC .................................................. C07C 233/09
See application file for complete search history.

(56) References Cited

U.S. PATENT DOCUMENTS

2017/0044132 A1   2/2017   Hirayama et al.

FOREIGN PATENT DOCUMENTS

| CN | 108368104 A | 8/2018 |
|---|---|---|
| FR | 2319330 A1 | 2/1977 |
| WO | 2017064277 A1 | 4/2017 |
| WO | 2019232216 A1 | 12/2019 |
| WO | 2020076996 A1 | 4/2020 |

OTHER PUBLICATIONS

Berdan, Charles A., et al., "Parthenolide Covalently Targets and Inhibits Focal Adhesion Kinase in Breast Cancer Cells", Cell Chemical Biology, vol. 26, No. 7, May 9, 2019, pp. 1027-1035.
International Search Report for International Application No. PCT/EP2021/071237, mailed Oct. 1, 2021.

*Primary Examiner* — John S Kenyon
(74) *Attorney, Agent, or Firm* — McNeill PLLC

(57) ABSTRACT

The invention relates to indane compounds of formula (I): to their preparation and to their therapeutic use.

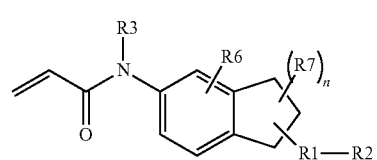

20 Claims, No Drawings

ACRYLAMIDE-SUBSTITUTED INDANE COMPOUNDS AND THERAPEUTIC USE THEREOF

CROSS-REFERENCE TO RELATED APPLICATIONS

This application is a national phase entry pursuant to 35 U.S.C. § 371 of International Application No. PCT/EP2021/071237, filed Jul. 29, 2021, which claims the benefit of priority to European Application No. 20305876.3, filed Jul. 30, 2020, the entire contents of each of which are incorporated by reference herein in their entirety for any purpose.

The present disclosure relates to indane compounds, to their preparation and to their therapeutic use.

The compounds described herein are inhibitors of YAP1/TAZ-TEAD or TEAD-dependent gene transcription.

TEAD Proteins and the HIPPO-YAP1/TAZ Signaling Cascade

Transcriptional enhanced associate domain (TEAD) proteins are transcription factors comprised of four family members (TEAD1-4) that function in modulating gene expression in response to the HIPPO pathway. TEAD proteins preferentially associate with transcription co-activators yes associated protein 1 (YAP1) or transcriptional co-activator with PDZ-binding motif (TAZ, also known as WWTR1). YAP1-TEAD or TAZ-TEAD bind to DNA and initiate the transcription of multiple different genes involved in cell proliferation, survival, mobility, stemness, and differentiation (reviewed in Holden and Cunningham, Cancer 2018). YAP1/TAZ-TEAD activity is tightly controlled by the HIPPO pathway.

The HIPPO pathway was initially discovered in *Drosophila melanogaster* as a key regulator of tissue growth. It is an evolutionarily conserved signaling pathway regulating numerous biological processes, including cell growth and fate decision, organ size control, and regeneration. The core of the Hippo pathway in mammals consists of a cascade of kinases including MST1/2 and LATS1/2, their associated adaptor proteins SAV1 and MOB1, as well as upstream regulators, such as NF2, SCRIBBLE, CRUMBS, and multiple G protein-coupled receptors. The Hippo pathway is tightly regulated by both intrinsic and extrinsic signals, such as mechanical force, cell-cell contact, polarity, energy status, stress, as well as many diffusible hormonal factors (reviewed in Ma et al., Annual Rev of Biochem 2019). Upon activation of Hippo pathway kinases (i.e. Hippo "on" state), cytosolic YAP1 and TAZ proteins are phosphorylated and therefore, remain inactive through sequestration in the cytoplasm and/or degradation by the proteasomal machinery. Upon inactivation of the Hippo pathway kinases (i.e. Hippo "off" state), cytosolic YAP1 and TAZ are not anymore phosphorylated and hence free to translocate into the cell nucleus, where they associate with TEAD transcription factors to bind DNA and regulate gene expression. Decreasing levels of pYAP1/YAP1 as well as increased expression of genes regulated by YAP1/TAZ-TEAD activity and increased promoter activity at TEAD-regulated genes are general indicators of YAP1 activation (reviewed in Totaro et al., Nature Cell Biol 2019).

The Hippo-YAP1/TAZ/TEAD Pathway and Human Cancer

In recent years, studies have demonstrated that the deregulation of Hippo-YAP1/TAZ-TEAD activity is at the origin of tumor progression and resistance to therapy in a number of different cancer indications and contexts. In mice, systematic genetic studies have clearly shown that either knocking out HIPPO pathway components (which are YAP1 inhibitors) or overexpressing YAP1 activators such as YAP1, TAZ, TEAD lead to YAP1 activation and YAP1-TEAD-dependent tumor initiation and tumor progression (Zhang et al, Dev Cell 2010; Lu et al, PNAS 2010; Nishio et al, PNAS 2015; Liu-Chittenden et al, Genes and Dev 2012). In humans, genetic alterations in the pathway are most prevalent for NF2 (neurofibromin), an upstream regulator of the core Hippo pathway, that has been linked to a heritable cancer syndrome and that has been classified as a tumor suppressor gene. Hundreds of somatically acquired mutations have been reported in NF2, predominantly in meningiomas, mesotheliomas and peripheral nerve sheath tumors, but also in other cancer types. (reviewed in Schroeder et al., Oncotarget 2013). Genetic alterations beyond NF2 and directly present within the core Hippo pathway are less frequently observed in patients and found at high prevalence only in certain indications such as, e.g. malignant mesothelioma. Malignant mesothelioma is a highly lethal cancer of serosal membranes and almost exclusively associated with asbestos exposure. It is a therapeutic indication that shows prevalent alterations in the HIPPO signaling pathway as well as high YAP1 activation and high dependence on YAP1-TEAD activity (reviewed in Sekido et al., Cancers 2018). Increased YAP1 or YAP1-TEAD activity is not limited to genetic alterations in the HIPPO pathway and can also be the result of upregulation through multiple interconnected signals. Numerous pathways with critical role in tumorigenesis feed into the HIPPO-YAP1/TAZ/TEAD1 cascade, well described examples include the RTK-RAS-RAF-MEK-ERK, WNT, TGF-beta, and AMPK pathways (reviewed in Han et al., J Transl Med 2019). The number of tumor types that depend at least in part on YAP1-TEAD activation is hence tremendous and spans from breast, ovarian, uterine, and prostate cancers to lung, gastric, colorectal, bladder, pancreatic, and liver cancers, and further to sarcomas, esophageal, head and neck cancers, uveal melanoma, and glioma (reviewed in Zanconato et al., Cancer Cell 2016). Recent studies reveal an interplay between the HIPPO-YAP/TAZ/TEAD pathway and the human immune response (reviewed in Yamauchi and Moroishi, Cells 2019).

YAP1 activation has been observed in the context of resistance to therapy and is recognized as a main mechanism of resistance and survival to anti-cancer treatment. In esophageal carcinoma, YAP1 is a positive regulator of EGFR (Epidermal Growth Factor Receptor) and the induction of YAP1 is associated with resistance to 5-FU and docetaxel. In the context of targeted therapies, YAP1 in BRAF-mutant tumors, acts as a parallel survival input to promote resistance to RAF and MEK inhibitor therapy in melanoma. Similarly, activation of YAP1 is a mechanism of survival to EGFR and MEK inhibitor treatment in the context of EGFR mutant lung cancer and multiple studies have identified YAP1 activation as one of the main bypass mechanisms to KRAS inhibition. In a hormone-dependent tumor context, TAZ inhibition was shown to restore sensitivity to tamoxifen in breast cancer. In prostate carcinoma cells, androgen deprivation therapy resistance was associated with increased YAP nuclear localization and activity (reviewed in Reggiani et al., 2020; Kurppa et al., Cancer Cell 2020).

Thus, the HIPPO-YAP/TAZ/TEAD pathway is a key player in cancer development and tumor maintenance and targeting this pathway is key for cancer treatment, both in a first line therapy setting as well as in the context of overcoming drug resistance with multiple cancer indications.

Therefore, there is a need for inhibitors of YAP1/TAZ-TEAD or TEAD-dependent gene transcription.

Disclosed herein are the compounds of the formula (I)

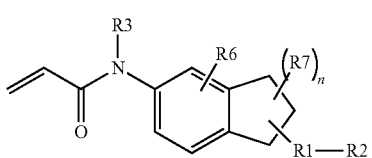

wherein
R1 is chosen from
  an oxygen atom, and
  a group —N(H)— or a group —N(R8)-,
    wherein R8 is a (C1-C4) alkyl group, in particular a methyl group;
R2 is chosen from:
  a phenyl group unsubstituted or substituted with one or more R4 groups;
  a benzyl group unsubstituted or substituted with one or more R5 groups;
  a (C4-C8) cycloalkyl group, in particular a cyclohexyl group or a cyclopentyl group and more particularly a cyclohexyl group, said (C4-C8) cycloalkyl group being unsubstituted or substituted with one or more R5 groups;
  a heteroaryl group, in particular a pyridinyl group, said heteroaryl group being unsubstituted or substituted with one or more R5 groups;
  a (C1-C6) alkyl group, in particular a (C1-C4) alkyl group, said (C1-C6) alkyl group being substituted with one or more fluorine atoms;
R4 is chosen from:
  a halogen atom, in particular a fluorine atom or a chlorine atom;
  a (C1-C4) alkyl group unsubstituted or substituted with one or more fluorine atoms, in particular a methyl group or a trifluoromethyl group;
  a (C1-C4) alkoxy group unsubstituted or substituted with one or more fluorine atoms, in particular a methoxy group or a trifluoromethoxy group;
  a C(O)—O—(C1-C4) alkyl group, in particular a C(O)—O-methyl group;
  a (C3-C6) cycloalkyl group; in particular cyclopropyl group;
  a (C1-C4) alkylthio group; in particular a methylthio group;
  a pentafluorosulfanyl group;
R5 is chosen from
  a halogen atom, in particular a fluorine atom; and
  a (C1-C4) alkyl group unsubstituted or substituted with one or more fluorine atoms, in particular a trifluoromethyl group;
R3 is chosen from
  a hydrogen atom, and
  a (C1-C4) alkyl group, in particular a methyl group;
R6 is chosen from a hydrogen atom and a halogen atom, in particular a fluorine atom;
R7 is independently chosen from:
  a halogen atom, in particular a fluorine atom;
  a (C1-C4) alkyl group, in particular a methyl group;
  a hydroxy group;
  a (C1-C4) alkoxy group, in particular a methoxy group;
n is 0, 1 or 2;
or a pharmaceutically acceptable salt thereof.

In a particular embodiment, disclosed herein are the compounds of the formula (I')

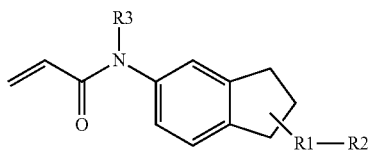

wherein
R1 is chosen from
  an oxygen atom, and
  a group —N(H)—;
R2 is chosen from:
  a phenyl group unsubstituted or substituted with one or more R4 groups;
  a benzyl group unsubstituted or substituted with one or more R5 groups;
  a (C4-C8) cycloalkyl group, in particular a cyclohexyl group, said (C4-C8) cycloalkyl group being unsubstituted or substituted with one or more R5 groups;
  a heteroaryl group, in particular a pyridinyl group, said heteroaryl group being unsubstituted or substituted with one or more R5 groups; and
  a (C1-C4) alkyl group substituted with one or more fluorine atoms;
R4 is chosen from:
  a halogen atom, in particular a fluorine atom;
  a (C1-C4) alkyl group unsubstituted or substituted with one or more fluorine atoms, in particular a methyl group or a trifluoromethyl group;
  a (C1-C4) alkoxy group unsubstituted or substituted with one or more fluorine atoms, in particular a methoxy group or a trifluoromethoxy group; and
  a C(O)—O—(C1-C3) alkyl group, in particular a C(O)—O-methyl group;
R5 is chosen from
  a halogen atom, in particular a fluorine atom; and
  a (C1-C4) alkyl group unsubstituted or substituted with one or more fluorine atoms, in particular a trifluoromethyl group;
R3 is chosen from
  a hydrogen atom, and
  a (C1-C4) alkyl group, in particular a methyl group;
or a pharmaceutically acceptable salt thereof.

The compounds of formula (I), in particular of formula (I'), may comprise one or more asymmetric carbon atoms. They may thus exist in the form of enantiomers or diastereoisomers and also mixtures thereof.

The compounds of formula (I), in particular of formula (I'), may be present as well under tautomer forms.

The compounds of formula (I), in particular of formula (I'), may exist in the form of bases or addition salts with acids or bases, in particular pharmaceutically acceptable salts.

Pharmaceutically acceptable salts of the compounds of formula (I), in particular of formula (I'), do form part of the invention.

As used herein, certain terms have the following definitions:
  a halogen atom: a fluorine, a chlorine, a bromine or an iodine atom;

an alkyl group: a linear or branched saturated aliphatic group. Examples include the groups methyl, ethyl, propyl, isopropyl, etc;

a cycloalkyl group: a cyclic alkyl group, including spiro groups. Examples include the groups cyclopropyl, cyclobutyl, cyclopentyl, cyclohexyl, spiro[2.3]hexanyl, etc.;

an alkenyl group: a linear or branched mono- or polyunsaturated aliphatic group containing, for example, one or two ethylenic unsaturations;

an alkoxy group: a radical —O-alkyl in which the alkyl group is as defined above. Examples of alkoxy group include methoxy, ethoxy, isopropoxy, etc.;

a heteroaryl group: a cyclic aromatic group containing between 4 and 9 carbon atoms and containing 1 or 2 heteroatoms, such as oxygen or nitrogen, more particularly nitrogen. Examples of a heteroaryl group include pyridinyl group;

an alkylcarboxy group: a radical C(O)—O-alkyl in which the alkyl group is as defined above. For example, a (C1-C3) alkylcarboxy group is a C(O)—O—(C1-C3) alkyl group. Examples of alkylcarboxy group include methylcarboxy, ethylcarboxy, etc.;

an alkylthio group: a radical —S-alkyl in which the alkyl group is as defined above. Examples of alkylthio group include methylthio group;

a benzyl group: a radical —CH$_2$-phenyl group;

Among the compounds of formula (I), mention may be made of the compounds for which R6 is a hydrogen atom.

Among the compounds of formula (I), mention may be made of the compounds for which n is 0.

Among the compounds of formula (I), mention may be made of the compounds for which R1 is an oxygen atom or a group —N(H)—.

In one aspect, the compounds of formula (I) comprise a first group of compounds in which the indane is substituted with the radical —R1-R2 in position 1 according to the IUPAC numbering, in other words compounds of the following formula (Ia):

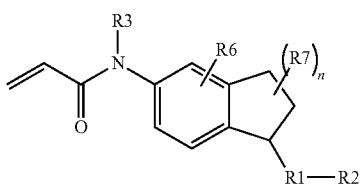

(Ia)

or a pharmaceutically acceptable salt thereof.

In particular, the compounds of formula (I') comprise a subgroup of compounds in which the indane is substituted with the radical —R1-R2 in position 1 according to the IUPAC numbering, in other words compounds of the following formula (I'a):

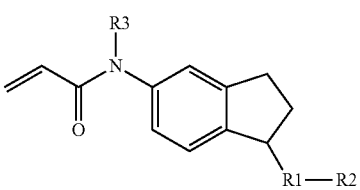

(I'a)

or a pharmaceutically acceptable salt thereof.

In another aspect, the compounds of formula (I) comprise a second group of compounds in which the indane is substituted with the radical —R1-R2 in position 3 according to the IUPAC numbering, in other words compounds of the following formula (Ib):

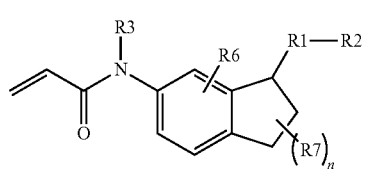

(Ib)

or a pharmaceutically acceptable salt thereof.

In particular, the compounds of formula (I') comprise a subgroup of compounds in which the indane is substituted with the radical —R1-R2 in position 3 according to the IUPAC numbering, in other words compounds of the following formula (I'b):

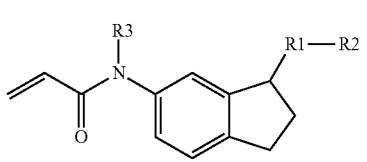

(I'b)

or a pharmaceutically acceptable salt thereof.

In another aspect, the compounds of formula (I) comprise a third group of compounds in which the indane is substituted with the radical —R1-R2 in position 2 according to the IUPAC numbering, in other words compounds of the following formula (Ic):

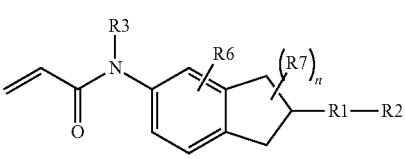

(Ic)

or a pharmaceutically acceptable salt thereof.

In particular, the compounds of formula (I') comprise a group of compounds in which the indane is substituted with the radical —R1-R2 in position 2 according to the IUPAC numbering, in other words compounds of the following formula (I'c):

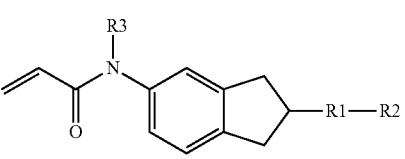

(I'c)

or a pharmaceutically acceptable salt thereof.

In another aspect, the compounds of formula (I), in particular of formula (I'), comprise a fourth group composed of the compounds in which R3 is a hydrogen atom.

In another aspect, the compounds of formula (I), in particular of formula (I'), comprise a fifth group composed of the compounds in which:
R1 is an oxygen atom and R2 is chosen from:
a phenyl group unsubstituted or substituted with one or more R4 groups;
a (C4-C8) cycloalkyl group, in particular a cyclohexyl group or a cyclopentyl group, said cycloalkyl group being unsubstituted or substituted with one or more R5 groups; and
a (C1-C5) alkyl group, in particular a (C1-C4) alkyl group, said alkyl group being substituted with one or more fluorine atom, especially a (C1-C4) alkyl group, in particular (C2-C3) alkyl group, substituted with CF3;
or R1 is —N(H)— and R2 is chosen from:
a phenyl group unsubstituted or substituted with one or more R4 groups; and
a heteroaryl group, in particular a pyridinyl group, said heteroaryl group being unsubstituted or substituted with one or more R5 groups.

Among the compounds of the fifth group, mention may be made of the compounds of formula (I), in particular of formula (I'), for which R2 is chosen from:
a phenyl group unsubstituted or substituted with one or more R4 groups;
a (C4-C8) cycloalkyl group, in particular a cyclohexyl group or a cyclopentyl group, said cycloalkyl group being substituted with one or more R5 groups, provided that R1 is an oxygen atom; and
a (C1-C5) alkyl group, in particular a (C1-C4) alkyl group, said alkyl group being substituted with one or more fluorine atom, especially a (C1-C4) alkyl group, in particular a (C2-C3) alkyl group, substituted with CF3, provided that R1 is an oxygen atom.

In an embodiment, among the compounds of the preceding groups, mention may be made of the compounds of formula (I), in particular of formula (I'), for which R2 is a phenyl group unsubstituted or substituted with one or more R4 groups.

In another embodiment, mention may be made of the compounds of formula (I), in particular of formula (I'), for which R2 is a phenyl group substituted with one or more R4 groups.

In another embodiment, mention may be made of the compounds of formula (I), in particular of formula (I'), for which
R1 is an oxygen atom, and
R2 is a (C4-C8) cycloalkyl group, in particular a cyclohexyl group or a cyclopentyl group, said cycloalkyl group being substituted with one or more R5 groups.

In another embodiment, mention may be made of the compounds of formula (I), in particular of formula (I'), for which
R1 is an oxygen atom, and
R2 is a (C1-C4) alkyl group, in particular a (C2-C3) alkyl group, substituted with CF3.

In still another embodiment, mention may be made of the compounds of formula (I), in particular of formula (I'), for which
R1 is a —N(H)— group, and
R2 is a pyridinyl group substituted with one or more R5 groups.

Among the compounds of the preceding groups, mention may be made of the compounds of formula (I), in particular of formula (I'), for which R4 is chosen from:

a halogen atom, in particular a fluorine atom or a chlorine atom, and more particularly a fluorine atom; and
a (C1-C4) alkyl group unsubstituted or substituted with one or more fluorine atoms, in particular a methyl group or a trifluoromethyl group.

In an embodiment, in the compounds of formula (I), in particular of formula (I'), R4 is chosen from a fluorine atom, a methyl group and a trifluoromethyl group.

In another embodiment, in the compounds of formula (I), in particular of formula (I'), R4 is chosen from a fluorine atom and a trifluoromethyl group.

In another embodiment, in the compounds of formula (I), in particular of formula (I'), the R4 group(s) is(are) in the meta and/or para position(s) of the R2 phenyl group.

Among the compounds of the preceding groups, mention may be made of the compounds of formula (I), in particular of formula (I'), for which R5 is chosen from a fluorine atom and a trifluoromethyl group.

In an embodiment, in the compounds of formula (I), in particular of formula (I'), the R5 group(s) is(are) in the para position(s) of the R2 group.

In another embodiment, in the compounds of formula (I), in particular of formula (I'), the R5 group(s) is(are) in the meta position(s) of the R2 group.

In another aspect, the compounds of formula (I), in particular of formula (I'), comprise a sixth group composed of the compounds of formula (I), in particular of formula (I'), for which:
R1 is —N(H)— and
R2 is a benzyl group unsubstituted or substituted with one or more R5 groups, in particular with a trifluoromethyl group.

Among the compounds of the sixth group, mention may be made of the compounds of formula (I), in particular of formula (I'), for which the R5 group(s) is(are) in the meta or para position of the R2 benzyl group.

Among the compounds of formula (I), mention may be made of the compounds for which n is 1, and R7 is chosen from:
a fluorine atom;
a (C1-C4) alkyl group, in particular a methyl group;
a hydroxy group;
a (C1-C4) alkoxy group, in particular a methoxy group.

Among the compounds of formula (I), mention may be made of the compounds for which n is 2, and R7 are both (C1-C4) alkyl groups, in particular methyl groups, wherein said alkyl groups, in particular methyl groups, are more particularly borne by the same carbon atom.

In another aspect, the compounds of formula (I) comprise a seventh group composed of the compounds of formula (I), for which:
R1 is chosen from an oxygen atom, a group —N(H)— and a group —N(CH3)—;
R2 is chosen from:
a phenyl group unsubstituted or substituted with one or more R4 groups;
a benzyl group unsubstituted or substituted with one or more trifluoromethyl groups; provided that R1 is —N(H)—;
a cyclohexyl group or a cyclopentyl group, in particular a cyclohexyl group, said cyclohexyl or cyclopentyl group being substituted with one or more R5 groups;
a pyridinyl group substituted with one or more R5 groups; and
a (C2-05) alkyl group substituted with one or more fluorine atoms, in particular a (C1-C4) alkyl group substituted with CF3;

R4 is chosen from a fluorine atom, a chlorine atom, a methyl group, a trifluoromethyl group, a methoxy group, a trifluoromethoxy group, a C(O)—O-methyl group, a cyclopropyl group, a methylthio group and a pentafluorosulfanyl group, R5 is chosen from a fluorine atom and a trifluoromethyl group;

R3 is chosen from a hydrogen atom and a methyl group;

R6 is chosen from a hydrogen atom and a fluorine atom;

R7 is independently chosen from:
- a fluorine atom;
- a methyl group;
- a hydroxy group;
- a methoxy group; and n is 0, 1 or 2, or a pharmaceutically acceptable salt thereof.

In another aspect, the compounds of formula (I') comprise a seventh group composed of the compounds of formula (I') for which:

R1 is chosen from an oxygen atom and a group —N(H)—;

R2 is chosen from:
- a phenyl group unsubstituted or substituted with one or more R4 groups;
- a benzyl group unsubstituted or substituted with one or more trifluoromethyl groups; provided that R1 is —N(H)—;
- a cyclohexyl group, substituted with one or more R5 groups;
- a pyridinyl group substituted with one or more R5 groups; and
- a (C3-C4) alkyl group substituted with one or more fluorine atoms, in particular a (C2-C3) alkyl group substituted with CF3;

R4 is chosen from a fluorine atom, a methyl group, a trifluoromethyl group, a methoxy group, a trifluoromethoxy group and a C(O)—O-methyl group.

R5 is chosen from a fluorine atom and a trifluoromethyl group; and

R3 is chosen from a hydrogen atom and a methyl group;

or a pharmaceutically acceptable salt thereof.

In another aspect, the compounds of formula (I), in particular of formula (I'), comprise a eighth group composed of the compounds of formula (I), in particular of formula (I'), with the exclusion of the following compounds:

N-(2-((4,4,4-trifluorobutyl)amino)-2,3-dihydro-1H-inden-5-yl)acrylamide;

N-(2-((3-fluoropropyl)amino)-2,3-dihydro-1H-inden-5-yl)acrylamide;

N-(2-(((cis)-4-(trifluoromethyl)cyclohexyl)amino)-2,3-dihydro-1H-inden-5-yl)acrylamide;

N-(2-(((trans)-4-(trifluoromethyl)cyclohexyl)amino)-2,3-dihydro-1H-inden-5-yl)acrylamide;

N-(1-((3-methoxyphenyl)amino)-2,3-dihydro-1H-inden-5-yl)acrylamide; methyl-3-((5-acrylamido-2,3-dihydro-1H-inden-1-yl)amino)benzoate;

and their pharmaceutically acceptable salts thereof.

All these sub-groups taken alone or in combination are part of the description.

Among the compounds of formula (I) that are subject matters of the invention, mention may be made in particular of the following compounds:

(No 1) N-(1-((3-(trifluoromethyl)phenyl)amino)-2,3-dihydro-1H-inden-5-yl)acrylamide;

(No 2) (R)—N-(1-((3-(trifluoromethyl)phenyl)amino)-2,3-dihydro-1H-inden-5-yl)acrylamide;

(No 3) (S)—N-(1-((3-(trifluoromethyl)phenyl)amino)-2,3-dihydro-1H-inden-5-yl)acrylamide;

(No 4) N-methyl-N-(1-((3-(trifluoromethyl)phenyl)amino)-2,3-dihydro-1H-inden-5-yl)acrylamide;

(No 5) N-(1-((4-fluorophenyl)amino)-2,3-dihydro-1H-inden-5-yl)acrylamide;

(No 6) (S)—N-(1-((4-fluorophenyl)amino)-2,3-dihydro-1H-inden-5-yl)acrylamide;

(No 7) (R)—N-(1-((4-fluorophenyl)amino)-2,3-dihydro-1H-inden-5-yl)acrylamide;

(No 8) N-(1-((3-fluorophenyl)amino)-2,3-dihydro-1H-inden-5-yl)acrylamide;

(No 9) N-(1-((3,5-difluorophenyl)amino)-2,3-dihydro-1H-inden-5-yl)acrylamide;

(No 10) N-(1-((4-(trifluoromethyl)phenyl)amino)-2,3-dihydro-1H-inden-5-yl)acrylamide;

(No 11) N-(3-((3-(trifluoromethyl)phenyl)amino)-2,3-dihydro-1H-inden-5-yl)acrylamide;

(No 12) N-(3-((4-(trifluoromethyl)phenyl)amino)-2,3-dihydro-1H-inden-5-yl)acrylamide;

(No 13) N-(3-((3,4-difluorophenyl)amino)-2,3-dihydro-1H-inden-5-yl)acrylamide;

(No 14) N-(3-((3-fluorophenyl)amino)-2,3-dihydro-1H-inden-5-yl)acrylamide;

(No 15) N-(3-((4-fluorophenyl)amino)-2,3-dihydro-1H-inden-5-yl)acrylamide;

(No 16) N-(1-((3,4-difluorophenyl)amino)-2,3-dihydro-1H-inden-5-yl)acrylamide;

(No 17) N-(1-((3-methoxyphenyl)amino)-2,3-dihydro-1H-inden-5-yl)acrylamide;

(No 18) N-(1-(m-tolylamino)-2,3-dihydro-1H-inden-5-yl)acrylamide;

(No 19) N-(1-((6-fluoropyridin-3-yl)amino)-2,3-dihydro-1H-inden-5-yl)acrylamide;

(No 20) N-(1-((6-(trifluoromethyl)pyridin-3-yl)amino)-2,3-dihydro-1H-inden-5-yl)acrylamide;

(No 21) N-(1-((5-fluoropyridin-2-yl)amino)-2,3-dihydro-1H-inden-5-yl)acrylamide;

(No 22) methyl-3-((5-acrylamido-2,3-dihydro-1H-inden-1-yl)amino)benzoate;

(No 23) N-(3-(benzylamino)-2,3-dihydro-1H-inden-5-yl)acrylamide;

(No 24) N-(1-((3-(trifluoromethyl)benzyl)amino)-2,3-dihydro-1H-inden-5-yl)acrylamide;

(No 25) N-(1-((4-(trifluoromethyl)benzyl)amino)-2,3-dihydro-1H-inden-5-yl)acrylamide;

(No 26) N-(2-(((cis)-4-(trifluoromethyl)cyclohexyl)amino)-2,3-dihydro-1H-inden-5-yl)acrylamide;

(No 27) N-(2-(((trans)-4-(trifluoromethyl)cyclohexyl)amino)-2,3-dihydro-1H-inden-5-yl)acrylamide;

(No 28) N-(2-((4,4-difluorocyclohexyl)amino)-2,3-dihydro-1H-inden-5-yl)acrylamide;

(No 29) N-(2-((4,4,4-trifluorobutyl)amino)-2,3-dihydro-1H-inden-5-yl)acrylamide;

(No 30) N-(2-((3-fluoropropyl)amino)-2,3-dihydro-1H-inden-5-yl)acrylamide;

(No 31) N-(2-((3-fluorophenyl)amino)-2,3-dihydro-1H-inden-5-yl)acrylamide;

(No 32) N-(2-((3-(trifluoromethyl)phenyl)amino)-2,3-dihydro-1H-inden-5-yl)acrylamide;

(No 33) N-(3-(4,4,4-trifluorobutoxy)-2,3-dihydro-1H-inden-5-yl)acrylamide;

(No 34) N-(3-(4-fluorobutoxy)-2,3-dihydro-1H-inden-5-yl)acrylamide;

(No 35) N-(3-((4,4-difluorocyclohexyl)oxy)-2,3-dihydro-1H-inden-5-yl)acrylamide;

(No 36) N-(3-(((trans)-4-(trifluoromethyl)cyclohexyl)oxy)-2,3-dihydro-1H-inden-5-yl)acrylamide;
(No 37) N-(3-(4-(trifluoromethyl)phenoxy)-2,3-dihydro-1H-inden-5-yl)acrylamide;
(No 38) N-(3-phenoxy-2,3-dihydro-1H-inden-5-yl)acrylamide;
(No 39) N-(3-(3-(trifluoromethyl)phenoxy)-2,3-dihydro-1H-inden-5-yl)acrylamide;
(No 40) N-(3-(3,4-difluorophenoxy)-2,3-dihydro-1H-inden-5-yl)acrylamide;
(No 41) N-(3-(3-fluorophenoxy)-2,3-dihydro-1H-inden-5-yl)acrylamide;
(No 42) N-(3-(4-fluorophenoxy)-2,3-dihydro-1H-inden-5-yl)acrylamide;
(No 43) N-(3-(3,5-difluorophenoxy)-2,3-dihydro-1H-inden-5-yl)acrylamide;
(No 44) N-(3-(2,4-difluorophenoxy)-2,3-dihydro-1H-inden-5-yl)acrylamide;
(No 45) N-(1-(3-(trifluoromethyl)phenoxy)-2,3-dihydro-1H-inden-5-yl)acrylamide;
(No 46) N-(1-(3-(trifluoromethoxy)phenoxy)-2,3-dihydro-1H-inden-5-yl)acrylamide;
(No 47) methyl 3-[6-(prop-2-enoylamino)-2,3-dihydro-1H-inden-1-yl]oxybenzoate;
(No 48) (S)—N-(2-((3-fluorophenyl)amino)-2,3-dihydro-1H-inden-5-yl)acrylamide;
(No 49) (R)—N-(2-((3-fluorophenyl)amino)-2,3-dihydro-1H-inden-5-yl)acrylamide;
(No 50) (R)—N-(2-((3-(trifluoromethyl)phenyl)amino)-2,3-dihydro-1H-inden-5-yl)acrylamide;
(No 51) (S)—N-(2-((3-(trifluoromethyl)phenyl)amino)-2,3-dihydro-1H-inden-5-yl)acrylamide;
(No 52) N-[2-[4-(trifluoromethyl)anilino]-2,3-dihydro-1H-inden-5-yl]acrylamide;
(No 53) N-(3-((3,5-difluorophenyl)amino)-2,3-dihydro-1H-inden-5-yl)acrylamide;
(No 54) N-(1-((3-(pentafluoro-I6-sulfanyl)phenyl)amino)-2,3-dihydro-1H-inden-5-yl)acrylamide;
(No 55) (R)—N-(1-((4-(trifluoromethyl)phenyl)amino)-2,3-dihydro-1H-inden-5-yl)acrylamide;
(No 56) (S)—N-(1-((4-(trifluoromethyl)phenyl)amino)-2,3-dihydro-1H-inden-5-yl)acrylamide;
(No 57) N-[(1S)-1-[[4-(trifluoromethyl)pyridin-2-yl]amino]-2,3-dihydro-1H-inden-5-yl]acrylamide;
(No 58) N-[(1R)-1-[[4-(trifluoromethyl)pyridin-2-yl]amino]-2,3-dihydro-1H-inden-5-yl]acrylamide;
(No 59) N-(1-((4-(trifluoromethyl)pyridin-2-yl)amino)-2,3-dihydro-1H-inden-5-yl)acrylamide 2,2,2-trifluoroacetate;
(No 60) N-(1-((6-(trifluoromethyl)pyridin-2-yl)amino)-2,3-dihydro-1H-inden-5-yl)acrylamide;
(No 61) N-(1-((5-(trifluoromethyl)pyridin-3-yl)amino)-2,3-dihydro-1H-inden-5-yl)acrylamide;
(No 62) N-(1-(methyl(3-(trifluoromethyl)phenyl)amino)-2,3-dihydro-1H-inden-5-yl)acrylamide;
(No 63) N-(1-(methyl(phenyl)amino)-2,3-dihydro-1H-inden-5-yl)acrylamide;
(No 64) N-(1-(methyl(4-(trifluoromethyl)phenyl)amino)-2,3-dihydro-1H-inden-5-yl)acrylamide;
(No 65) N-(3,3-dimethyl-1-((3-(trifluoromethyl)phenyl)amino)-2,3-dihydro-1H-inden-5-yl)acrylamide;
(No 66) N-(3,3-dimethyl-1-((4-(trifluoromethyl)phenyl)amino)-2,3-dihydro-1H-inden-5-yl)acrylamide;
(No 67) N-[7-fluoro-1-[3-(trifluoromethyl)anilino]-2,3-dihydro-1H-inden-5-yl]acrylamide;
(No 68) N-[4-fluoro-1-[4-(trifluoromethyl)anilino]-2,3-dihydro-1H-inden-5-yl]acrylamide;
(No 69) N-methyl-N-(1-((4-(trifluoromethyl)phenyl)amino)-2,3-dihydro-1H-inden-5-yl)acrylamide;
(No 70) N-(3-((4,4-difluorocyclohexyl)amino)-2,3-dihydro-1H-inden-5-yl)acrylamide;
(No 71) N-(3-((3-(trifluoromethyl)cyclopentyl)oxy)-2,3-dihydro-1H-inden-5-yl)acrylamide;
(No 72) N-(3-((5,5,5-trifluoropentyl)oxy)-2,3-dihydro-1H-inden-5-yl)acrylamide;
(No 73) N-(3-(4,4-difluorobutoxy)-2,3-dihydro-1H-inden-5-yl)acrylamide;
(No 74) N-(3-(2,2,2-trifluoroethoxy)-2,3-dihydro-1H-inden-5-yl)acrylamide;
(No 75) N-(3-(3,3,3-trifluoropropoxy)-2,3-dihydro-1H-inden-5-yl)acrylamide;
(No 76) N-methyl-N-(1-((4-(trifluoromethyl)cyclohexyl)oxy)-2,3-dihydro-1H-inden-5-yl)acrylamide;
(No 77) N-(3-(4-chlorophenoxy)-2,3-dihydro-1H-inden-5-yl)acrylamide;
(No 78) N-(3-(3-chlorophenoxy)-2,3-dihydro-1H-inden-5-yl)acrylamide;
(No 79) N-(3-(m-tolyloxy)-2,3-dihydro-1H-inden-5-yl)acrylamide;
(No 80) N-(3-(3-(methylthio)phenoxy)-2,3-dihydro-1H-inden-5-yl)acrylamide;
(No 81) N-(3-(3-cyclopropylphenoxy)-2,3-dihydro-1H-inden-5-yl)acrylamide;
(No 82) N-(1-(4-(trifluoromethyl)phenoxy)-2,3-dihydro-1H-inden-5-yl)acrylamide;
(No 83) N-methyl-N-(1-(4-(trifluoromethyl)phenoxy)-2,3-dihydro-1H-inden-5-yl)acrylamide;
(No 84) (S)—N-(1-(3-(trifluoromethyl)phenoxy)-2,3-dihydro-1H-inden-5-yl)acrylamide;
(No 85) (R)—N-(1-(3-(trifluoromethyl)phenoxy)-2,3-dihydro-1H-inden-5-yl)acrylamide;
(No 86) (S)—N-(3-(4-(trifluoromethyl)phenoxy)-2,3-dihydro-1H-inden-5-yl)acrylamide;
(No 87) (R)—N-(3-(4-(trifluoromethyl)phenoxy)-2,3-dihydro-1H-inden-5-yl)acrylamide;
(No 88) N-[3-[[5-(trifluoromethyl)pyridin-2-yl]oxy]-2,3-dihydro-1H-inden-5-yl]acrylamide;
(No 89) N-methyl-N-(1-(3-(trifluoromethyl)phenoxy)-2,3-dihydro-1H-inden-5-yl)acrylamide;
(No 90) N-[2-fluoro-3-[4-(trifluoromethyl)anilino]-2,3-dihydro-1H-inden-5-yl]acrylamide;
(No 91) N-(2-fluoro-3-((3-(trifluoromethyl)phenyl)amino)-2,3-dihydro-1H-inden-5-yl)acrylamide;
(No 92) N-[2-fluoro-3-[4-(trifluoromethyl)phenoxy]-2,3-dihydro-1H-inden-5-yl]acrylamide;
(No 93) N-methyl-N-(2-methyl-1-((3-(trifluoromethyl)phenyl)amino)-2,3-dihydro-1H-inden-5-yl)acrylamide;
(No 94) N-[(cis)-3-methoxy-1-[3-(trifluoromethyl)anilino]-2,3-dihydro-1H-inden-5-yl]acrylamide;
(No 95) N-[(trans)-2-hydroxy-1-[3-(trifluoromethyl)anilino]-2,3-dihydro-1H-inden-5-yl]acrylamide;
(No 96) N-[rac-(2R,3R)-2-hydroxy-3-[3-(trifluoromethyl)anilino]-2,3-dihydro-1H-inden-5-yl]acrylamide;
or a pharmaceutical salt thereof.

Among the compounds of formula (I') that are subject matters of the invention, mention may be made in particular of the following compounds:
(No 1) N-(1-((3-(trifluoromethyl)phenyl)amino)-2,3-dihydro-1H-inden-5-yl)acrylamide;
(No 2) (R)—N-(1-((3-(trifluoromethyl)phenyl)amino)-2,3-dihydro-1H-inden-5-yl)acrylamide;
(No 3) (S)—N-(1-((3-(trifluoromethyl)phenyl)amino)-2,3-dihydro-1H-inden-5-yl)acrylamide;

(No 4) N-methyl-N-(1-((3-(trifluoromethyl)phenyl)amino)-2,3-dihydro-1H-inden-5-yl)acrylamide;
(No 5) N-(1-((4-fluorophenyl)amino)-2,3-dihydro-1H-inden-5-yl)acrylamide;
(No 6) (S)—N-(1-((4-fluorophenyl)amino)-2,3-dihydro-1H-inden-5-yl)acrylamide;
(No 7) (R)—N-(1-((4-fluorophenyl)amino)-2,3-dihydro-1H-inden-5-yl)acrylamide;
(No 8) N-(1-((3-fluorophenyl)amino)-2,3-dihydro-1H-inden-5-yl)acrylamide;
(No 9) N-(1-((3,5-difluorophenyl)amino)-2,3-dihydro-1H-inden-5-yl)acrylamide;
(No 10) N-(1-((4-(trifluoromethyl)phenyl)amino)-2,3-dihydro-1H-inden-5-yl)acrylamide;
(No 11) N-(3-((3-(trifluoromethyl)phenyl)amino)-2,3-dihydro-1H-inden-5-yl)acrylamide;
(No 12) N-(3-((4-(trifluoromethyl)phenyl)amino)-2,3-dihydro-1H-inden-5-yl)acrylamide;
(No 13) N-(3-((3,4-difluorophenyl)amino)-2,3-dihydro-1H-inden-5-yl)acrylamide;
(No 14) N-(3-((3-fluorophenyl)amino)-2,3-dihydro-1H-inden-5-yl)acrylamide;
(No 15) N-(3-((4-fluorophenyl)amino)-2,3-dihydro-1H-inden-5-yl)acrylamide;
(No 16) N-(1-((3,4-difluorophenyl)amino)-2,3-dihydro-1H-inden-5-yl)acrylamide;
(No 17) N-(1-((3-methoxyphenyl)amino)-2,3-dihydro-1H-inden-5-yl)acrylamide;
(No 18) N-(1-(m-tolylamino)-2,3-dihydro-1H-inden-5-yl)acrylamide;
(No 19) N-(1-((6-fluoropyridin-3-yl)amino)-2,3-dihydro-1H-inden-5-yl)acrylamide;
(No 20) N-(1-((6-(trifluoromethyl)pyridin-3-yl)amino)-2,3-dihydro-1H-inden-5-yl)acrylamide;
(No 21) N-(1-((5-fluoropyridin-2-yl)amino)-2,3-dihydro-1H-inden-5-yl)acrylamide;
(No 22) methyl-3-((5-acrylamido-2,3-dihydro-1H-inden-1-yl)amino)benzoate;
(No 23) N-(3-(benzylamino)-2,3-dihydro-1H-inden-5-yl)acrylamide;
(No 24) N-(1-((3-(trifluoromethyl)benzyl)amino)-2,3-dihydro-1H-inden-5-yl)acrylamide;
(No 25) N-(1-((4-(trifluoromethyl)benzyl)amino)-2,3-dihydro-1H-inden-5-yl)acrylamide;
(No 26) N-(2-(((cis)-4-(trifluoromethyl)cyclohexyl)amino)-2,3-dihydro-1H-inden-5-yl)acrylamide;
(No 27) N-(2-(((trans)-4-(trifluoromethyl)cyclohexyl)amino)-2,3-dihydro-1H-inden-5-yl)acrylamide;
(No 28) N-(2-((4,4-difluorocyclohexyl)amino)-2,3-dihydro-1H-inden-5-yl)acrylamide;
(No 29) N-(2-((4,4,4-trifluorobutyl)amino)-2,3-dihydro-1H-inden-5-yl)acrylamide;
(No 30) N-(2-((3-fluoropropyl)amino)-2,3-dihydro-1H-inden-5-yl)acrylamide;
(No 31) N-(2-((3-fluorophenyl)amino)-2,3-dihydro-1H-inden-5-yl)acrylamide;
(No 32) N-(2-((3-(trifluoromethyl)phenyl)amino)-2,3-dihydro-1H-inden-5-yl)acrylamide;
(No 33) N-(3-(4,4,4-trifluorobutoxy)-2,3-dihydro-1H-inden-5-yl)acrylamide;
(No 34) N-(3-(4-fluorobutoxy)-2,3-dihydro-1H-inden-5-yl)acrylamide;
(No 35) N-(3-((4,4-difluorocyclohexyl)oxy)-2,3-dihydro-1H-inden-5-yl)acrylamide;
(No 36) N-(3-(((trans)-4-(trifluoromethyl)cyclohexyl)oxy)-2,3-dihydro-1H-inden-5-yl)acrylamide;
(No 37) N-(3-(4-(trifluoromethyl)phenoxy)-2,3-dihydro-1H-inden-5-yl)acrylamide;
(No 38) N-(3-phenoxy-2,3-dihydro-1H-inden-5-yl)acrylamide;
(No 39) N-(3-(3-(trifluoromethyl)phenoxy)-2,3-dihydro-1H-inden-5-yl)acrylamide;
(No 40) N-(3-(3,4-difluorophenoxy)-2,3-dihydro-1H-inden-5-yl)acrylamide;
(No 41) N-(3-(3-fluorophenoxy)-2,3-dihydro-1H-inden-5-yl)acrylamide;
(No 42) N-(3-(4-fluorophenoxy)-2,3-dihydro-1H-inden-5-yl)acrylamide;
(No 43) N-(3-(3,5-difluorophenoxy)-2,3-dihydro-1H-inden-5-yl)acrylamide;
(No 44) N-(3-(2,4-difluorophenoxy)-2,3-dihydro-1H-inden-5-yl)acrylamide;
(No 45) N-(1-(3-(trifluoromethyl)phenoxy)-2,3-dihydro-1H-inden-5-yl)acrylamide;
(No 46) N-(1-(3-(trifluoromethoxy)phenoxy)-2,3-dihydro-1H-inden-5-yl)acrylamide;
(No 47) methyl 3-[6-(prop-2-enoylamino)-2,3-dihydro-1H-inden-1-yl]oxybenzoate;
or a pharmaceutical salt thereof.

Among the preceding listed compounds, the following compounds may particularly be cited: (1), (2), (3), (4), (5), (6), (7), (8), (9), (10), (11), (12), (13), (14), (15), (16), (18), (19), (20), (21), (31), (32), (33), (35), (36), (37), (38), (39), (40), (41), (42), (43), (44), (45), (48), (49), (50), (53), (54), (55), (56), (57), (58), (59), (60), (61), (62), (63), (64), (66), (67), (68), (69), (71), (72), (76), (77), (78), (80), (81), (82), (83), (84), (85), (86), (87), (88), (90), (91), (92), (93), (94) and (95), in particular (1), (2), (3), (4), (5), (6), (7), (8), (9), (10), (11), (12), (13), (14), (15), (16), (18), (19), (20), (21), (31), (32), (33), (35), (36), (37), (38), (39), (40), (41), (42), (43), (44) and (45).

Among the preceding listed compounds, the following compounds may particularly be cited: (1), (2), (3), (5), (6), (7), (10), (11), (12), (13), (14), (15), (16), (31), (32), (36), (37), (38), (39), (40), (41), (42), (45), (44), (45), (48), (50), (53), (55), (56), (59), (62), (67), (77), (78), (82), (85), (87), (88), (90) and (92), and in particular (1), (2), (3), (5), (6), (7), (10), (11), (12), (13), (14), (15), (16), (31), (32), (36), (37), (38), (39), (40), (41), (42), (45), (44) and (45).

The compounds of formula (I) may be prepared according to the processes that follow. Unless otherwise mentioned, R1 to R7 are as defined previously.

In the following Schemes, the starting compounds and the reagents, when their preparation methods are not described, are commercially available or described in the literature, or else may be prepared according to methods that are described therein or that are known to those skilled in the art.

SCHEME 1: Preparation of compounds of the formula (I) where R1 is an —N(H)— group- General process N° 1

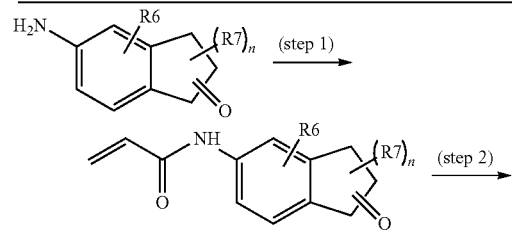

-continued

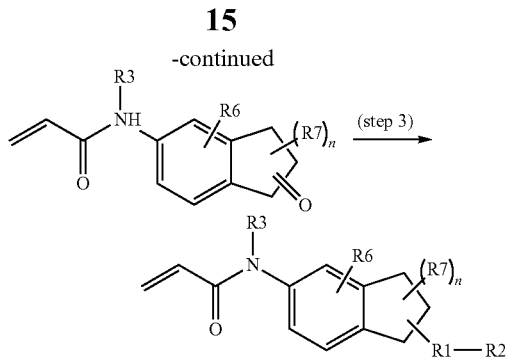

Step 1 consists in an acylation procedure of the amine group using the corresponding acid chloride, acid anhydride or acid in presence of a coupling agent.

Step 2 represents an alkylation of the nitrogen realized using aliphatic halogenoalkane derivatives in presence of a base.

Step 3 is a reductive amination of the ketone group using an amine in presence of a reductive agent.

When R3 is a hydrogen atom, step 2 is not performed.

SCHEME 2: Preparation of compounds of the formula (I)-where R1 is an —N(H)— group and R3 = H-General process N° 2

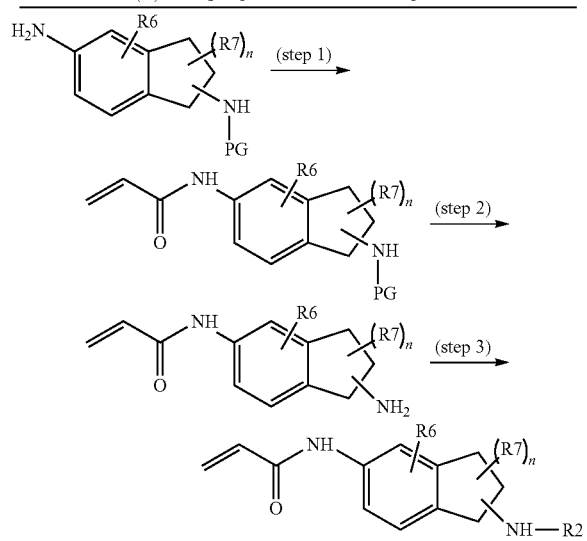

PG represents a protecting group, such as a tert-butyloxycarbonyl group (Boc group).

Scheme 2 Represents an Alternative to Scheme 1

Step 1 consists in an acylation procedure of the amino group using the corresponding acid chloride, acid anhydride or acid in presence of a coupling agent.

Step 2 represents a deprotection step where the protecting group is removed using classical methods, for example acidic treatment for Boc group, basic treatment for Fmoc group.

Step 3 is a reductive amination reaction of the amine with a ketone or aldehyde in presence of a reductive agent. An alternative to a reductive amination could be an organometallic coupling like a Buchwald-Hartwig reaction or a Chan-Lam cross coupling reaction using for example an aryl halide in presence of a palladium catalyst or an aryl boronic acid in presence of copper salt.

SCHEME 3: Preparation of compounds of the formula (I) where R1 is an oxygen atom-General process N° 3

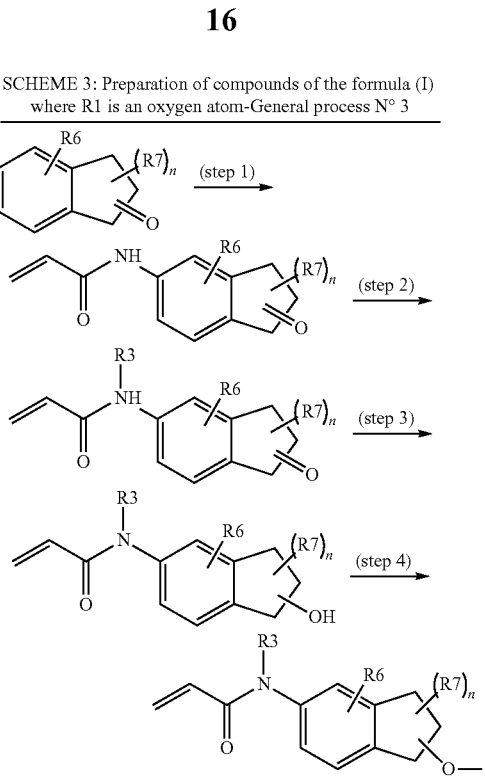

Step 1 consists in an acylation procedure of the amine group using the corresponding acid chloride, acid anhydride or acid in presence of a coupling agent.

Step 2 represents an alkylation of the nitrogen of the amide function realized using aliphatic halogenoalkane derivatives in presence of a base.

Step 3 is the reduction of the ketone in presence of a reductive agent.

Step 4 is a Mitsunobu reaction using an alcohol in presence of phosphine and an oxidizing agent like DEAD/DIAD/DMEAD/DCAD/ADDP or an alkylation reaction using for example an alcohol in presence of a strong Lewis acid like boron trifluoride diethyl etherate. An alternative reaction is an organometallic coupling like Chan-Lam cross coupling reaction using for example an aryl boronic acid in presence of copper salt.

When R3 is a hydrogen atom, the step 2 is not performed.

All compounds described hereinafter can be synthesized according to schemes 1 to 3.

The examples that follow describe the preparation of certain compounds of formula (I). The examples are not limiting but serve merely to illustrate the present invention.

The following abbreviations and empirical formulae are used:

AcOEt ethylacetate
AcOH acetic acid
ADDP 1,1-(Azodicarbonyl)dipiperidine
DCAD di-(4-chlorobenzyl)azodicarboxylate
DCM dichloromethane
DEAD diethylazodicarboxylate
DIAD diisopropylazodicarboxylate
DI PEA N,N-diisopropylethylamine
DMEAD di-2-methoxyethyl azodicarboxylate
DMF N,N-dimethylformamide
DMSO dimethylsulfoxide
EA ethylamine
e.e. enantiomeric excess Et₃N triethylamine
EtOAc ethyl acetate
EtOH ethanol
FA formic acid
LCMS Liquid Chromatography Mass Spectrometry
m-CPBA meta-chloroperoxybenzoic acid
MeCN acetonitrile
MeOH methanol
OR optical rotation
RT room temperature
STAB sodium triacetoxyborohydride
TEA triethylamine
TFA trifluoroacetic acid
THF tetrahydrofuran
TLC Thin layer chromatography
Tr retention time
° C. degree Celsius
ml milliliter(s)
mmol millimole(s)
min minute(s)
μmol micromole(s)
μl microliter(s)
h hour(s)

The following scheme illustrates a typical procedure following the general process illustrated in scheme 1 for the synthesis of the compounds of examples 1 to 4:

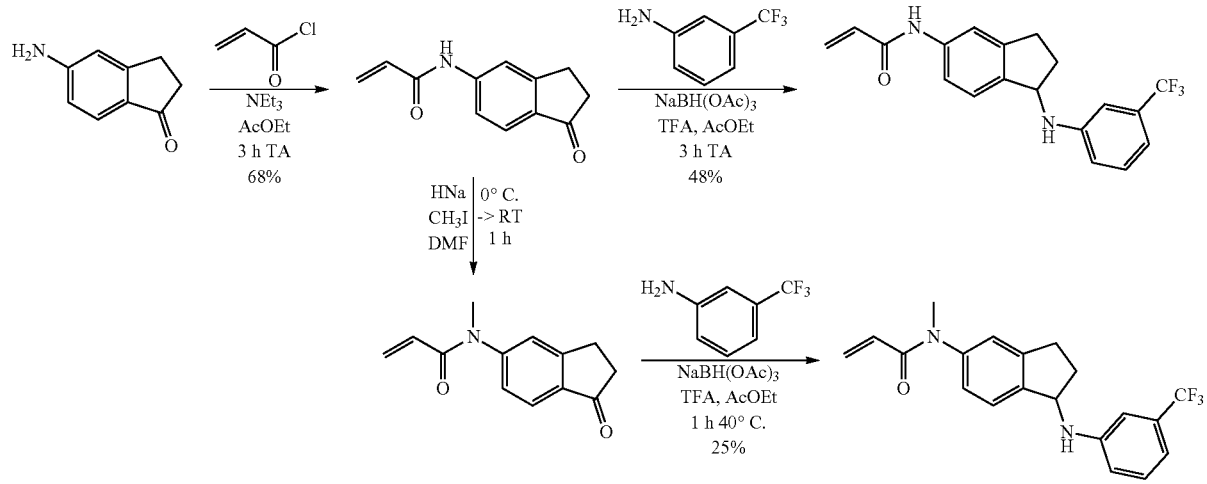

EXAMPLE 1

N-(1-((3-(trifluoromethyl)phenyl)amino)-2,3-dihydro-1H-inden-5-yl)acrylamide

N-(1-oxo-2,3-dihydro-1H-inden-5-yl)acrylamide (151 mg, 751 μmol) was dissolved in AcOEt (8 ml). 3-(trifluoromethyl)aniline (85 μl, 0.68 mol) and TFA (101 μl, 1.37 mmol) were added. STAB (174 mg, 0.82 mol) was added to the mixture in one portion. The reaction mixture was stirred for 3 h at RT. An aqueous solution of NaOH 1N was added, followed by an extraction with AcOEt. Then the combined organic layer was washed with an aqueous saturated solution of NaCl, dried over Na₂SO₄, filtered and concentrated at reduced pressure. The crude product was purified by column chromatography (silica gel, gradient cyclohexane/AcOEt 90/10 to 85/15) to obtain 113 mg of N-(1-((3-(trifluoromethyl)-phenyl)amino)-2,3-dihydro-1H-inden-5-yl)acrylamide as a white foam, yield 48%.

EXAMPLES 2 AND 3

Enantiomers 1 and 2 of N-(1-((3-(trifluoromethyl)phenyl)amino)-2,3-dihydro-1H-inden-5-yl)acrylamide Chiral separation of N-(1-((3-(trifluoromethyl)phenyl)amino)-2,3-dihydro-1H-inden-5-yl)acrylamide was realized as follows:

100 mg of N-(1-((3-(trifluoromethyl)phenyl)amino)-2,3-dihydro-1H-inden-5-yl)acrylamide were dissolved in 10 ml EtOH/heptane 50/50 and purified by reverse chiral phase chromatography (column Chiralcel OD-H 5 μm, 250×30 mm, eluant heptane/EtOH 75/25). Fractions of each enantiomer were combined, evaporated then lyophilized.

A first enantiomer, designated "Enantiomer 1", was isolated as a white amorphous solid (41 mg, yield 41%) with 99% e.e.

OR=+38°, c=2.4 mg/ml DMSO, RT

A second enantiomer, designated "Enantiomer 2", was isolated as a white amorphous solid (42 mg, 42%) with 99% e.e.

OR=−38°, c=2.4 mg/ml DMSO, RT

EXAMPLE 4

N-methyl-N-(1-((3-(trifluoromethyl)phenyl)amino)-2,3-dihydro-1H-inden-5-yl)acrylamide Synthesis of N-methyl-N-(1-oxo-2,3-dihydro-1H-inden-5-yl)acrylamide To a solution of N-(1-oxo-2,3-dihydro-1H-inden-5-yl)acrylamide (300 mg, 1.49 mmol) in 10 ml anhydrous DMF at 0° C. was added NaH (60% in mineral oil) (60 mg, 1.49 mmol). The temperature was allowed to rise to RT, stirred for 10 min at RT, then cooled down again to 0° C. before adding slowly iodomethane (100 μl, 1.49 mol). The reaction mixture was allowed to rise RT and stirred 1 h at RT. The reaction mixture was cooled to 0° C., ice cold water was added followed by an extraction with AcOEt. Then the combined organic layer was washed with water and an aqueous saturated solution of NaCl, dried over Na₂SO₄, filtered and concentrated at reduced pressure. The crude product was purified by column chromatography (silica gel, gradient cyclohexane/AcOEt 90/10 to 70/30) to obtain 80 mg of N-methyl-N-(1-oxo-2,3-dihydro-1H-inden-5-yl)acrylamide as a white solid, yield 25%.

Synthesis of N-methyl-N-(1-((3-(trifluoromethyl)phenyl)amino)-2,3-dihydro-1H-inden-5-yl)acrylamide N-methyl-N-(1-oxo-2,3-dihydro-1H-inden-5-yl)acrylamide (51 mg, 236 µmol) was dissolved in AcOEt (3 ml). 3-trifluoromethylaniline (27 µl, 215 µmol) and TFA (65 µl, 860 µmol) were added. STAB (110 mg, 516 µmol) was added to the mixture in one portion. The reaction mixture was stirred for 1 h at 40° C. An aqueous solution of 1N NaOH was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 90/10 to 80/20) to obtain 21 mg of N-methyl-N-(1-((3-(tri-fluoromethyl)phenyl)amino)-2,3-dihydro-1H-inden-5-yl)acrylamide as a white solid, yield 25%.

The following examples were realized by using the appropriate amines in the final reductive amination step 3 of scheme 1 by using the appropriate N-(oxoindany-5-yl)prop-2-enamide as starting material.

EXAMPLE 5

N-(1-((4-fluorophenyl)amino)-2,3-dihydro-1H-inden-5-yl)acrylamide

N-(1-oxo-2,3-dihydro-1H-inden-5-yl)acrylamide (800 mg, 3.98 mmol) was dissolved in 1,2-dichloroethane (50 ml). 4-fluoroaniline (1.7 ml, 17.9 mmol) and acetic acid (683 µl, 11.9 mmol) were added. STAB (3.8 g, 17.9 mmol) was added to the mixture in several portions. The reaction mixture was stirred for 48 h at RT and 12 h at 40° C. An aqueous solution of 1N NaOH was added, followed by an extraction with DCM. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 90/10 to 70/30) to obtain 369 mg of N-(1-((4-fluorophenyl)amino)-2,3-dihydro-1H-inden-5-yl)acrylamide as a white solid, yield 31%.

EXAMPLES 6 AND 7

Enantiomers 1 and 2 of N-(1-((4-fluorophenyl)amino)-2,3-dihydro-1H-inden-5-yl)acrylamide Chiral separation of N-(1-((4-fluorophenyl)amino)-2,3-dihydro-1H-inden-5-yl)acrylamide was realized as follows:

90 mg of N-[1-(4-fluoroanilino)indan-5-yl]prop-2-enamide were dissolved in 8 ml of heptane/EtOH 85/15 and purified by reverse chiral phase chromatography (column Chiralcel OD-H 5 µm, 250×30 mm, eluant heptane/EtOH 85/15). Fractions of each enantiomer were combined, evaporated then lyophilized.

A first enantiomer, designated "Enantiomer 1", was isolated as a white amorphous solid (32 mg, yield 36%) with 99.6% e.e.

A second enantiomer, designated "Enantiomer 2" was isolated as a white amorphous solid (33 mg, yield 37%) with 99.5% e.e.

EXAMPLE 8

N-(1-((3-fluorophenyl)amino)-2,3-dihydro-1H-inden-5-yl)-acrylamide

N-(1-oxo-2,3-dihydro-1H-inden-5-yl)acrylamide (360 mg, 1.79 mmol) was dissolved in 1,2-dichloroethane (25 ml). 3-fluoroaniline (776111, 7.9 mmol) and acetic acid (100 µl, 1.79 mmol) were added. STAB (2.2 g, 10 mmol) was added to the mixture in several portions. The reaction mixture was stirred for 30 h at RT and 30 h at 40° C. An aqueous solution of 1N NaOH was added, followed by an extraction with DCM. Then the combined organic layer was washed with an aqueous saturated solution of NaCl, dried over $Na_2SO_4$, filtered and concentrated at reduced pressure. 200 mg of the crude compound was dissolved in 4 ml of MeCN/water 50/50 and purified via a reversed phase chromatography (C18, eluant $H_2O$ (0.1% FA)/MeCN, gradient 20/80 to 0/100). Fractions were combined, evaporated then lyophilized. 59.2 mg of N-(1-((3-fluorophenyl)-amino)-2,3-dihydro-1H-inden-5-yl)acrylamide was isolated as a white lyophilisate, yield 9.4%.

EXAMPLE 9

N-(1-((3,5-difluorophenyl)amino)-2,3-dihydro-1H-inden-5-yl)acrylamide

N-(1-oxo-2,3-dihydro-1H-inden-5-yl)acrylamide (80 g, 397 µmol) was dissolved in AcOEt (4 ml). 3,5-difluoroaniline (48 mg, 361 µmol) and TFA (54 µl, 721 µmol) were added. STAB (92 mg, 433 µmol) was added to the mixture in one portion. The reaction mixture was stirred for 2 h at RT. An aqueous solution of 1N NaOH was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 90/10 to 80/20) to obtain 7.2 mg of N-(1-((3,5-difluorophenyl)amino)-2,3-dihydro-1H-inden-5-yl)acrylamide as a white solid, yield 6%.

EXAMPLE 10

N-(1-((4-(trifluoromethyl)phenyl)amino)-2,3-dihydro-1H-inden-5-yl)-acrylamide

N-(1-oxo-2,3-dihydro-1H-inden-5-yl)acrylamide (79 mg, 392 µmol) was dissolved in AcOEt (4 ml). 4-(trifluoromethyl)aniline (45 µl, 356 µmol) and TFA (53 µl, 713 µmol) were added. STAB (91 mg, 428 µmol) was added to the mixture in one portion. The reaction mixture was stirred for 2 h at RT. An aqueous solution of 1N NaOH was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, cyclohexane/AcOEt 100/0 to 90/10) to obtain 20.6 mg of N-(1-((4-(trifluoromethyl)phenyl)amino)-2,3-dihydro-1H-inden-5-yl)acrylamide as a white solid, yield 17%.

EXAMPLE 11

N-(3-((3-(trifluoromethyl)phenyl)amino)-2,3-di-hydro-1H-inden-5-yl)-acrylamide

N-(3-oxo-2,3-dihydro-1H-inden-5-yl)acrylamide (450 mg, 2.24 mmol) was dissolved in 1,2-dichloroethane (25 ml). 3-(trifluoromethyl)aniline (940 µl, 6.7 mmol) and acetic acid (128 µl, 2.24 mmol) were added. STAB (4.3 g, 20.1 mmol) was added to the mixture in several portions. The reaction mixture was stirred for 120 h at RT and 14 h at 40° C. An aqueous solution of 1N NaOH was added, followed by an extraction with DCM. Then the combined organic layer was washed with aqueous saturated solution of NaCl, dried over $Na_2SO_4$, filtered and concentrated at reduced pressure. The crude product was purified by column chromatography (silica gel, gradient cyclohexane/AcOEt 90/10 to 80/20) to obtain 31 mg of N-(3-((3-(trifluoromethyl)phenyl)amino)-2,3-dihydro-1H-inden-5-yl)acrylamide as a colorless oil, yield 4%.

EXAMPLE 12

N-(3-((4-(trifluoromethyl)phenyl)amino)-2,3-di-hydro-1H-inden-5-yl)-acrylamide

N-(3-oxo-2,3-dihydro-1H-inden-5-yl)acrylamide (80.1 mg, 398 µmol) was dissolved in AcOEt (4 ml). 4-(trifluoromethyl)aniline (46 µl, 322 µmol) and TFA (108 µl, 1.45 mmol) were added. STAB (92 mg, 434 µmol) was added to the mixture in one portion. The reaction mixture was stirred for 24 h at RT. An aqueous solution of 1N NaOH was added, followed by an extraction with AcOEt. Then the combined organic layer was washed with aqueous saturated solution of NaCl, dried over $Na_2SO_4$, filtered and concentrated at reduced pressure. The crude product was purified by column chromatography (silica gel, gradient cyclohexane/AcOEt 90/10 to 75/25) to obtain 29 mg of N-(3-((4-(trifluoromethyl)phenyl)-amino)-2,3-dihydro-1H-inden-5-yl)acrylamide as a yellow foam, yield 23%.

EXAMPLE 13

N-(3-((3,4-difluorophenyl)amino)-2,3-dihydro-1H-inden-5-yl)acrylamide

N-(3-oxo-2,3-dihydro-1H-inden-5-yl)acrylamide (80 mg, 397 µmol) was dissolved in AcOEt (4 ml). 3,4-difluoroaniline (48 mg, 361 µmol) and TFA (54 µl, 721 µmol) were added. STAB (92 mg, 433 µmol) was added to the mixture in one portion. The reaction mixture was stirred for 2 h at RT. An aqueous solution of 1N NaOH was added, followed by an extraction with AcOEt. Then the combined organic layer was washed with aqueous saturated solution of NaCl, dried over $Na_2SO_4$, filtered and concentrated at reduced pressure. The crude product was purified by column chromatography (silica gel, gradient cyclohexane/AcOEt 90/10 to 80/20) to obtain 39.4 mg of N-(3-((3,4-difluorophenyl) amino)-2,3-dihydro-1H-inden-5-yl)acrylamide as a white solid, yield 34%.

EXAMPLE 14

N-(3-((3-fluorophenyl)amino)-2,3-dihydro-1H-inden-5-yl)acrylamide

N-(3-oxo-2,3-dihydro-1H-inden-5-yl)acrylamide (56 mg, 277 µmol) was dissolved in AcOEt (3 ml). 3-fluoroaniline (28 mg, 252 µmol) and TFA (37 µl, 504 µmol) were added. STAB (64 mg, 302 µmol) was added to the mixture in one portion. The reaction mixture was stirred for 4 h at RT. An aqueous solution of 1N NaOH was added, followed by an extraction with AcOEt. Then the combined organic layer was washed with aqueous saturated solution of NaCl, dried over $Na_2SO_4$, filtered and concentrated at reduced pressure. The crude product was purified by column chromatography (silica gel, cyclohexane/AcOEt 100/0 to 90/10) to obtain 23.7 mg of N-(3-((3-fluorophenyl)-amino)-2,3-dihydro-1H-inden-5-yl)acrylamide as a colorless oil, yield 32%.

EXAMPLE 15

N-(3-((4-fluorophenyl)amino)-2,3-dihydro-1H-inden-5-yl)acrylamide

N-(3-oxo-2,3-dihydro-1H-inden-5-yl)acrylamide (56 mg, 277 µmol) was dissolved in AcOEt (3 ml). 4-fluoroaniline (28 mg, 252 µmol) and TFA (37 µl, 504 µmol) were added. STAB (64 mg, 302 µmol) was added to the mixture in one portion. The reaction mixture was stirred for 4 h at RT. An aqueous solution of 1N NaOH was added, followed by an extraction with AcOEt. Then the combined organic layer was washed with aqueous saturated solution of NaCl, dried over $Na_2SO_4$, filtered and concentrated at reduced pressure. The crude product was purified by column chromatography (silica gel, cyclohexane/AcOEt 100/0 to 90/10) to obtain 40.2 mg of N-(3-((4-fluorophenyl)amino)-2,3-dihydro-1H-inden-5-yl)acrylamide as a white foam, yield 54%.

EXAMPLE 16

Synthesis of N-(1-((3,4-difluorophenyl)amino)-2,3-dihydro-1H-inden-5-yl)acrylamide N-(1-oxo-2,3-dihydro-1H-inden-5-yl)acrylamide (80 mg, 397 µmol) was dissolved in AcOEt (4 ml). 3,4-difluoroaniline (48 mg, 361 µmol) and TFA (54 µl, 721 µmol) were added. STAB (92 mg, 433 µmol) was added to the mixture in one portion. The reaction mixture was stirred for 2 h at RT. An aqueous solution of 1N NaOH was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 100/0 to 90/10 to 85/15) to obtain 45.6 mg of N-(1-((3,4-difluorophenyl)amino)-2,3-dihydro-1H-inden-5-yl)acryl-amide as a white solid, yield 39%.

EXAMPLE 17

N-(1-((3-methoxyphenyl)amino)-2,3-dihydro-1H-inden-5-yl)acrylamide

N-(1-oxo-2,3-dihydro-1H-inden-5-yl)acrylamide (80 mg, 398 µmol) was dissolved in AcOEt (4 ml). m-anisidine (42 µl, 362 µmol) and TFA (54 µl, 725 µmol) were added. STAB (92 mg, 435 µmol) was added to the mixture in one portion. The reaction mixture was stirred for 3 h at RT. An aqueous solution of 1N NaOH was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 90/10 to 80/20) to obtain 45 mg of N-(1-((3-methoxyphenyl)amino)-2,3-dihydro-1H-inden-5-yl)acrylamide as a white foam, yield 39%.

EXAMPLE 18

N-(1-(m-tolylamino)-2,3-dihydro-1H-inden-5-yl)acrylamide

N-(1-oxo-2,3-dihydro-1H-inden-5-yl)acrylamide (81 mg, 400 μmol) was dissolved in AcOEt (4 ml). m-toluidine (39 μl, 364 μmol) and TFA (54 μl, 728 μmol) were added. STAB (93 mg, 437 μmol) was added to the mixture in one portion. The reaction mixture was stirred for 3 h at RT. An aqueous solution of 1N NaOH was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 90/10 to 85/15) to obtain 59.6 mg of N-(1-(m-tolylamino)-2,3-dihydro-1H-inden-5-yl)acrylamide as a white solid, yield 56%.

EXAMPLE 19

N-(1-((6-fluoropyridin-3-yl)amino)-2,3-dihydro-1H-inden-5-yl)acrylamide

N-(1-oxo-2,3-dihydro-1H-inden-5-yl)acrylamide (400 mg, 2 mmol) was dissolved in 1,2-dichloroethane (25 ml). 6-fluoropyridin-3-amine (2 g, 17.9 mmol) and acetic acid (114 μl, 2 mmol) were added. STAB (3.8 g, 17.9 mmol) was added to the mixture in several portions. The reaction mixture was stirred for 72 h at RT and 6 h at 40° C. An aqueous solution of 1N NaOH was added, followed by an extraction with DCM. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 90/10 to 70/30) to obtain 12 mg of N-(1-((6-fluoropyridin-3-yl)amino)-2,3-dihydro-1H-inden-5-yl)acrylamide as a white solid, yield 2%.

EXAMPLE 20

N-(1-((6-(trifluoromethyl)pyridin-3-yl)amino)-2,3-dihydro-1H-inden-5-yl)acrylamide N-(1-oxo-2,3-dihydro-1H-inden-5-yl)acrylamide (80 mg, 400 μmol) was dissolved in AcOEt (4 ml). 5-amino-2-(trifluoromethyl)pyridine (62 mg, 363 μmol) and TFA (54 μl, 727 μmol) were added. STAB (93 mg, 436 μmol) was added to the mixture in one portion. The reaction mixture was stirred for 3 h at RT. An aqueous solution of 1N NaOH was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 90/10 to 75/25) to obtain 54.5 mg of N-(1-((6-(trifluoro-methyl)pyridin-3-yl)amino)-2,3-dihydro-1H-inden-5-yl)acrylamide as an colorless oil, yield 41%.

EXAMPLE 21

N-(1-((5-fluoropyridin-2-yl)amino)-2,3-dihydro-1H-inden-5-yl)acrylamide

N-(1-oxo-2,3-dihydro-1H-inden-5-yl)acrylamide (70 mg, 348 μmol) was dissolved in AcOEt (4 ml). 2-amino-5-fluoropyridine (80 mg, 696 μmol) and TFA (104 μl, 1.39 mmol) were added. STAB (177 mg, 834 μmol) was added to the mixture in one portion. The reaction mixture was stirred for 30 h at RT. An aqueous solution of 1N NaOH was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 90/10 to 50/50) to obtain 10 mg of N-(1-((5-fluoropyridin-2-yl)amino)-2,3-dihydro-1H-inden-5-yl)acrylamide as a white solid, yield 9.6%.

EXAMPLE 22 methyl-3-((5-acrylamido-2,3-dihydro-1H-inden-1-yl)-amino)benzoate

N-(1-oxo-2,3-dihydro-1H-inden-5-yl)acrylamide (80 mg, 400 μmol) was dissolved in AcOEt (4 ml). Methyl 3-aminobenzoate (56 mg, 363 μmol) and TFA (54 μl, 726 μmol) were added. STAB (92 mg, 436 μmol) was added to the mixture in one portion. The reaction mixture was stirred for 3 h at RT. An aqueous solution of 1N NaOH was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 90/10 to 30/70) to obtain 66 mg of methyl-3-((5-acrylamido-2,3-dihydro-1H-inden-1-yl)amino)benzoate as a white solid, yield 49%.

EXAMPLE 23

N-(3-(benzylamino)-2,3-dihydro-1H-inden-5-yl)acrylamide

N-(3-oxo-2,3-dihydro-1H-inden-5-yl)acrylamide (200 mg, 994 μmol) was dissolved in THF (8 ml). Benzylamine (330 μl, 3 mmol) and acetic acid (60 mg, 994 μmol) were added. STAB (948 mg, 4.5 mmol) was added to the mixture in several portions. The reaction mixture was stirred for 24 h at RT. An aqueous solution of 1N NaOH was added, followed by an extraction with DCM. Then the combined organic layer was washed with aqueous saturated solution of NaCl, dried over $Na_2SO_4$, filtered and concentrated at reduced pressure. The crude product was purified by column chromatography (silica gel, cyclohexane/AcOEt 100/0 to 90/10) to obtain 41 mg of N-(3-(benzylamino)-2,3-dihydro-1H-inden-5-yl)-acrylamide as a colorless oil, yield 14%.

EXAMPLE 24

N-(1-((3-(trifluoromethyl)benzyl)amino)-2,3-dihydro-1H-inden-5-yl)-acrylamide N-(1-oxo-2,3-dihydro-1H-inden-5-yl)acrylamide (160 mg, 795 μmol) was dissolved in 1,2-dichloroethane (15 ml). 3-(trifluoromethyl)benzylamine (233 μl, 1.6 mmol) and acetic acid (46 μl, 795 μmol) were added. STAB (472 mg, 2.2 mmol) was added to the mixture in several portions. The reaction mixture was stirred for 24 h at RT. An aqueous solution of 1N NaOH was added, followed by an extraction with DCM. Then the combined organic layer was washed with aqueous saturated solution of NaCl, dried over $Na_2SO_4$, filtered and concentrated at reduced pressure. The crude product was purified by column chromatography (silica gel, gradient cyclohexane/AcOEt 90/10 to 70/30) to obtain 50 mg of N-(1-((3-(trifluoromethyl)benzyl)amino)-2,3-dihydro-1H-inden-5-yl)acrylamide as a colorless oil, yield 17%.

EXAMPLE 25

N-(1-((4-(trifluoromethyl)benzyl)amino)-2,3-dihydro-1H-inden-5-yl)-acrylamide

N-(1-oxo-2,3-dihydro-1H-inden-5-yl)acrylamide (200 mg, 994 μmol) was dissolved in 1,2-dichloroethane (20 ml). 4-(trifluoromethyl)benzylamine (161 μl, 1.1 mmol) and acetic acid (58 μl, 0.9 mmol) were added. STAB (608 mg, 2.8 mmol) was added to the mixture in several portions. The reaction mixture was stirred for 72 h at RT. An aqueous solution of 1N NaOH was added, followed by an extraction with DCM. Then the combined organic layer was washed with aqueous saturated solution of NaCl, dried over $Na_2SO_4$, filtered and concentrated at reduced pressure. The crude product was purified by column chromatography (silica gel, gradient cyclohexane/AcOEt 90/10 to 70/30) to obtain 73 mg of N-(1-((4-(trifluoromethyl)benzyl)amino)-2,3-dihydro-1H-inden-5-yl)acrylamide as a colorless oil, yield 20%.

Hereinafter are described examples 26 to 29 according to the general scheme 2.

For examples 26 to 29, commercially available tert-butyl N-(5-aminoindan-2-yl)-carbamate was used to obtain as already described the corresponding tert-butyl N-[5-(prop-2-enoylamino)indan-2-yl]-carbamate which was deprotected as known by people skilled in the art to obtain N-(2-amino-2,3-dihydro-1H-inden-5-yl)acrylamide.

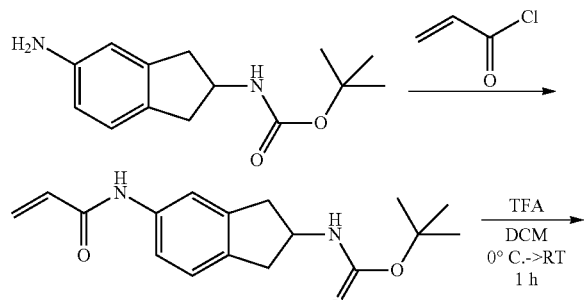

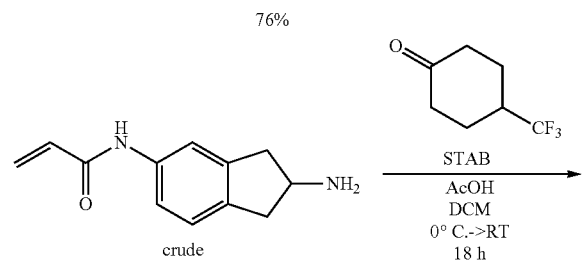

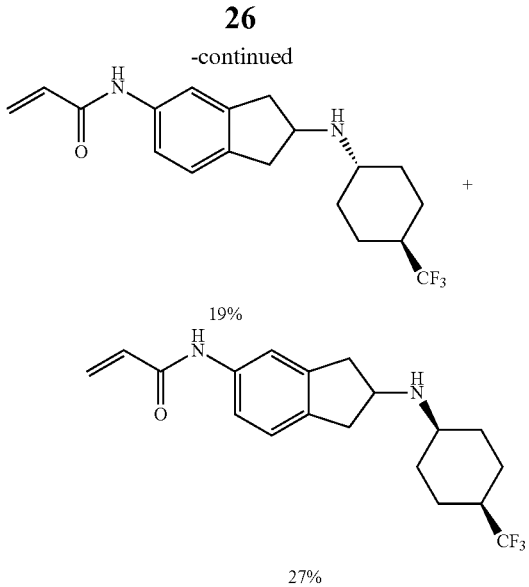

Synthesis of tert-butyl N-[5-(prop-2-enoylamino)indan-2-yl]carbamate tert-butyl N-(5-aminoindan-2-yl)carbamate (400 mg, 1.6 mmol) was dissolved in THF (8 ml). Triethylamine (258 μl, 1.8 mol) was added. The reaction mixture was cooled down to 0° C. before adding slowly acryloyl chloride (146 μl, 1.8 mmol) and stirred at RT for 2 h. The reaction mixture was diluted with AcOEt. A saturated aqueous solution of $NaHCO_3$ was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 90/10 to 60/40) to obtain 370 mg of tert-butyl N-[5-(prop-2-enoylamino)indan-2-yl]carbamate as a white solid, yield 76%.

Synthesis of N-(2-amino-2,3-dihydro-1H-inden-5-yl)acrylamide

A suspension of tert-butyl N-[5-(prop-2-enoylamino)indan-2-yl]carbamate (100 mg, 331 μmol) in DCM (6 ml) was cooled down to 0° C. before adding slowly TFA (640 μl, 8.3 mmol) and stirred at RT for 1 h. The reaction mixture was diluted with DCM. An aqueous solution of 1N NaOH was added, followed by an extraction with DCM. Then the combined organic layer was dried over $Na_2SO_4$, filtered and concentrated at reduced pressure. The crude product was used for the next step without any purification.

EXAMPLE 26

N-(2-(((cis)-4-(trifluoromethyl)cyclohexyl)amino)-2,3-dihydro-1H-inden-5-yl)acrylamide and

EXAMPLE 27

N-(2-(((trans)-4-(trifluoromethyl)cyclohexyl)amino)-2,3-dihydro-1H-inden-5-yl)acrylamide N-(2-amino-2,3-dihydro-1H-inden-5-yl)acrylamide (90 mg, 445 μmol) was dissolved in DCM (4 ml). Powdered molecular sieves 4 Å, 4-(trifluoromethyl)cyclohexan-1-one (74 mg, 445 μmol) and acetic acid (26 μl, 445 μmol) were added. The reaction mixture was cooled down to 0° C. STAB (142 mg, 668 μmol) was added to the mixture in one portion and stirred overnight. An aqueous solution of 1N NaOH was added, followed by an extraction with DCM. Then the combined organic layer was washed with an aqueous saturated solution of NaCl, dried over Na$_2$SO$_4$, filtered and concentrated at reduced pressure. The crude product was purified by column chromatography (silica gel, gradient cyclohexane/AcOEt 90/10 to 50/50) to isolate 43.3 mg of N-(2-(((cis)-4-(trifluoromethyl)cyclohexyl)amino)-2,3-dihydro-1H-inden-5-yl)acrylamide as a white solid (yield 27%). Further increasing the gradient cyclohexane/AcOEt from 50/50 to 0/100) provided 29.6 mg of N-(2-(((trans)-4-(trifluoromethyl)cyclohexyl)amino)-2,3-dihydro-1H-inden-5-yl)acrylamide as a white solid, yield 19%.

EXAMPLE 28

N-(2-((4,4-difluorocyclohexyl)amino)-2,3-dihydro-1H-inden-5-yl)acrylamide

N-(2-amino-2,3-dihydro-1H-inden-5-yl)acrylamide (92 mg, 455 μmol) was dissolved in 1,2-dichloroethane (3 ml). Powdered molecular sieves 4 Å, 4,4-difluorocyclohexanone (64 mg, 455 μmol) and acetic acid (30 μl, 455 μmol) were added. The reaction mixture was cooled down to 0° C. and STAB (150 mg, 682 μmol) was added to the mixture in one portion. The reaction mixture was stirred overnight at RT. An aqueous solution of 1N NaOH was added, followed by an extraction with DCM. Then the combined organic layer was washed with an aqueous saturated solution of NaCl, dried over Na$_2$SO$_4$, filtered and concentrated at reduced pressure. The crude product was purified by column chromatography (silica gel, gradient cyclohexane/AcOEt 90/10 to 45/55) to obtain 63.4 mg of N-(2-((4,4-difluoro-cyclohexyl)amino)-2,3-dihydro-1H-inden-5-yl)acrylamide as a white solid, yield 43%.

EXAMPLE 29

N-(2-((4,4,4-trifluorobutyl)amino)-2,3-dihydro-1H-inden-5-yl)acrylamide

N-(2-amino-2,3-dihydro-1H-inden-5-yl)acrylamide (104 mg, 514 μmol) was dissolved in DCM (5 ml). 4,4,4-trifluoro-butyraldehyde (68 mg, 514 μmol) and acetic acid (30 μl, 514 μmol) were added. The reaction mixture was cooled down to 0° C. STAB (327 mg, 1.54 mmol) was added to the mixture in one portion and stirred overnight. An aqueous solution of 1N NaOH was added, followed by an extraction with DCM. Then the combined organic layer was washed with an aqueous saturated solution of NaCl, dried over Na$_2$SO$_4$, filtered and concentrated at reduced pressure. The crude product was purified by column chromatography (silica gel, gradient DCM/MeOH 98/2 to 95/5) to obtain 49.9 mg of N-(2-((4,4,4-trifluorobutyl)amino)-2,3-dihydro-1H-inden-5-yl)acrylamide as a white solid, yield 32%.

The following example 30 illustrates an alkylation procedure of the already described N-(2-amino-2,3-dihydro-1H-inden-5-yl)acrylamide by using primary halogenoalkane derivatives.

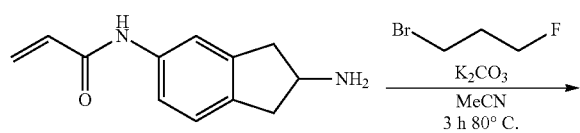

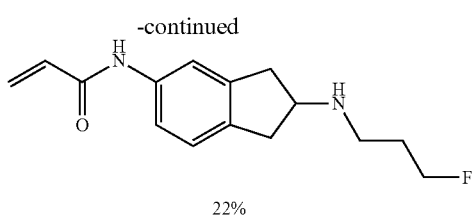

22%

EXAMPLE 30

N-(2-((3-fluoropropyl)amino)-2,3-dihydro-1H-inden-5-yl)acrylamide

N-(2-amino-2,3-dihydro-1H-inden-5-yl)acrylamide (108 mg, 532 μmol) was dissolved in acetonitrile (2 ml). Potassium carbonate (149 mg, 1.06 mmol) and 1-bromo-3-fluoropropane (33 μl, 355 μmol) were added dropwise to the mixture. The 10 ml microwave tube was sealed and the reaction mixture was stirred for 3 h at 80° C. in a sand bath. The solvent was evaporated. Water was added followed by an extraction with DCM. Then the combined organic layer was dried over Na$_2$SO$_4$, filtered and concentrated at reduced pressure. The crude product was purified by column chromatography (silica gel, gradient DCM/MeOH 98/2 to 95/5) to obtain 20.2 mg of N-(2-((3-fluoropropyl)amino)-2,3-dihydro-1H-inden-5-yl)acrylamide as a white solid, yield 22%.

The following examples 31 and 32 illustrate the use of the already described N-(2-amino-2,3-dihydro-1H-inden-5-yl) acrylamide under Chan-Lam reaction conditions in order to allow an aryl carbon-heteroatom bond formation via an oxidative coupling of boronic acids with an N—H containing compound in air in the presence of copper(II) salts.

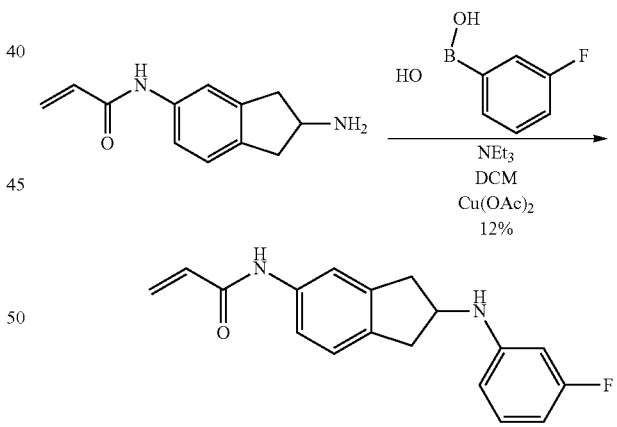

EXAMPLE 31

N-(2-((3-fluorophenyl)amino)-2,3-dihydro-1H-inden-5-yl)acrylamide

N-(2-amino-2,3-dihydro-1H-inden-5-yl)acrylamide (134 mg, 663 μmol) was dissolved in DCM (20 ml). Powdered molecular sieves 4 Å, 3-fluorophenylboronic acid (195 mg, 1.33 mmol), triethylamine (464 μl, 3.31 mmol), and copper (II) acetate (250 mg, 1.33 mmol) were added and stirred at RT for 24 h under oxygene atmosphere. Then the reaction mixture was filtered through celite, the filter pad was washed with DCM. Water was added, followed by an extraction with DCM. Then the combined organic layer was washed with an aqueous saturated solution of NaCl, dried over Na$_2$SO$_4$, filtered and concentrated at reduced pressure. The crude product was purified by column chromatography (silica gel, gradient cyclohexane/AcOEt 90/10 to 80/20) to obtain 24.6 mg of N-(2-((3-fluorophenyl)amino)-2,3-dihydro-1H-inden-5-yl)acrylamide as a white solid, yield 12%.

EXAMPLE 32

N-(2-((3-(trifluoromethyl)phenyl)amino)-2,3-dihydro-1H-inden-5-yl)-acrylamide N-(2-amino-2,3-dihydro-1H-inden-5-yl)acrylamide (67 mg, 331 μmol) was dissolved in DCM (10 ml). Powdered molecular sieves 4 Å, 3-(trifluoromethyl)phenylboronic acid (132 mg, 663 μmop, triethylamine (70 μl, 497 μmop, and copper (II) acetate (94 mg, 497 μmol) were added and stirred at RT for 24 h under oxygene atmosphere. Then the reaction mixture was filtered through celite and the celite pad was washed with DCM. Water was added, followed by an extraction with DCM. Then the combined organic layer was washed with an aqueous saturated solution of NaCl, dried over Na$_2$SO$_4$, filtered and concentrated at reduced pressure. The crude product was purified by column chromatography (silica gel, gradient cyclohexane/AcOEt 90/10 to 50/50) to obtain 10.5 mg of N-(2-((3-(trifluoromethyl)phenyl)amino)-2,3-dihydro-1H-inden-5-yl)acrylamide as a white foam, yield 9.2%.

The following examples 33 to 36 illustrate scheme 1 by exemplifying R1=O using an alkylation reaction with an alcohol in presence of a strong Lewis acid like boron trifluoride diethyl etherate.

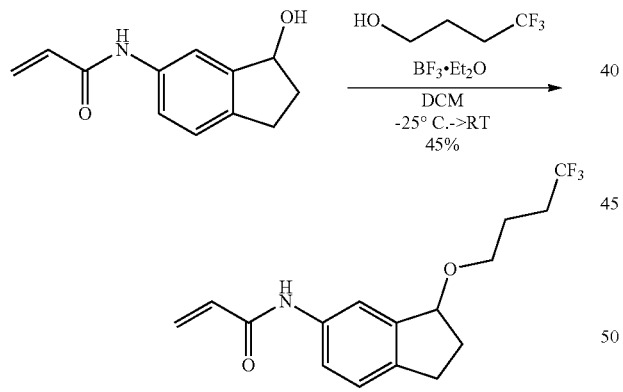

EXAMPLE 33

N-(3-(4,4,4-trifluorobutoxy)-2,3-dihydro-1H-inden-5-yl)acrylamide

N-(3-hydroxy-2,3-dihydro-1H-inden-5-yl)acrylamide (100 mg, 0.5 mmol) was solubilized in DCM (15 ml) with 4,4,4-trifluoro-1-butanol (0.2 ml, 1.8 mmol), cooled down to −25° C. before adding boron trifluoride diethyl etherate (0.2 ml, 0.7 mmol) and stirred overnight at RT. 15 ml of a 1M aqueous solution of NaHCO$_3$ were added, the organic layer was separated, dried over Na$_2$SO$_4$ and concentrated under vacuum. The remaining crude product is purified by column chromatography (silica gel, eluant DCM/MeOH 100/0 to 97/3), to obtain 70 mg of N-(3-(4,4,4-trifluorobutoxy)-2,3-dihydro-1H-inden-5-yl)acrylamide as an amorphous solid, yield 45%.

EXAMPLE 34

N-(3-(4-fluorobutoxy)-2,3-dihydro-1H-inden-5-yl)acrylamide)

N-(3-hydroxy-2,3-dihydro-1H-inden-5-yl)acrylamide (100 mg, 0.5 mmol) were solubilized in DCM (15 ml) with 4-fluoro-1-butanol (0.16 ml, 1.5 mmol), cooled down to 25° C. before adding boron trifluoride diethyl etherate (0.08 ml, 0.66 mmol) and stirred for 2 h at −25° C., and then overnight at RT. 15 ml of a 1M aqueous solution of NaHCO$_3$ were added, the organic layer was separated, dried over Na$_2$SO$_4$ and concentrated under vacuum. The remaining crude product is purified by column chromatography (silica gel, eluant DCM/MeOH 100/0 to 97/3), to obtain 140 mg N-(3-(4-fluorobutoxy)-2,3-dihydro-1H-inden-5-yl)acrylamide as an amorphous solid, yield 76%.

EXAMPLE 35

N-(3-((4,4-difluorocyclohexyl)oxy)-2,3-dihydro-1H-inden-5-yl)acrylamide

N-(3-hydroxy-2,3-dihydro-1H-inden-5-yl)acrylamide (100 mg, 0.5 mmol) were solubilized in DCM (15 ml) with 4,4-difluorocyclohexan-1-ol (200 mg, 1.5 mmol), cooled down to −25° C. before adding boron trifluoride diethyl etherate (0.1 ml, 0.7 mmol) and stirred for 2 h at −25° C. and overnight at RT. 15 ml of a 1M aqueous solution of NaHCO$_3$ were added, the organic layer was separated, dried over Na$_2$SO$_4$ and concentrated under vacuum. The remaining crude product is purified by column chromatography (silica gel, eluant DCM/MeOH 100/0 to 97/3), to obtain 60 mg of N-(3-((4,4-difluorocyclohexyl)oxy)-2,3-dihydro-1H-inden-5-yl)acrylamide as an amorphous solid, yield 38%.

EXAMPLE 36

N-(3-(((trans)-4-(trifluoromethyl)cyclohexyl)oxy)-2,3-dihydro-1H-inden-5-yl)acrylamide N-(3-hydroxy-2,3-dihydro-1H-inden-5-yl)acrylamide (100 mg, 0.5 mmol) were solubilized in DCM (15 ml) with 4-trifluoromethyl)cyclohexanol (253 mg, 1.5 mmol), cooled down to −25° C. before adding boron trifluoride diethyl etherate (0.08 ml, 0.66 mmol) and stirred for 2 h at −25° C. and overnight at RT. 15 ml of a 1M aqueous solution of NaHCO$_3$ were added, the organic layer was separated, dried over Na$_2$SO$_4$ and concentrated under vacuum. The remaining crude product is purified by column chromatography (silica gel, eluant DCM/MeOH 100/0 to 97/3), to obtain 41 mg of N-(3-(((trans)-4-(trifluoromethyl)cyclo-hexyl)oxy)-2,3-dihydro-1H-inden-5-yl)acrylamide as an amorphous solid, yield 23%.

The following example 37 illustrates scheme 1 by exemplifying R1=O using a Mitsunobu-approach for the ether bond formation. The indanone-intermediate was reduced to the corresponding secondary alcohol before further derivatization with phenol derivatives.

EXAMPLE 37

N-(3-(4-(trifluoromethyl)phenoxy)-2,3-dihydro-1H-inden-5-yl)acrylamide

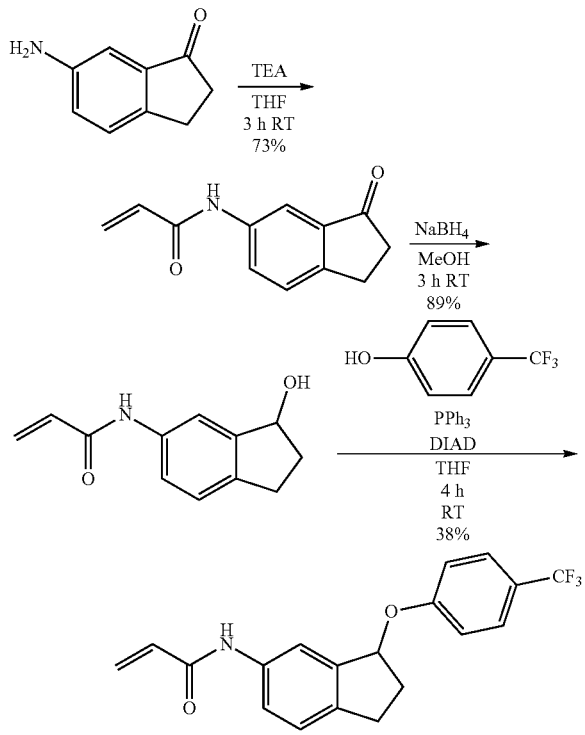

Synthesis of N-(3-oxo-2,3-dihydro-1H-inden-5-yl)acrylamide 6-aminoindan-1-one (3 g, 20.4 mmol) was dissolved in THF (60 ml) before adding triethylamine (3 ml, 22.4 mmol). The reaction mixture was cooled down to 0° C. before adding slowly acryloyl chloride (1.8 ml, 22.4 mmol) and stirred at RT for 2 h. The reaction mixture was diluted with AcOEt. A saturated aqueous solution of NaHCO₃ was added, followed by an extraction with AcOEt. The combined organic layer was washed with an aqueous saturated solution of NaCl, dried over Na₂SO₄, filtered and concentrated at reduced pressure. The crude product was purified by column chromatography (silica gel, gradient cyclohexane/AcOEt 90/10 to 40/60) to obtain a yellow solid. This solid was washed with diethyl ether to obtain 3 g of N-(3-oxo-2,3-dihydro-1H-inden-5-yl)acrylamide as a yellow solid, yield 73%.

Synthesis of N-(3-hydroxyindan-5-yl)prop-2-enamide

N-(3-oxo-2,3-dihydro-1H-inden-5-yl)acrylamide (900 mg, 4.5 mmol) was dissolved in methanol (36 ml). The reaction mixture was cooled down to 0° C. before adding sodium borohydride (186 mg, 5 mmol) and stirred at RT for 1 h. The solvent was evaporated. Water was added, followed by an extraction with DCM. Then the combined organic layer was washed with an aqueous saturated solution of NaCl, dried over Na₂SO₄, filtered and concentrated at reduced pressure. The crude product was purified by column chromatography (silica gel, gradient cyclohexane/AcOEt 90/10 to 50/50) to obtain 809 mg of N-(3-hydroxyindan-5-yl)prop-2-enamide as a white solid, yield 89%.

Synthesis of N-(3-(4-(trifluoromethyl)phenoxy)-2,3-dihydro-1H-inden-5-yl)acrylamide N-(3-hydroxyindan-5-yl)prop-2-enamide (215 mg, 1 mmol) was dissolved in THF (12 ml). 4-(trifluoromethyl)phenol (206 mg, 1.3 mmol) and triphenylphosphane (332 mg, 1.3 mmol) were added. The reaction mixture was cooled down to 0° C. before adding slowly DIAD (250 µl, 1.3 mmol) and stirred at RT for 4 h. The solvent was evaporated and the crude product was pre-purified by column chromatography (silica gel, gradient cyclo-hexane/AcOEt 100/0 to 90/10), followed by a second column chromatography with a less polar gradient (silica gel, gradient DCM/AcOEt 100/0 to 99/1) to obtain 140 mg of N-(3-(4-(trifluoromethyl)-phenoxy)-2,3-dihydro-1H-inden-5-yl)acrylamide as a white solid, yield 38%.

The following examples were realized as described before.

EXAMPLE 38

N-(3-phenoxy-2,3-dihydro-1H-inden-5-yl)acrylamide

N-(3-hydroxy-2,3-dihydro-1H-inden-5-yl)acrylamide (180 mg, 886 µmol) was dissolved in THF (10 ml). Phenol (94 µl, 1.1 mmol) and triphenylphosphane (284 mg, 1.1 mmol) were added. The reaction mixture was cooled down to 0° C. before adding slowly DIAD (213 µl, 1.1 mmol) at RT for 4 h. The solvent was purified by reverse phase chromatography (column CSH 250 mm×5 mm, eluant H₂O (0.1% FA)/MeCN (0.1% FA), gradient 74/26 to 5/95) to obtain 23 mg of N-(3-phenoxy-2,3-dihydro-1H-inden-5-yl)acrylamide as a white solid, yield 9.3%.

EXAMPLE 39

N-(3-(3-(trifluoromethyl)phenoxy)-2,3-dihydro-1H-inden-5-yl)acrylamide

N-(3-hydroxy-2,3-dihydro-1H-inden-5-yl)acrylamide (300 mg, 1.5 mmol) was dissolved in THF (14 ml). 3-(trifluoromethyl)phenol (218 µl, 1.8 mmol) and triphenylphosphane (474 mg, 1.8 mmol) were added. The reaction mixture was cooled down to 0° C. before adding slowly DIAD (356 µl, 1.8 mmol) and stirred at RT for 4 h. The solvent was purified by column chromatography (silica gel, gradient cyclohexane/AcOEt 100/0 to 70/30) and by a second column chromatography (silica gel, gradient cyclohexane/DCM 100/0 to 35/65) to obtain 34.2 mg of N-(3-(3-(trifluoromethyl)phenoxy)-2,3-dihydro-1H-inden-5-yl)acrylamide as a white solid, yield 6.7%.

EXAMPLE 40

N-(3-(3,4-difluorophenoxy)-2,3-dihydro-1H-inden-5-yl)acrylamide

N-(3-hydroxy-2,3-dihydro-1H-inden-5-yl)acrylamide (200 mg, 984 µmol) was dissolved in THF (12 ml). 3,4-difluorophenol (157 mg, 1.2 mmol) and triphenylphosphane (310 mg, 1.2 mmol) were added. The reaction mixture was cooled down to 0° C. before adding slowly DIAD (233 µl, 1.2 mmol) and stirred at RT for 4 h. The solvent was evaporated and the crude product was purified by column chromatography (silica gel, gradient cyclohexane/AcOEt 100/0 to 85/15), then by column chromatography (silica gel, gradient DCM/AcOEt 100/0 to 99/1) to obtain 33 mg of N-(3-(3,4-difluoro-phenoxy)-2,3-dihydro-1H-inden-5-yl) acrylamide as a white solid, yield 10%.

EXAMPLE 41

N-(3-(3-fluorophenoxy)-2,3-dihydro-1H-inden-5-yl) acrylamide

N-(3-hydroxy-2,3-dihydro-1H-inden-5-yl)acrylamide (150 mg, 738 µmol) was dissolved in THF (8 ml). 3-fluorophenol (80 µl, 886 µmol) and triphenylphosphane (232 mg, 886 µmop were added. The reaction mixture was cooled down to 0° C. before adding slowly DIAD (174 µl, 886 µmol) and stirred at RT for 4 h. The solvent was evaporated and the crude product was purified by column chromatography (silica gel, gradient cyclohexane/AcOEt 100/0 to 85/15) to obtain 250 mg which were solubilized in 10 ml MeCN/H$_2$O 50/50 and further purified by reverse phase chromatography (column CSH 250 mm×5 mm 5 µm, eluant H$_2$O (0.1% FA)/MeCN (0.1% FA), gradient 66/34 to 56/54) to obtain 51 mg of N-(3-(3-fluorophenoxy)-2,3-dihydro-1H-inden-5-yl)acrylamide as a white lyophilisate, yield 23%.

EXAMPLE 42

N-(3-(4-fluorophenoxy)-2,3-dihydro-1H-inden-5-yl) acrylamide

N-(3-hydroxy-2,3-dihydro-1H-inden-5-yl)acrylamide (150 mg, 738 µmol) was dissolved in THF (8 ml), 4-fluorophenol (99 mg, 886 µmol) and triphenylphosphane (237 mg, 886 µmop were added. The reaction mixture was cooled down to 0° C. before adding slowly DIAD (176 µl, 886 µmol) and stirred at RT for 24 h. The solvent was evaporated. 955 mg of the crude product was dissolved in 18 ml of (6 ml MeCN/12 ml MeOH) and purified by reverse phase chromatography (H$_2$O (0.1% FA)/MeCN, gradient 63/37 to 0/100). Fractions were combined, evaporated then lyophilized. 29.6 mg of N-(3-(4-fluorophenoxy)-2,3-dihydro-1H-inden-5-yl)acrylamide was isolated as a white lyophilisate, yield 14%.

EXAMPLE 43

N-(3-(3,5-difluorophenoxy)-2,3-dihydro-1H-inden-5-yl)acrylamide

N-(3-hydroxy-2,3-dihydro-1H-inden-5-yl)acrylamide (150 mg, 738 µmol) was dissolved in THF (8 ml). 3,5-difluorophenol (115 mg, 886 µmol) and triphenylphosphane (237 mg, 886 µmol) were added. The reaction mixture was cooled down to 0° C. before adding slowly DIAD (176 µl, 886 µmol) and stirred at RT for 24 h. The solvent was evaporated. 1.1 g of the crude product was dissolved in 7 ml of MeOH and purified by reverse phase chromatography (H$_2$O (0.1% FA)/MeCN, gradient 68/32 to 0/100). Fractions were combined, evaporated then lyophilized. 12 mg of N-(3-(3,5-difluorophenoxy)-2,3-dihydro-1H-inden-5-yl) acrylamide was isolated as a white lyophilisate, yield 5.2%.

EXAMPLE 44

N-(3-(2,4-difluorophenoxy)-2,3-dihydro-1H-inden-5-yl)acrylamide

N-(3-hydroxy-2,3-dihydro-1H-inden-5-yl)acrylamide (150 mg, 738 µmol) was dissolved in THF (8 ml). 2,4-difluorophenol (86 µl, 886 µmol) and triphenylphosphane (237 mg, 886 µmol) were added. The reaction mixture was cooled down to 0° C. before adding slowly DIAD (176 µl, 886 µmol) and stirred at RT for 24 h. The solvent was evaporated. 1 g of the crude product was dissolved in 12 ml of MeOH and purified by reverse phase chromatography (H$_2$O (0.1% FA)/MeCN, gradient 67/33 to 0/100). Fractions were combined, evaporated then lyophilized. 41.7 mg of N-(3-(2,4-difluorophenoxy)-2,3-dihydro-1H-inden-5-yl) acrylamide was isolated as a yellow lyophilisate, yield 18%.

EXAMPLE 45

N-(1-(3-(trifluoromethyl)phenoxy)-2,3-dihydro-1H-inden-5-yl)acrylamide

N-(1-hydroxy-2,3-dihydro-1H-inden-5-yl)acrylamide (60 mg, 295 µmol) was dissolved in THF (5 ml). 3-(trifluoromethyl)phenol (44 µl, 354 µmol) and triphenylphosphane (95 mg, 354 µmol) were added. The reaction mixture was cooled down to 0° C. before adding slowly DIAD (71 µl, 354 µmol) and stirred at RT for 24 h. The solvent was purified by column chromatography (silica gel, gradient cyclohexane/AcOEt 100/0 to 90/10), then by a subsequent column chromatography (silica gel, gradient DCM/AcOEt 100/0 to 99/1) to obtain 19 mg of N-(1-(3-(trifluoromethyl)phenoxy)-2,3-dihydro-1H-inden-5-yl)acrylamide as a white foam, yield 18%.

EXAMPLE 46

N-(1-(3-(trifluoromethoxy)phenoxy)-2,3-dihydro-1H-inden-5-yl)acrylamide

N-(1-hydroxy-2,3-dihydro-1H-inden-5-yl)acrylamide (250 mg, 1.23 mmol) was dissolved in DCM (14 ml). 3-(trifluoromethoxy)phenol (191 µl, 1.5 mmol) and triphenylphosphane (395 mg, 1.5 mmol) were added. The reaction mixture was cooled down to 0° C. before adding slowly DIAD (293 µl, 1.5 mmol) and stirred at RT for 3 h. The solvent was evaporated and the crude product was purified by column chromatography (silica gel, gradient cyclohexane/AcOEt 100/0 to 85/15), then by column chromatography (silica gel, gradient DCM/AcOEt 100/0 to 99/1) to obtain 170 mg of N-(1-(3-(trifluoromethoxy)-phenoxy)-2,3-dihydro-1H-inden-5-yl)acrylamide as a white solid, yield 38%.

EXAMPLE 47 methyl 3-[6-(prop-2-enoylamino)-2,3-dihydro-1H-inden-1-yl]oxybenzoate

N-(3-hydroxy-2,3-dihydro-1H-inden-5-yl)acrylamide (500 mg, 2.4 mmol) was dissolved in THF (12 ml). methyl 3-hydroxybenzoate (458 mg, 3 mmol) and triphenylphosphane (790 mg, 3 mmol) were added. The reaction mixture was cooled down to 0° C. before adding slowly DIAD (595 mg, 3 mmol) and stirred at RT overnight. The solvent was evaporated and the crude product was purified by column chromatography (silica gel, gradient cyclohexane/AcOEt 100/0 to 50/50) and further via reverse phase chromatography (C18 5 µm OBD 50×250 mm, eluant H$_2$O (0.1% FA)/MeCN, gradient from 67/33 to 0/100) to obtain 106 mg methyl 3-[6-(prop-2-enoylamino)-indan-1-yl]oxybenzoate as a white foam, yield 13%.

EXAMPLES 48 AND 49

Enantiomers 1 and 2 of N-(2-((3-fluorophenyl) amino)-2,3-dihydro-1H-inden-5-yl)acrylamide Chiral separation of N-(2-((3-fluorophenyl)amino)-2,3-dihydro-1H-inden-5-yl)acrylamide (example 31) was realized as follows:

570 mg of N-(2-((3-fluorophenyl)amino)-2,3-dihydro-1H-inden-5-yl)acrylamide were dissolved in 50 ml of heptane/EtOH 80/20 and purified by reverse chiral phase chromatography (column Chiralcel OD-I 20 µm, 350×76 mm, eluant heptane/EtOH 80/20). Fractions of each enantiomer were combined and evaporated.

A first enantiomer, designated "Enantiomer 1", was isolated as a white amorphous solid (254 mg, yield 45%) with 99.5% e.e.

A second enantiomer, designated "Enantiomer 2" was isolated as a white amorphous solid (237 mg, yield 42%) with 99.5% e.e.

EXAMPLES 50 AND 51

Enantiomers 1 and 2 of N-(2-((3-(trifluoromethyl) phenyl)amino)-2,3-dihydro-1H-inden-5-yl)acrylamide Chiral separation of N-(2-((3-trifluoromethyl)phenyl) amino)-2,3-dihydro-1H-inden-5-yl)acrylamide (example 32) was realized as follows:

360 mg of N-(2-((3-trifluoromethylphenyl)amino)-2,3-dihydro-1H-inden-5-yl)acrylamide were dissolved in 50 ml of heptane/EtOH 85/15 and purified by reverse chiral phase chromatography (column Chiralcel OD-I 20 µm, 350×76 mm, eluant heptane/EtOH 85/15, 400 ml/min). Fractions of each enantiomer were combined and evaporated, then lyophilized.

A first enantiomer, designated "Enantiomer 1", was isolated as a white amorphous solid (157 mg, yield 44%) with 99.5% e.e.

A second enantiomer, designated "Enantiomer 2" was isolated as a white amorphous solid (156 mg, yield 43%) with 99.5% e.e.

EXAMPLE 52

N-[2-[4-(trifluoromethyl)anilino]-2,3-dihydro-1H-inden-5-yl]acrylamide

To a solution of N-(2-aminoindan-5-yl)acrylamide (TFA salt) (105 mg, 331 µmol) in DCM (5 ml) and powdered molecular sieves 4 Å were added successively 4-(trifluoromethyl)-phenylboronic acid (126 mg, 661 µmop, triethylamine (500 µl, 3.307 mmol) and copper(II)acetate (120 mg, 661 µmol). The reaction mixture was stirred for 1 h at RT. After filtration on Dicalite, water and a few drops of an aqueous solution of NH$_3$ (33%) were added, followed by an extraction with DCM. Then the combined organic layer was washed with water and brine, filtered on a hydrophobic cartridge and concentrated at reduced pressure. The crude product was purified by column chromatography (SiO$_2$, cyclo-hexane/AcOEt 90/10 to 50/50) and a second column chromatography (SiO$_2$, DCM/AcOEt 100/0 to 90/1) to obtain 26 mg of N-[2-[4-(trifluoromethyl)anilino]-2,3-dihydro-1H-inden-5-yl]acrylamide as white solid, yield 23%.

EXAMPLE 53

N-(3-((3,5-difluorophenyl)amino)-2,3-dihydro-1H-inden-5-yl)acrylamide

N-(3-oxo-2,3-dihydro-1H-inden-5-yl)acrylamide (81 mg, 405 µmol) was dissolved in AcOEt (4 ml), 3,5-difluoroaniline (47 mg, 368 µmol) and TFA (54 µl, 736 µmol) were added. STAB (94 mg, 442 µmol) was added to the mixture in one portion. The reaction mixture was stirred at 25° C. overnight. An aqueous solution of NaOH 1N (10 ml) was added, followed by an extraction with AcOEt. Then the combined organic layer was washed with an aqueous saturated solution of NaCl, dried over Na$_2$SO$_4$, filtered and concentrated at reduced pressure. The crude product was purified by two subsequent identic column chromatographies (silica gel, gradient cyclohexane/AcOEt 90/10 to 50/5) to obtain 60 mg of a white foam, which was further purified by reverse phase chromatography (column WATERS Xselect CSH Prep C18 5 µm OBD, 50×250 mm, mobile phase A: H$_2$O+0.1% FA/B: MeCN, gradient 63/37 to 8/92) to obtain after lyophilization 16 mg of a white foam of N-(3-((3,5-difluorophenyl)amino)-2,3-dihydro-1H-inden-5-yl) acrylamide, yield 15%.

EXAMPLE 54

N-(1-((3-(pentafluoro-I6-sulfanyl)phenyl)amino)-2, 3-dihydro-1H-inden-5-yl)-acrylamide N-(1-oxo-2,3-dihydro-1H-inden-5-yl)acrylamide (725 mg, 3.57 mmol) was dissolved in AcOEt (20 ml) with powdered molecular sieves 4 Å 3-(pentafluoro-I6-sulfanyl) aniline (740 mg, 3.21 mmol), then TFA (495 µl, 6.40 mmol) were added. STAB (2.5 g, 7.8 mmol) was added to the mixture in two portions. The reaction mixture was stirred at 60° C. overnight. After filtration on Dicalite, the pH was adjusted to pH8 by adding an aqueous solution of NaOH 1N, followed by an extraction with DCM, dried over Na$_2$SO$_4$, filtered and concentrated at reduced pressure. The crude product was purified by column chromatography (silica gel, gradient cyclohexane/AcOEt 90/10 to 70/40) to obtain after trituration in diisopropylether 460 mg N-(1-((3-(pentafluoro-I6-sulfanyl)phenyl)amino)-hydro-1H-inden-5-yl) acrylamide as a white solid, yield 35%.

EXAMPLES 55 AND 56

Enantiomers 1 and 2 of N-(1-((4-(trifluoromethyl) phenyl)amino)-hydro-1H-inden-5-yl)acrylamide Chiral separation of N-(1-((4-trifluoromethylphenyl) amino)-2,3-dihydro-1H-inden-5-yl)acrylamide (example 10) was realized as follows:

400 mg of N-(1-((4-trifluoromethylphenyl)amino)-2,3-dihydro-1H-inden-5-yl)acrylamide were dissolved in 100 ml of heptane/EtOH 80/20 and purified by reverse chiral phase chromatography (Chiralpak AY 20 µm, 230×100 mm, eluant heptane/EtOH 80/20 to 50/50, 400 ml/min). Fractions of each enantiomer were combined and evaporated, then lyophilized.

A first enantiomer, designated "Enantiomer 1", was isolated as a white amorphous solid (191 mg, yield 48%) with 99.5% e.e.

A second enantiomer, designated "Enantiomer 2" was isolated as a white amorphous solid (183 mg, yield 46%) with 99.5% e.e.

EXAMPLES 57 AND 58

Enantiomers 1 and 2 of N-1-[[4-(trifluoromethyl) pyridin-2-yl]amino]-2,3-dihydro-1H-inden-5-yl] acrylamide Chiral separation of N-1-[[4-(trifluoromethyl)pyridin-2-yl]amino]-2,3-dihydro-1H-inden-5-yl]acrylamide (example 59 below) was realized as follows:

236 mg of N-1-[[4-(trifluoromethyl)pyridin-2-yl]amino]-2,3-dihydro-1H-inden-5-yl]acrylamide were dissolved in two portions of 100 ml of heptane/EtOH 80/20 and purified by reverse chiral phase chromatography (Chiralpak AY 20 μm, 230×100 mm, eluant heptane/EtOH 80/20 to 50/50, 400 ml/min). Fractions of each enantiomer were combined and evaporated, then lyophilized.

A first enantiomer, designated "Enantiomer 1", was isolated as a white amorphous solid (100 mg, yield 42%) with 99% e.e.

A second enantiomer, designated "Enantiomer 2" was isolated as a white amorphous solid (101 mg, yield 46%) with 99% e.e.

EXAMPLE 59

N-[1-[[4-(trifluoromethyl)pyrimidin-2-yl]amino]-2,3-dihydro-1H-inden-5-yl]acrylamide TFA salt To a suspension of N-(1-oxo-2,3-dihydro-1H-inden-5-yl)acrylamide (1.12 g, 5.29 mmol), molecular sieves (4 Å) and 4-(trifluoromethyl)pyridin-2-amine (0.8 g, 4.79 mmol) in AcOEt (30 ml), TFA (750 μl, 9.37 mmol) was added. After 10 minutes of stirring at RT, STAB (2.52 g, 11.54 mmol) was slowly added to the mixture (by portions). The reaction mixture was heated at reflux overnight. After cooling, the reaction mixture was filtered over dicalite, diluted with an aqueous solution of NaOH 1N followed by an extraction with AcOEt. Then the combined organic layer was washed with brine, dried over $Na_2SO_4$, filtered and concentrated under reduced pressure. The crude product was purified by column chromatography (silica gel, gradient cyclohexane/AcOEt 90/10 to 60/40) followed by a reverse phase chromatography (C18, gradient MeCN/$H_2O$+0.1% TFA) to obtain after crystallization in diisopropyl ether 70 mg of N-[1-[[4-(trifluoromethyl)-2-pyridyl]-amino]-2,3-dihydro-1H-inden-5-yl]acrylamide TFA salt as a white solid, yield 3.1%.

EXAMPLE 60

N-[1-[[6-(trifluoromethyl)pyridin-2-yl]amino]-2,3-dihydro-1H-inden-5-yl]acrylamide To a suspension of N-(1-oxo-2,3-dihydro-1H-inden-5-yl)acrylamide (1.1 g, 4.7 mmol), molecular sieves (4 Å) and 6-(trifluoromethyl)pyridin-2-amine (0.8 g, 4.69 mmol) in AcOEt (30 ml), TFA (750 μl, 9.37 mmol) was added. After 10 minutes stirring at RT, STAB (2.52 g, 11.54 mmol) was slowly added to the mixture (by portions). The reaction mixture was heated at reflux overnight. After cooling, the reaction mixture was filtered over dicalite and an aqueous solution of NaOH 1N was added to the filtrate, followed by an extraction with AcOEt. Then the combined organic layer was washed with brine, dried over $Na_2SO_4$, filtered and concentrated under vacuum. The crude product was purified twice by column chromatography (silica gel, gradient cyclohexane/AcOEt 90/10 to 70/30) to yield after crystallization in a mixture of diisopropylether/heptane 1/1 133 mg of N-[1-[[6-(trifluoromethyl)pyridin-2-yl]amino]-2,3-dihydro-1H-inden-5-yl]acrylamide as a white solid, yield 8%.

EXAMPLE 61

N-[1-[[5-(trifluoromethyl)pyridin-3-yl]amino]-2,3-dihydro-1H-inden-5-yl]acrylamide To a suspension of N-(1-oxo-2,3-dihydro-1H-inden-5-yl)acrylamide (1.1 g, 4.7 mmol), molecular sieves (4 Å) and 5-(trifluoromethyl)pyridin-3-amine (0.8 g, 4.69 mmol) in AcOEt (30 ml), TFA (720 μl, 9.31 mmol) was added. After 10 minutes stirring at RT, STAB (2.52 g, 11.54 mmol) was slowly added to the mixture (by portions). The reaction mixture was allowed to reflux overnight. After cooling, the reaction mixture was filtered over Dicalite and an aqueous solution of NaOH 1N was added to the filtrate, followed by an extraction with AcOEt. Then the combined organic layer was washed with brine, dried over $Na_2SO_4$, filtered and concentrated under vacuum. The crude product was purified twice by column chromatography (silica gel, gradient cyclohexane/AcOEt 90/10 to 60/40) followed by a reverse phase chromatography (C18, gradient MeCN/$H_2O$+0.1% FA) to obtain after cristallisation in a mixture of diisopropyl-ether/heptane 1/1 72 mg of N-[1-[[5-(trifluoromethyl)pyridin-3-yl]amino]-2,3-dihydro-1H-inden-5-yl]acrylamide as a white solid, yield 4.4%.

EXAMPLE 62

N-(1-(methyl(3-(trifluoromethyl)phenyl)amino)-2,3-dihydro-1H-inden-5-yl)acrylamide N-(1-oxo-2,3-dihydro-1H-inden-5-yl)acrylamide (250 mg, 1.24 mmol) was dissolved in AcOEt (8 ml), N-methyl-3-(trifluoromethyl)aniline (162 μl, 1.24 mmol) and TFA (283 μl, 3.73 mmol) were added. STAB (474 mg, 2.24 mmol) was added to the mixture in one portion. The reaction mixture was stirred for 3 h at 35° C. An aqueous solution of NaOH 1N (20 ml) was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 100/0 to 50/50) to obtain 200 mg N-(1-(methyl(3-(trifluoromethyl)phenyl)amino)-2,3-dihydro-1H-inden-5-yl)acrylamide as a white foam, yield 45%.

EXAMPLE 63

N-(1-(methyl(phenyl)amino)-2,3-dihydro-1H-inden-5-yl)acrylamide

N-(1-oxo-2,3-dihydro-1H-inden-5-yl)acrylamide (100 mg, 497 μmol) was dissolved in AcOEt (4 ml). N-methyl aniline (51 μl, 452 μmol) and TFA (69 μl, 904 μmol) were added. STAB (120 mg, 543 μmol) was added to the mixture in one portion. The reaction mixture was stirred for 3 h at 35° C. An aqueous solution of NaOH 1N (10 ml) was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 100/0 to 50/50) to obtain 60 mg of N-(1-(methyl(phenyl)amino)-2,3-dihydro-1H-inden-5-yl)acrylamide as a white foam, yield 45%.

EXAMPLE 64

N-(1-(methyl(4-(trifluoromethyl)phenyl)amino)-2,3-dihydro-1H-inden-5-yl)acrylamide N-(1-oxo-2,3-dihydro-1H-inden-5-yl)acrylamide (250 mg, 1.26 mmol) was dissolved in AcOEt (8 ml). N-methyl-4-(trifluoromethyl)aniline (162 µl, 1.14 mmol) and TFA (260 µl, 3.43 mmol) were added. STAB (435 mg, 2.06 mmol) was added to the mixture in one portion. The reaction mixture was stirred for 3 h at 35° C. An aqueous solution of NaOH 1N was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 100/0 to 50/50) to obtain 158 mg N-(1-(methyl(4-(trifluoromethyl)phenyl)amino)-2,3-dihydro-1H-inden-5-yl)acrylamide as a white solid, yield 38%.

EXAMPLE 65

N-(3,3-dimethyl-1-((3-(trifluoromethyl)phenyl)amino)-2,3-dihydro-1H-inden-5-yl)acrylamide N-(3,3-dimethyl-1-oxo-2,3-dihydro-1H-inden-5-yl)acrylamide (93 mg, 406 µmol) was dissolved in AcOEt (4 ml). 3-(trifluoromethyl)aniline (47 µl, 367 µmol) and TFA (90 µl, 1.11 mmol) were added. STAB (120 mg, 553 µmol) was added to the mixture in several portions. The reaction mixture was stirred for 4 h at RT. An aqueous solution of NaOH 1N (10 ml) was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 100/0 to 50/50) to obtain 26 mg of N-(3,3-dimethyl-1-((3-(trifluoromethyl)phenyl)amino)-2,3-dihydro-1H-inden-5-yl)acrylamide as a yellow gum, yield 19%.

EXAMPLE 66

N-(3,3-dimethyl-1-((4-(trifluoromethyl)phenyl)amino)-2,3-dihydro-1H-inden-5-yl)acrylamide N-(3,3-dimethyl-1-oxo-2,3-dihydro-1H-inden-5-yl)acrylamide (71 mg, 308 µmol) was dissolved in AcOEt (4 ml). 4-(trifluoro-methyl)aniline (108 µl, 923 µmol) and TFA (130 µl, 1.8 mmol) were added. STAB (220 mg, 1.11 mmol) was added to the mixture in several portions. The reaction mixture was stirred for 5 h at 40° C. An aqueous solution of NaOH 1N (10 ml) was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 100/0 to 50/50) to obtain 53 mg of N-(3,3-dimethyl-1-((4-(trifluoromethyl)phenyl)amino)-2,3-dihydro-1H-inden-5-yl)acrylamide as a white foam, yield 51%.

EXAMPLE 67

N-[7-fluoro-1-[3-(trifluoromethyl)anilino]-2,3-dihydro-1H-inden-5-yl]acrylamide

N-(7-fluoro-1-oxo-2,3-dihydro-1H-inden-5-yl)acrylamide (280 mg, 1.2773 mmol) was dissolved in AcOEt (12 ml), 3-(trifluoromethyl)aniline (160 µl, 1.2773 mmol) and TFA (160 µl, 2.5546 mmol) were added. STAB (324.86 mg, 1.5328 mmol) was added to the mixture in one portion. The reaction mixture was stirred for 2 h at 40° C. As all of the solid was not solubilized, additional TFA (100 µl, 1 eq) was added and stirring at 40° C. was continued for 5 h.

An aqueous solution of NaOH 1N (20 ml) was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 100/0 to 50/50) to obtain 182 mg N-[7-fluoro-1-[3-(trifluoromethyl)anilino]-2,3-dihydro-1H-inden-5-yl]acrylamide as a white foam, yield 39%.

EXAMPLE 68

N-[4-fluoro-1 [4-(trifluoromethyl)anilino]-2,3-dihydro-1H-inden-5-yl]acrylamide

N-(4-fluoro-1-oxo-2,3-dihydro-1H-inden-5-yl)acrylamide (130 mg, 0.93 mmol) was dissolved in AcOEt (6 ml), 4-(trifluoromethyl)aniline (74 µl, 0.93 mmol) and TFA (273 µl, 3.53 mmol) were added. STAB (453 mg, 2.136 mmol) was added to the mixture in several portions. The reaction mixture was stirred for 6 h at 40° C. An aqueous solution of NaOH 1N was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclo-hexane/AcOEt 100/0 to 50/50) to obtain 58 mg N-[4-fluoro-1-[4-(trifluoromethyl)anilino]-2,3-dihydro-1H-inden-5-yl]acrylamide as a white foam, yield 27%.

EXAMPLE 69

N-methyl-N-(1-((4-(trifluoromethyl)phenyl)amino)-2,3-dihydro-1H-inden-5-yl)acrylamide N-(1-((4-(trifluoromethyl)phenyl)amino-2,3-dihydro-1H-inden-5-yl)acrylamide (30 mg, 87 µmol) was dissolved in MeCN (1 ml). Cesium carbonate (56 mg, 173 µmol) was added followed by iodomethane (27 µl, 433 µmol). The reaction mixture was stirred for 2 h at 80° C. Water was added, followed by an extraction with AcOEt, the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 100/0 to 40/60) to obtain 10 mg of N-methyl-N-(1-((4-(trifluoromethyl)phenyl)amino)-2,3-dihydro-1H-inden-5-yl)acrylamide as a colorless oil, yield 32%.

EXAMPLE 70

N-(3-((4,4-difluorocyclohexyl)amino)-2,3-dihydro-1H-inden-5-yl)acrylamide

N-(3-amino-2,3-dihydro-1H-inden-5-yl)acrylamide (30 mg, 148 μmol) was dissolved in DCM (3 ml) with 4,4-difluorocyclohexan-1-one (22 mg, 163 μmop, AcOH (9 μl, 163 μmop and powdered molecular sieves 4 Å. Then STAB (50 mg, 223 μmol) was added and the reaction mixture was stirred for 24 h at RT. After filtration on Dicalite, an aqueous solution of NaOH 1N (5 ml) was added, followed by an extraction with DCM. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 100/0 to 50/50) to obtain 10 mg of N-(3-((4,4-difluorocyclohexyl)amino)-2,3-dihydro-1H-inden-5-yl)acrylamide as a white solid, yield 20%.

EXAMPLE 71

N-(3-((3-(trifluoromethyl)cyclopentyl)oxy)-2,3-dihydro-1H-inden-5-yl)-acrylamide To a solution of N-(3-hydroxy-2,3-dihydro-1H-inden-5-yl)acrylamide (200 mg, 1.0 mmol) and 3-(trifluoromethyl)cyclopentan-1-ol (455 mg, 3.00 mmol) in DCM (15 ml) was added boron trifluoride diethyl etherate (0.2 ml, 1.40 mmol) at 0° C., and the mixture was stirred at 0° C. for 2 h. An aqueous solution of $NaHCO_3$ 1N was added, the organic phase was separated, dried over $Na_2SO_4$, filtered and concentrated at reduced pressure. The residue was purified by column chromatography ($SiO_2$, DCM/AcOEt, 100/0 to 97/3) to obtain of a mixture of diastereoisomers (LCMS 85/15%). This crude product was purified by SFC (column IA: 250 mm*30 mm; mobile phase: [A: CO2, B: MeOH/ 0.1% DEA] to obtain 100 mg of a colorless resin N-(3-((3-(trifluoromethyl)cyclopentyl)oxy)-2,3-dihydro-1H-inden-5-yl)acrylamide, yield 30%.

EXAMPLE 72

N-(3-((5,5,5-trifluoropentyl)oxy)-2,3-dihydro-1H-inden-5-yl)acrylamide

To a solution of N-(3-hydroxy-2,3-dihydro-1H-inden-5-yl)acrylamide (200 mg, 0.5 mmol) and 5,5,5-trifluoropentan-1-ol (420 mg, 3 mmol) in DCM (15 ml) at 0° C. was added boron trifluoride diethyl etherate (0.2 ml, 1.4 mmol). The mixture was stirred at 0° C. for 2 h. An aqueous solution of $NaHCO_3$ 1N was added, the organic phase was separated, dried over $Na_2SO_4$, filtered and concentrated at reduced pressure. The residue was purified by column chromatography ($SiO_2$, DCM/AcOEt, 100/0 to 99/1) to obtain 170 mg of N-(3-((5,5,5-trifluoropentyl)oxy)-2,3-dihydro-1H-inden-5-yl)acrylamide as white solid, yield 53%.

EXAMPLE 73

N-(3-(4,4-difluorobutoxy)-2,3-dihydro-1H-inden-5-yl)acrylamide

To a solution of N-(3-hydroxy-2,3-dihydro-1H-inden-5-yl)acrylamide (134 mg, 0.64 mmol) and 4,4-difluorobutan-1-ol (230 mg, 1.98 mmol) in DCM (15 ml) at 0° C. was added boron trifluoride diethyl etherate (0.127 ml, 0.99 mmol). The mixture was stirred at 0° C. for 2 h. An aqueous solution of $NaHCO_3$ 1N was added, the organic phase was separated, dried over $Na_2SO_4$, filtered and concentrated at reduced pressure. The residue was purified by column chromatography ($SiO_2$, DCM/MeOH, 100/0 to 99/1) to obtain 65 mg of N-(3-(4,4-difluorobutoxy)-2,3-dihydro-1H-inden-5-yl)acrylamide as a white solid, yield 33%.

EXAMPLE 74

N-(3-(2,2,2-trifluoroethoxy)-2,3-dihydro-1H-inden-5-yl)acrylamide

To a solution of N-(3-hydroxy-2,3-dihydro-1H-inden-5-yl)acrylamide (130 mg, 0.64 mmol) and 2,2,2-trifluoroethanol (0.142 ml, 1.92 mmol) in DCM (15 ml) at 0° C. was added boron trifluoride diethyl etherate (0.123 ml, 0.96 mmol). The mixture was stirred at 0° C. for 2 h. An aqueous solution of $NaHCO_3$ 1N was added, the organic phase was separated, dried over $Na_2SO_4$, filtered and concentrated at reduced pressure. The residue was purified by column chromatography ($SiO_2$, DCM/MeOH, 100/0 to 99/1) to obtain 30 mg of N-(3-(2,2,2-trifluoroethoxy)-2,3-dihydro-1H-inden-5-yl)acrylamide as a white solid, yield 16%.

EXAMPLE 75

N-(3-(3,3,3-trifluoropropoxy)-2,3-dihydro-1H-inden-5-yl)acrylamide

To a solution of N-(3-hydroxy-2,3-dihydro-1H-inden-5-yl)acrylamide (100 mg, 0.5 mmol) and 4-fluoro-1-butanol (0.160 ml, 1.9 mmol) in DCM (15 ml) at 0° C. was added boron trifluoride diethyl etherate (0.080 ml, 1.5 mmol). The mixture was stirred at 0° C. for 5 h. An aqueous solution of $NaHCO_3$ 1N was added, the organic phase was separated, dried over $Na_2SO_4$, filtered and concentrated at reduced pressure. The residue was purified by column chromatography ($SiO_2$, DCM/MeOH, 100/0 to 99/1) to obtain 70 mg of N-(3-(2,2,2-trifluoropropoxy)-2,3-dihydro-1H-inden-5-yl)acrylamide as a white powder, yield 47%.

EXAMPLE 76

N-methyl-N-(1-((4-(trifluoromethyl)cyclohexyl)oxy)-2,3-dihydro-1H-inden-5-yl)acrylamide To a solution of N-(1-hydroxy-2,3-dihydro-1H-inden-5-yl)-N-methylacrylamide (53 mg, 0.24 mmol) and 4-(trifluoromethyl)cyclohexanol (0.10 ml, 0.73 mmol) in DCM (5 ml) at 0° C. was add boron trifluoride diethyl etherate (0.04 ml, 0.34 mmol). The mixture was stirred at 0° C. for 2 h. An aqueous solution of $NaHCO_3$ 1N was added, the organic phase was separated, dried over $Na_2SO_4$, filtered and concentrated at reduced pressure. The residue was purified by column chromatography ($SiO_2$, DCM/MeOH, 100/0 to 99/1) to obtain 39 mg of an isomeric mixture (74/26) of N-methyl-N-(1-((4-(trifluoromethyl)cyclohexyl)oxy)-2,3-dihydro-1H-inden-5-yl)acrylamide as a colorless gum, yield 47%.

EXAMPLE 77

N-(3-(4-chlorophenoxy)-2,3-dihydro-1H-inden-5-yl)acrylamide

N-(3-hydroxy-2,3-dihydro-1H-inden-5-yl)acrylamide (217 mg, 1.07 mmol) was dissolved in DCM (15 ml) under N₂. 4-chlorophenol (168 mg, 1.28 mmol) and triphenylphosphane (343 mg, 1.28 mmol) were added. The reaction mixture was cooled down to 0° C. before adding slowly DIAD (255 µl, 1.28 mmol) solubilized in DCM (5 ml) and stirred 20 min at 0° C. then RT overnight. The solvent was evaporated and the crude product was purified by column chromatography (SiO₂, gradient DCM/AcOEt 100/0 to 98/2) and reverse phase chromatography (column: Phenomenex Gemini-NX C18 75×30 mm 3 µm; mobile phase: [A: H₂O (0.225% FA) B: MeCN]; gradient B %: 50%-80%, 7 min) to obtain 17 mg of N-(3-(4-chlorophenoxy)-2,3-dihydro-1H-inden-5-yl)acrylamide as a white foam, yield 5%.

EXAMPLE 78

N-(3-(3-chlorophenoxy)-2,3-dihydro-1H-inden-5-yl)acrylamide

N-(3-hydroxy-2,3-dihydro-1H-inden-5-yl)acrylamide (214 mg, 1.05 mmol) was dissolved in DCM (15 ml) under N₂. 3-chlorophenol (130 µl, 1.26 mmol) and triphenylphosphane (343 mg, 1.28 mmol) were added. The reaction mixture was cooled down to 0° C. before adding slowly DIAD (251 µl, 1.28 mmol) solubilized in DCM (5 ml) and stirred 20 min at 0° C. and then at RT overnight. The solvent was evaporated and the crude product was purified by column chromatography (SiO₂, gradient DCM/AcOEt 100/0 to 98/2) and reverse phase chromatography (column: Phenomenex Gemini-NX C18 75×30 mm 3 µm; mobile phase: [A: H₂O (0.225% FA) B: MeCN]; gradient B %: 50%-80%, 7 min) to obtain 34 mg of N-(3-(3-chlorophenoxy)-2,3-dihydro-1H-inden-5-yl)acrylamide as a gum, yield 10%.

EXAMPLE 79

N-(3-(m-tolyloxy)-2,3-dihydro-1H-inden-5-yl)acrylamide

N-(3-hydroxy-2,3-dihydro-1H-inden-5-yl)acrylamide (200 mg, 0.98 mmol) was dissolved in 10 ml anhydrous THF under nitrogen. m-cresol (130 mg, 130 µl, 1.18 mmol), triphenylphosphane (316 mg, 1.18 mmol) were added. The reaction mixture was cooled down to 0° C. before adding slowly DIAD (230 µl, 1.2 mmol) solubilized in THF (5 ml) and stirred 20 min at 0° C. and then at RT overnight. The solvent was evaporated and the crude product was purified by column chromatography (SiO₂, gradient DCM/AcOEt 100/0 to 98/2) and reverse phase chromatography (column: Phenomenex Gemini-NX C18 75×30 mm 3 µm; mobile phase: [A: H₂O (0.225% FA) B: MeCN]; gradient B %: 50%-80%, 7 min) to obtain 20 mg of N-(3-(m-tolyloxy)-2,3-dihydro-1H-inden-5-yl)acrylamide, as a white foam, yield 7%.

EXAMPLE 80

N-(3-(3-(methylthio)phenoxy)-2,3-dihydro-1H-inden-5-yl)acrylamide

N-(3-hydroxy-2,3-dihydro-1H-inden-5-yl)acrylamide (200 mg, 0.984 mmol) was dissolved in THF (10 ml) under N₂. 3-(methylsulfanyl)phenol (174 mg, 1.24 mmol) and triphenylphosphane (316 mg, 1.2 mmol) were added. The reaction mixture was cooled down to 0° C. before adding slowly DIAD (240 µl, 1.18 mmol) solubilized in THF (5 ml) and stirred 20 min at 0° C. and then at RT overnight. The solvent was evaporated and the crude product was purified by reverse phase chromatography (column: Phenomenex Gemini-NX C18 75×30 mm 3 µm; mobile phase: [A: H₂O (0.225% FA) B: MeCN]; gradient B %: 50%-80%, 7 min) to obtain 24 mg of N-(3-(3-(methylthio)phenoxy)-2,3-dihydro-1H-inden-5-yl)acrylamide as a gum, yield 8%.

EXAMPLE 81

N-(3-(3-cyclopropylphenoxy)-2,3-dihydro-1H-inden-5-yl)acrylamide

N-(3-hydroxy-2,3-dihydro-1H-inden-5-yl)acrylamide (207 mg, 1.02 mmol) was dissolved in THF (10 ml) under nitrogen atmosphere. 3-cyclopropylphenol (172 mg, 1.22 mmol) and triphenylphosphane (327 mg, 1.22 mmol) were added. The reaction mixture was cooled down to 0° C. before adding slowly DIAD (0.24 ml, 1.2 mmol) solubilized in THF (5 ml) and stirred 20 min at 0° C. and then at RT for 24 h. The solvent was evaporated and the crude product was purified by column chromatography (silica gel, gradient DCM/MeOH 100/0 to 97/3) and further via reverse phase chromatography (column: Phenomenex Gemini-NX C18 75×30 mm 3 µm; mobile phase: [A: H₂O (0.225% FA) B: MeCN]; gradient B %: 50%-80%, 7 min) to obtain 9 mg of N-(3-(3-cyclopropylphenoxy)-2,3-dihydro-1H-inden-5-yl)acrylamide as a gum, yield 3%.

EXAMPLE 82

N-(1-(4-(trifluoromethyl)phenoxy)-2,3-dihydro-1H-inden-5-yl)acrylamide

N-(3-hydroxy-2,3-dihydro-1H-inden-5-yl)acrylamide (200 mg, 0.984 µmol) was dissolved in THF (10 ml) under nitrogen atmosphere. 3-(trifluoromethyl)phenol (168 mg, 0.984 µmop and triphenylphosphane (316 mg, 1.18 mmol) were added. The reaction mixture was cooled down to 0° C. before adding slowly DIAD (0.24 ml, 1.2 mmol) solubilized in THF (5 ml) and stirred 20 min at 0° C. and then at RT for 24 h. The solvent was evaporated and the crude product was purified by column chromatography (silica gel, gradient DCM/MeOH 100/0 to 98/2) to obtain 80 mg of N-(1-(4-(trifluoromethyl)phenoxy)-2,3-dihydro-1H-inden-5-yl)acrylamide as a white solid, yield 23%.

EXAMPLE 83

N-methyl-N-(1-(4-(trifluoromethyl)phenoxy)-2,3-dihydro-1H-inden-5-yl)acrylamide

To a solution of N-(1-(4-(trifluoromethyl)phenoxy)-2,3-dihydro-1H-inden-5-yl)acrylamide (100 mg, 288 µmol, see example 82) in 3 ml anhydrous DMF at 0° C. was added NaH (60% in mineral oil, 14 mg, 345 µmol). The temperature was allowed to rise to RT, the reaction mixture was stirred for 10 min at RT, then cooled again to 0° C. before adding slowly iodomethane (30 µl, 432 µmol). The reaction mixture was allowed to rise RT and stirred 3 h at RT. The reaction mixture was cooled to 0° C., ice cold water was added followed by an extraction with AcOEt. Then the combined organic layer was washed with water and an aqueous saturated solution of NaCl, dried over Na₂SO₄, filtered and concentrated at reduced pressure. The crude product was purified by column chromatography (silica gel, gradient cyclohexane/AcOEt 90/10 to 70/30) to obtain 50 mg of N-methyl-N-(1-(4-(trifluoromethyl)phenoxy)-2,3-dihydro-1H-inden-5-yl)acrylamide as a yellow gum, yield 48%.

EXAMPLES 84 AND 85

Enantiomers 1 and 2 of N-(1-(3-(trifluoromethyl)phenoxy)-2,3-dihydro-1H-inden-5-yl)acrylamide Chiral separation of N-(1-(3-(trifluoromethyl)phenoxy)-2,3-dihydro-1H-inden-5-yl)acrylamide (example 45) was realized as follows:

300 mg of N-(2-((3-trifluorophenyl)amino)-2,3-dihydro-1H-inden-5-yl)acrylamide were dissolved in 50 ml of EtOH and purified by reverse chiral phase chromatography (column Chiralcel OD-I 20 µm, 350×76 mm, eluant heptane/EtOH 90/10, 400 ml/min). Fractions of each enantiomer were combined and evaporated, then lyophilized.

A first enantiomer, designated "Enantiomer 1", was isolated as a white amorphous solid (132 mg, yield 44%) with 99.5% e.e.

A second enantiomer, designated "Enantiomer 2" was isolated as a white amorphous solid (126 mg, yield 42%) with 99.5% e.e.

EXAMPLES 86 AND 87

Enantiomers 1 and 2 of N-(3-(4-(trifluoromethyl)phenoxy)-2,3-dihydro-1H-inden-5-yl)acrylamide N-(3-hydroxy-2,3-dihydro-1H-inden-5-yl)acrylamide (600 mg, 2.95 mmol) was dissolved in THF (30 ml) under $N_2$. 4-(trifluoromethyl)phenol (605 mg, 3.54 mmol) and triphenylphosphane (948 mg, 3.54 mmol) were added. The reaction mixture was cooled down to 0° C. before adding slowly DIAD (704 µl, 3.54 mmol) solubilized in DCM (5 ml) and stirred 20 min at 0° C. and then at RT for 4 h. The solvent was evaporated and the crude product was purified by column chromatography ($SiO_2$, gradient DCM/AcOEt 100/0 to 98/2) to obtain 290 mg of a mixture of two isomers which were separated by chiral SFC chromatography (column IB-N5 30×250 mm, mobile phase A: CO2, B: MeOH (0.1% diethylamine), A/B 80/20) to obtain after lyophilization 120 mg of enantiomer 1 of N-(3-(4-(trifluoromethyl)phenoxy)-2,3-dihydro-1H-inden-5-yl)acrylamide as an amorphous white solid, 11% yield and 95 mg of enantiomer 2 of N-(3-(4-(trifluoro-methyl)phenoxy)-2,3-dihydro-1H-inden-5-yl)acrylamide as an amorphous white solid, 9% yield.

EXAMPLE 88

N-[3-[[5-(trifluoromethyl)pyridin-2-yl]oxy]-2,3-dihydro-1H-inden-5-yl]acrylamide N-(3-hydroxy-2,3-dihydro-1H-inden-5-yl)acrylamide (202 mg, 1.00 mmol) was dissolved in THF (10 ml) under $N_2$. 2-hydroxy-5-(trifluoromethyl)pyridine (201 mg, 1.20 mmol) and triphenylphosphane (313 mg, 1.20 mmol) were added. The reaction mixture was cooled down to 0° C. before adding slowly DIAD (235 µl, 1.20 mmol) solubilized in THF (5 ml) and stirred 20 min at 0° C. then RT overnight. The solvent was evaporated and the crude product was purified by column chromatography ($SiO_2$, gradient DCM/AcOEt 100/0 to 97/3) to obtain 130 mg of N-[3-[[5-(trifluoromethyl)-pyridin-2-yl]oxy]-2,3-dihydro-1H-inden-5-yl]acrylamide as a white solid, yield 38%.

EXAMPLE 89

N-methyl-N-(1-(3-(trifluoromethyl)phenoxy)-2,3-dihydro-1H-inden-5-yl)-acrylamide To a solution of N-(1-(3-(trifluoromethyl)phenoxy)-2,3-dihydro-1H-inden-5-yl)acrylamide (100 mg, 288 µmol, example 45) in 3 ml anhydrous DMF at 0° C. was added NaH (60% in mineral oil) (14 mg, 345 µmol). The temperature was allowed to rise to RT, stirred for 10 min at RT, then cooled down again to 0° C. before adding slowly iodomethane (30 µl, 432 µmol). The reaction mixture was allowed to rise RT and stirred 3 h at RT. The reaction mixture was cooled to 0° C., ice cold water was added followed by an extraction with AcOEt. Then the combined organic layer was washed with water and an aqueous saturated solution of NaCl, dried over $Na_2SO_4$, filtered and concentrated at reduced pressure. The crude product was purified by column chromatography (silica gel, gradient cyclohexane/AcOEt 90/10 to 70/30) to obtain 83 mg of N-methyl-N-(1-(3-(trifluoromethyl)phenoxy)-2,3-dihydro-1H-inden-5-yl)acrylamide as a colorless gum, yield 80%.

EXAMPLE 90

N-[2-fluoro-3-[4-(trifluoromethyl)anilino]-2,3-dihydro-1H-inden-5-yl]acrylamide

N-(2-fluoro-3-oxo-2,3-dihydro-1H-inden-5-yl)acrylamide (37 mg, 169 µmol, synthesis described in example 91) was dissolved in AcOEt (3 ml). 4-(trifluoromethyl)aniline (42 µl, 338 µmol) and TFA (38 µl, 506 µmol) were added. STAB (112 mg, 506 µmol) was added to the mixture in several portions. The reaction mixture was stirred for 6 h at 35° C. An aqueous solution of NaOH 1N was added, followed by an extraction with AcOEt. Then the combined organic layer was washed with an aqueous saturated solution of NaCl, dried over $Na_2SO_4$, filtered and concentrated at reduced pressure. The crude product was purified by column chromatography (silica gel, gradient cyclohexane/AcOEt 100/0 to 50/50) to obtain 19 mg of N-[2-fluoro-3-[4-(trifluoromethyl)-anilino]-2,3-dihydro-1H-inden-5-yl]acrylamide as a white solid, yield 31%.

EXAMPLE 91

N-(2-fluoro-3-((3-(trifluoromethyl)phenyl)amino)-2,3-dihydro-1H-inden-5-yl)acrylamide

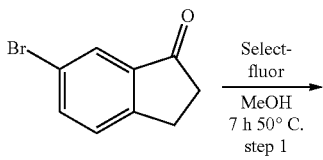

step 1

47

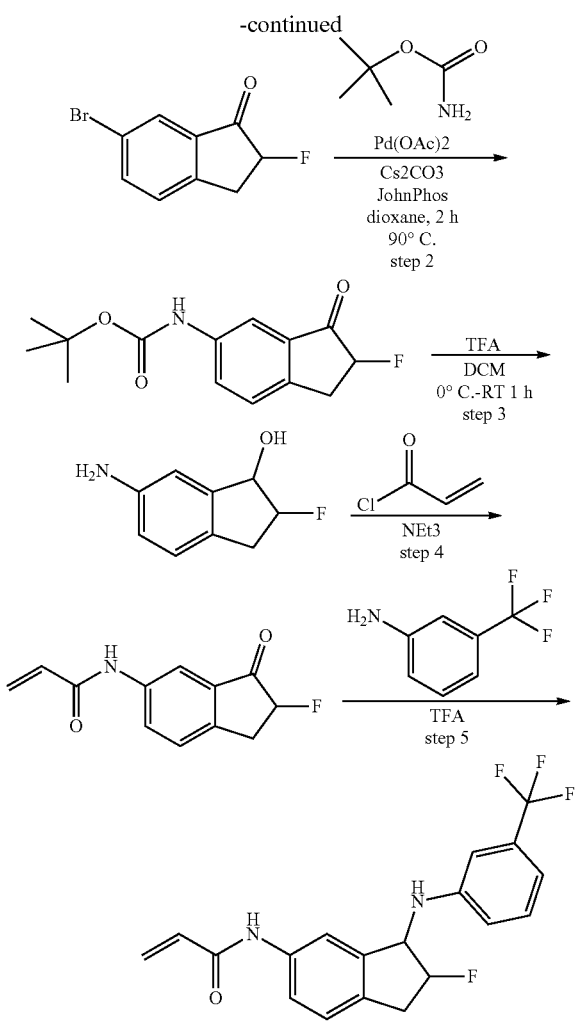

Step 1: Synthesis of 6-bromo-2-fluoro-2,3-dihydro-1H-inden-1-one 6-bromo-indanone (2 g, 9.5 mmol) was dissolved in anhydrous MeOH (80 ml). Selectfluor (4 g, 11 mmol) was added. The reaction mixture was stirred for 7 h at 50° C. The solvent was evaporated at reduced pressure. DCM was added and insoluble material was filtered. The organic layer was washed with a saturated aqueous solution of NaHCO$_3$, dried over Na$_2$SO$_4$, filtered and concentrated at reduced pressure. The crude product was purified by column chromatography (silica gel, gradient cyclohexane/DCM 100/0 to 92/8) to obtain 220 mg of 6-bromo-2-fluoro-2,3-dihydro-1H-inden-1-one as a white solid, yield 10%.

Step 2: Synthesis of tert-butyl (2-fluoro-3-oxo-2,3-dihydro-1H-inden-5-yl)carbamate A microwave tube equipped with a magnetic stirring bar was charged with 6-bromo-2-fluoro-2,3-dihydro-1H-inden-1-one (100 mg, 437 µmop, tert-butyl carbamate (63 mg, 524 µmol) and cesium carbonate (203 mg, 611 µmol). Anhydrous 1,4-dioxane (2 ml) was added and the mixture was charged with nitrogen gas. JohnPhos (14 mg, 44 µmol) and palladium (II) acetate (5 mg, 22 µmol) were added. Then the microwave tube was sealed and the reaction mixture was stirred for 2 h at 90° C. in a sand bath. The reaction mixture was poured into water after cooling down to RT and extracted with AcOEt several times. The combined organic layer was washed with an aqueous saturated solution of NaCl, dried over Na$_2$SO$_4$, filtered and concentrated at reduced pressure. The crude product was purified by column chromatography (silica gel, gradient DCM/AcOEt 100/0 to 0/100) to obtain 50 mg of tert-butyl (2-fluoro-3-oxo-2,3-dihydro-1H-inden-5-yl)carbamate as a brown oil, yield 43%.

Step 3: Synthesis of 6-amino-2-fluoro-2,3-dihydro-1H-inden-1-one

A solution of tert-butyl (2-fluoro-3-oxo-2,3-dihydro-1H-inden-5-yl)carbamate (50 mg, 189 µmol) in DCM (3 ml) was cooled down to 0° C. before adding slowly TFA (365 µl, 4.71 mmol) and stirred at RT for 1 h. The reaction mixture was diluted with DCM. An aqueous solution of 1N NaOH was added, followed by extraction with DCM several times. The combined organic layer was washed with brine, dried over Na$_2$SO$_4$, filtered and concentrated at reduced pressure. The crude product, 6-amino-2-fluoro-2,3-dihydro-1H-inden-1-one was used for the next step without further purification.

Step 4: Synthesis of N-(2-fluoro-3-oxo-2,3-dihydro-1H-inden-5-yl)acrylamide 6-amino-2-fluoro-2,3-dihydro-1H-inden-1-one (31 mg, 188 µmol) was dissolved in THF (1.5 ml). Triethylamine (34 µl, 244 µmol) was added. The reaction mixture was cooled down to 0° C. before adding slowly acryloyl chloride (21 µl, 244 µmol) and stirred at RT for 1 h. The reaction mixture was diluted with AcOEt. A saturated aqueous solution of NaHCO$_3$ was added, followed by extraction with AcOEt several times. Then the combined organic layer was washed with an aqueous saturated solution of NaCl, dried over Na$_2$SO$_4$, filtered and concentrated at reduced pressure. The crude product was purified by column chromatography (silica gel, gradient cyclohexane/AcOEt 100/0 to 75/25 to obtain 20 mg of N-(2-fluoro-3-oxo-2,3-dihydro-1H-inden-5-yl)acrylamide as a white solid, yield 49%.

Step 5: Synthesis of N-(2-fluoro-3-((3-trifluoromethyl)phenyl)amino)-2,3-dihydro-1H-inden-5-yl) acrylamide N-(2-fluoro-3-oxo-2,3-dihydro-1H-inden-5-yl)acrylamide (20 mg, 91 µmol) was dissolved in AcOEt (1.5 ml). 3-trifluoromethylaniline (11 µl, 91 µmol) and TFA (21 µl, 274 µmol) were added. STAB (35 mg, 164 µmol) was added to the mixture in one portion. The reaction mixture was stirred for 4 h at 40° C. An aqueous solution of 1N NaOH was added, followed by extraction with AcOEt several times. Then the combined organic layer was washed with brine, dried over Na$_2$SO$_4$, filtered and concentrated at reduced pressure. The crude product was purified by column chromatography (silica gel, gradient cyclohexane/AcOEt 95/5 to 85/15) to obtain 9 mg of N-(2-fluoro-3-((3-trifluoromethyl)phenyl)amino)-2,3-dihydro-1H-inden-5-yl)acrylamide as a colorless oil, yield 27%.

EXAMPLE 92

N-[2-fluoro-3-[4-(trifluoromethyl)phenoxy]-2,3-dihydro-1H-inden-5-yl]acrylamide

N-(2-fluoro-3-hydroxy-indan-5-yl)acrylamide (40 mg, 181 µmol) was dissolved in THF (3 ml) under N$_2$. 4-(trifluoromethyl)phenol (37 mg, 217 µmol) and triphenyl-phosphane (60 mg, 217 µmol) were added. The reaction mixture was cooled down to 0° C. before adding slowly DIAD (45 µl, 217 µmol) solubilized in THF (5 ml) and stirred 20 min at 0° C. then RT overnight. The solvent was evaporated and the crude product was purified by column chromatography (SiO₂, gradient cyclohexane/AcOEt, 100/0 to 50/50) to obtain 50 mg of N-[2-fluoro-3-[4-(trifluoromethyl)phenoxy]indan-5-yl]acrylamide as a mixture which was further purified by a second column chromatography (SiO₂, gradient DCM/AcOEt, 100/0 to 90/10) to obtain 9 mg N-[2-fluoro-3-[4-(trifluoromethyl)-phenoxy]indan-5-yl]acrylamide as white solid, yield 13%.

EXAMPLE 93

N-methyl-N-(2-methyl-1-((3-(trifluoromethyl)phenyl)amino)-2,3-dihydro-1H-inden-5-yl)acrylamide

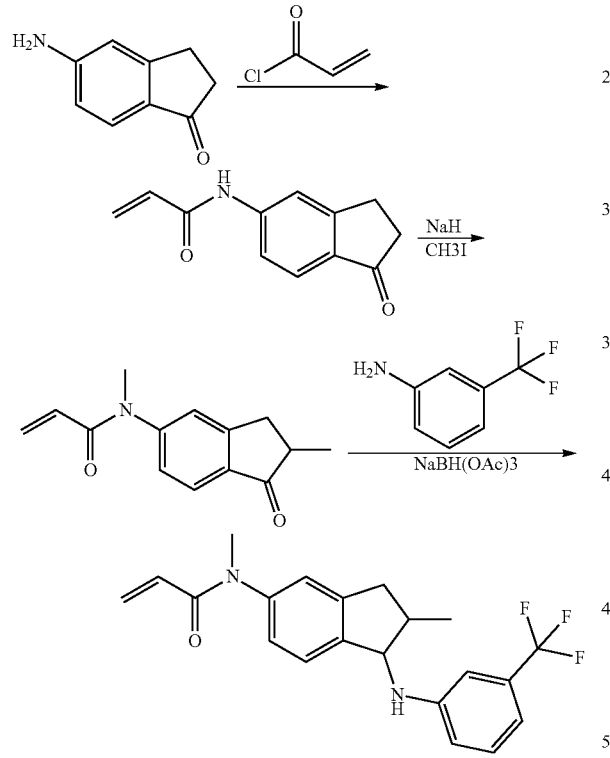

To a solution of N-(1-oxo-2,3-dihydro-1H-inden-5-yl)acrylamide (700 mg, 3.48 mmol) in 17 ml anhydrous DMF at 0° C. was added NaH (60% in mineral oil) (167 mg, 4.17 mmol). The temperature was allowed to rise to RT, stirred for 10 min at RT, then cooled down again to 0° C. before adding slowly iodomethane (432 µl, 6.96 mmol). The reaction mixture was allowed to rise RT and stirred 3 h at RT, adding 32 µl of iodomethane and stirred 2 h at RT. The reaction mixture was cooled to 0° C., ice cold water was added followed by an extraction with AcOEt. Then the combined organic layer was washed with water and an aqueous saturated solution of NaCl, dried over Na₂SO₄, filtered and concentrated at reduced pressure. The crude product was purified by column chromatography (silica gel, gradient cyclohexane/AcOEt 100/0 to 50/50) to obtain 110 mg of N-methyl-N-(2-methyl-1-oxo-2,3-dihydro-1H-inden-5-yl)acrylamide as gum, yield 15%.

N-methyl-N-(2-methyl-1-oxo-2,3-dihydro-1H-inden-5-yl)acrylamide (45 mg, 196 µmop was dissolved in AcOEt (1 ml). 3-(trifluoromethyl)aniline (29 µl, 236 µmol) and TFA (30 µl, 393 µmol) were added. STAB (50 mg, 236 µmol) was added to the mixture in one portion. The reaction mixture was stirred for 3 h at 35° C. An aqueous solution of NaOH 1N (20 ml) was added, followed by an extraction with AcOEt. Then the combined organic layer was washed with an aqueous saturated solution of NaCl, dried over Na₂SO₄, filtered and concentrated at reduced pressure. The crude product was purified by column chromatography (silica gel, gradient cyclohexane/AcOEt 90/10 to 40/60) to obtain 6 mg N-methyl-N-(2-methyl-1-((3-(trifluoromethyl)phenyl)amino)-2,3-dihydro-1H-inden-5-yl)acrylamide as a gum, yield 8%.

EXAMPLE 94

N-[(cis)-3-methoxy-1-[3-(trifluoromethyl)anilino]-2,3-dihydro-1H-inden-5-yl]acrylamide

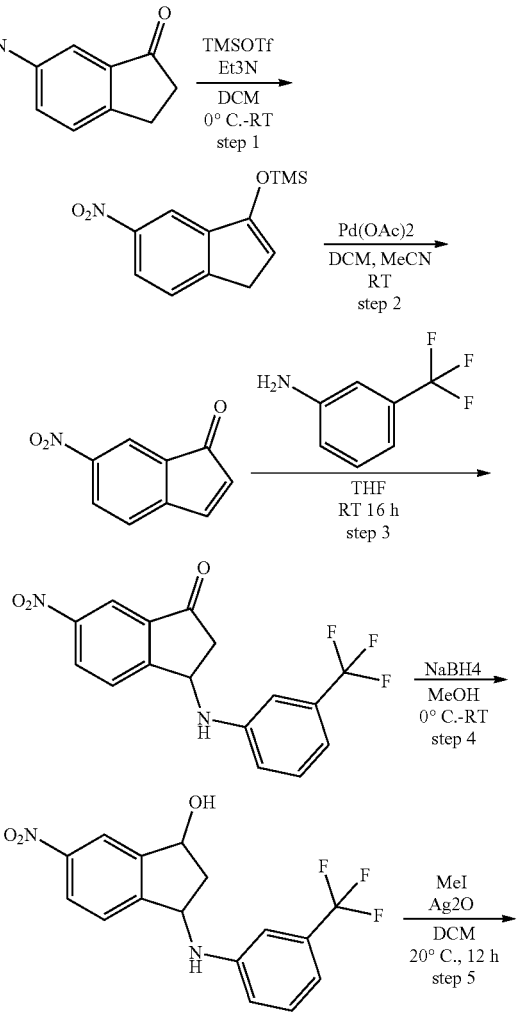

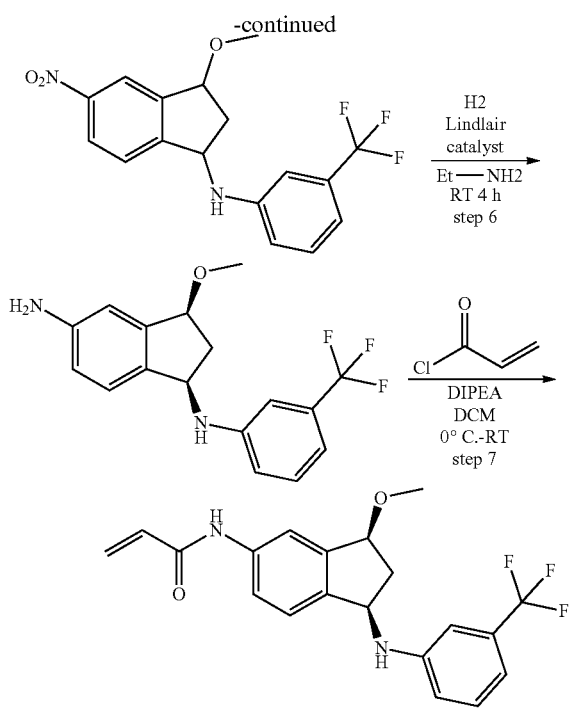

Step 1: Trimethyl-[(6-nitro-3H-inden-1-yl)oxy]silane

To a solution of 6-nitroindan-1-one (3 g, 16.9 mmol, 1 eq) and TEA (3.43 g, 33.9 mmol, 4.71 ml, 2 eq) in DCM (60 ml) was added trimethylsilyl trifluoromethanesulfonate (5.65 g, 25.4 mmol, 4.59 ml, 1.5 eq) at 0° C. and the mixture was stirred at 0° C. for 0.5 h. The reaction mixture was concentrated under vacuum at 30° C. to obtain a residue which was purified by column chromatography (SiO$_2$, Petroleum ether/AcOEt gradient 200/1 to 10/1) to obtain trimethyl-[(6-nitro-3H-inden-1-yl)oxy]silane (1.4 g, 5.61 mmol, 33% yield) as a yellow solid. $^1$H NMR (400 MHz, CDCl$_3$) δ=8.19 (d, J=2.0 Hz, 1H, Ar), 8.13 (dd, J=2.0, 8.0 Hz, 1H, Ar), 7.50 (d, J=8.0 Hz, 1H, Ar), 5.59 (t, J=2.4 Hz, 1H, CH), 3.39 (d, J=2.4 Hz, 2H, CH$_2$), 0.35 (s, 9H, CH$_3$).

Step 2: 6-nitroinden-1-one

To a mixture of Pd(OAc)$_2$ (3.69 g, 16.44 mmol, 1 eq) in MeCN (80 ml) was added a solution of trimethyl-[(6-nitro-3H-inden-1-yl)oxy]silane (4.1 g, 16.44 mmol, 1 eq) in DCM (40 ml) under N$_2$. The reaction bottle was aluminum foil-wrapped. The mixture was stirred at 20° C. for 4 hr. TLC indicated the reaction was completed. The reaction mixture was filtered and the filtrate was concentrated under vacuum to obtain a residue. The residue was purified by column chromatography (SiO$_2$, Petroleum ether/AcOEt=100/1 to 5/1) to obtain 6-nitroinden-1-one (2.2 g, 10.68 mmol, 64.93% yield, 85% purity) as a yellow solid. $^1$H NMR (400 MHz, CDCl$_3$) δ=8.34 (dd, J=2.0, 7.9 Hz, 1H, Ar), 8.26 (s, 1H, Ar), 7.73 (d, J=6.0 Hz, 1H, CHCH), 7.30 (d, J=7.9 Hz, Ar), 6.24 (d, J=6.0 Hz, 1H, CHCH).

Step 3: 6-Nitro-3-[3-(trifluoromethyl)anilino]indan-1-one

A mixture of 6-nitroinden-1-one (2.2 g, 12.56 mmol, 1 eq) and 3-(trifluoromethyl)aniline (4.05 g, 25.12 mmol, 3.14 ml, 2 eq) in THF (7 ml) was stirred at 20° C. for 12 hr. TLC indicated the reaction was completed. The reaction mixture was concentrated under vacuum to obtain a residue. The residue was purified by column chromatography (SiO$_2$, Petroleum ether/AcOEt=100/1 to 5/1) to obtain 6-nitro-3-[3-(trifluoromethyl)anilino]indan-1-one (2.4 g, 6.28 mmol, 50.00% yield, 88% purity) as a yellow solid. $^1$H NMR (400 MHz, CDCl$_3$) δ=8.62 (d, J=2.0 Hz, 1H, Ar), 8.54 (dd, J=2.0, 8.4 Hz, 1H, Ar), 7.91 (d, J=8.4 Hz, 1H, Ar), 7.37 (t, J=8.0 Hz, 1H, Ar), 7.10 (d, J=7.6 Hz, 1H, Ar), 6.95 (s, 1H, ArH), 6.87 (d, J=8.0 Hz, 1H, Ar), 5.36 (dt, J=3.6, 8.0 Hz, 1H, CH), 4.26 (d, J=8.8 Hz, 1H, ArNH), 3.41 (dd, J=7.2, 19.2 Hz, 1H, CH$_2$), 2.71 (dd, J=3.6, 19.2 Hz, 1H, CH$_2$). ES-MS m/z 337.3 [M+H]

Step 4: 6-Nitro-3-[3-(trifluoromethyl)anilino]indan-1-ol

To a solution of 6-nitro-3-[3-(trifluoromethyl)anilino]indan-1-one (1 g, 2.97 mmol, 1 eq) in MeOH (15 ml) was added NaBH$_4$ (225 mg, 5.95 mmol, 2 eq) in portions at 0° C. The mixture was stirred at 20° C. for 2 hr. TLC indicated the reaction was completed. The reaction mixture was quenched by addition 1N HCl (10 ml) at 0° C., then diluted with water (15 ml) and extracted with EtOAc (30 ml*2), dried over Na$_2$SO$_4$, filtered and concentrated under reduced pressure to obtain a residue. The residue was purified by column chromatography (SiO$_2$, Petroleum ether/AcOEt=100/1 to 3/1) to obtain 6-nitro-3-[3-(trifluoromethyl)anilino]-indan-1-ol (990 mg, 2.49 mmol, 83.65% yield, 85% purity) as a yellow solid. $^1$H NMR (400 MHz, CDCl$_3$) δ=8.33 (d, J=1.6 Hz, 1H, Ar), 8.18 (dd, J=2.0, 8.4 Hz, 1H, Ar), 7.53 (d, J=8.6 Hz, 1H, Ar), 7.34 (t, J=8.0 Hz, 1H, Ar), 7.06 (br d, J=8.0 Hz, 1H, Ar), 6.98 (s, 1H, Ar), 6.93-6.87 (m, 1H, Ar), 5.29 (t, J=6.8 Hz, 1H, CH), 4.99 (t, J=7.2 Hz, 1H, CH), 3.18 (td, J=6.8, 13.2 Hz, 1H, CH$_2$), 1.99-1.87 (m, 1H, CH$_2$). ES-MS m/z 339.3 [M+H]$^+$, Retention time: 2.347 min.

Step 5: 3-Methoxy-5-nitro-N-[3-(trifluoromethyl)phenyl]indan-1-amine

A mixture of 6-nitro-3-[3-(trifluoromethyl)anilino]indan-1-ol (990 mg, 2.93 mmol, 1 eq), MeI (830.78 mg, 5.85 mmol, 364.38 μl, 2 eq) and Ag$_2$O (3.39 g, 14.63 mmol, 5 eq) in DCM (10 ml) was stirred at 20° C. for 12 hr. TLC indicated the reaction was completed. The reaction mixture was filtered and the filtrate was concentrated under vacuum to obtain a residue. The residue was purified by column chromatography (SiO$_2$, Petroleum ether/AcOEt=100/1 to 5/1) to obtain 3-methoxy-5-nitro-N-[3-(trifluoromethyl)phenyl]indan-1-amine (690 mg, 1.84 mmol, 62.91% yield, 94% purity) was obtained as a yellow solid. $^1$H NMR (400 MHz, CDCl$_3$) δ=8.32 (d, J=2.0 Hz, 1H, Ar), 8.20 (dd, J=2.0, 8.4 Hz, 1H, Ar), 7.56 (d, J=8.4 Hz, 1H, Ar), 7.33 (t, J=8.0 Hz, 1H, Ar), 7.05 (d, J=7.6 Hz, 1H, Ar), 6.98 (s, 1H, Ar), 6.90 (br d, J=8.0 Hz, 1H, Ar), 5.02 (t, J=6.8 Hz, 1H, CH), 4.82 (t, J=6.0 Hz, 1H, CH), 3.52 (s, 3H, CH$_3$), 3.04 (td, J=6.8, 13.4 Hz, 1H, CH$_2$), 2.05-1.97 (m, 1H, CH$_2$). ES-MS m/z 353.4 [M+H]$^+$, Retention time: 1.014 min.

Step 6: 3-methoxy-N1-[3-(trifluoromethyl)phenyl]indane-1,5-diamine

To a solution of 3-methoxy-5-nitro-N-[3-(trifluoromethyl)phenyl]indan-1-amine (690 mg, 1.96 mmol, 1 eq) in AcOEt (6 ml) was added Lindlar catalyst (600 mg) under N$_2$ atmosphere. The suspension was degassed and purged with H₂ for 3 times. The mixture was stirred under H₂ (15 Psi) at 20° C. for 4 hr. TLC indicated the reaction was completed. The reaction mixture was filtered and the filtrate was concentrated under vacuum to obtain a residue. The residue was purified by column chromatography (SiO₂, Petroleum ether/AcOEt=100/1 to 3/1) to obtain 3-methoxy-N1-[3-(trifluoromethyl)phenyl]indane-1,5-diamine (350 mg, 977.28 μmol, 49.90% yield, 90% purity) as a yellow solid. ¹H NMR (400 MHz, DMSO-d₆) δ=7.27 (t, J=7.6 Hz, 1H, Ar), 6.96 (s, 1H, ArNH), 6.94 (br d, J=8.0 Hz, 2H, Ar), 6.80 (d, J=7.6 Hz, 1H, Ar), 6.59 (d, J=2.0 Hz, 1H, Ar), 6.52 (dd, J=2.0, 8.0 Hz, 1H, Ar), 6.35 (d, J=8.4 Hz, 1H, Ar), 5.06 (s, 2H, ArNH₂), 4.73 (q, J=7.2 Hz, 1H, CH), 4.64 (t, J=6.8 Hz, 1H, CH), 3.34-3.33 (m, 3H, CH₃), 2.94-2.87 (m, 1H, CH₂), 1.64-1.46 (m, 1H, CH₂).

Step 7: N-[(cis)-3-methoxy-1-[3-(trifluoromethyl) anilino]-2,3-dihydro-1H-inden-5-yl]acrylamide To a solution of 3-methoxy-N1-[3-(trifluoromethyl)phenyl]indane-1,5-diamine (400 mg, 1.24 mmol, 1 eq) in DCM (4 ml) was a solution of acryloyl chloride (124 mg, 1.37 mmol, 111.31 μl, 1.1 eq) in DCM (1.5 ml) at 0° C. Then the mixture was stirred at 0° C. for 0.5 h. LCMS showed the reaction was completed. The reaction mixture was poured into H₂O (10 ml) and extracted with EA (3×10 ml). The combined organic layer was washed with brine (20 ml), dried over Na₂SO₄, filtered and concentrated under reduced pressure to obtain a residue. The residue was purified by prep-HPLC (column: Phenomenex Gemini-NX C18 75*30 mm*3 um; mobile phase: [water (0.225% FA)-MeON]; B %: 45%-75%, 7 min) to obtain N-[(cis)-3-methoxy-1-[3-(trifluoromethyl)anilino]-2,3-dihydro-1H-inden-5-yl]acrylamide (235 mg, 623.76 μmol, 50.26% yield, 99.9% purity) as a yellow solid. ¹H NMR (400 MHz, DMSO-d₆) δ=10.19 (s, 1H, CONH), 7.84 (s, 1H, Ar), 7.52 (dd, J=1.6, 8.4 Hz, 1H, Ar), 7.33-7.27 (m, 1H, Ar), 7.23 (d, J=8.0 Hz, 1H, Ar), 7.00 (s, 1H, ArNH), 7.00-6.95 (m, 1H, Ar), 6.84 (d, J=7.6 Hz, 1H, Ar), 6.51 (d, J=8.4 Hz, 1H, Ar), 6.48-6.38 (m, 1H, CH₂CH), 6.31-6.21 (m, 1H, CHCH₂), 5.75 (dd, J=2.0, 10.0 Hz, 1H, CHCH₂), 4.89 (q, J=7.6 Hz, 1H, CH), 4.77 (t, J=6.8 Hz, 1H, CH), 3.39 (s, 3H, CH₃), 3.01 (td, J=6.8, 12.4 Hz, 1H, CH₂), 1.63 (td, J=7.6, 12.4 Hz, 1H, CH₂).

EXAMPLE 95

N-[(trans)-2-hydroxy-1-[3-(trifluoromethyl)anilino]-2,3-dihydro-1H-inden-5-yl]acrylamide

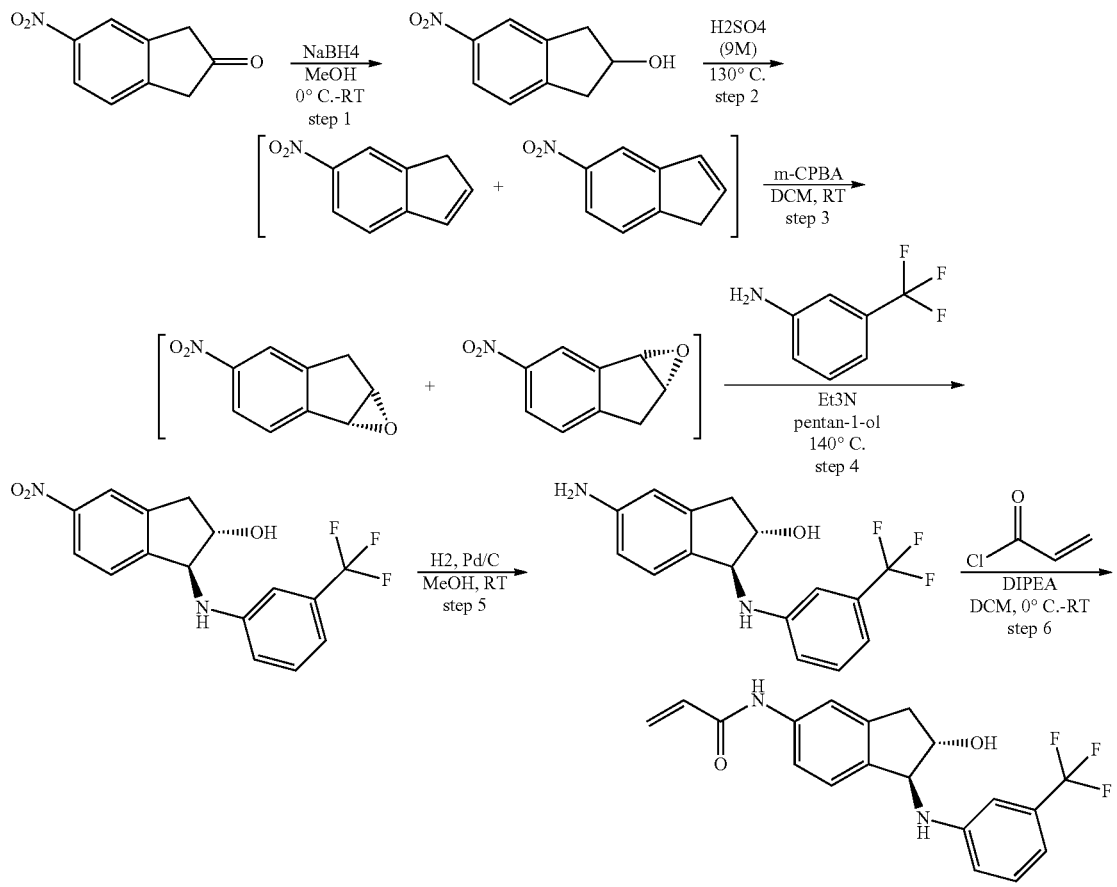

Step 1: 5-Nitro-2,3-dihydro-1H-inden-2-ol

To a solution of 5-nitroindan-2-one (13 g, 73.38 mmol, 1 eq) in MeOH (550 ml) was added in portions NaBH₄ (5.55 g, 146.76 mmol, 2 eq) at 0° C. The mixture was stirred at 0° C. for 1 h. TLC showed the reaction was completed. The mixture was poured into ice-cooled HCl solution (100 ml, 1 M). The aqueous phase was extracted with AcOEt (500 ml×3), dried over Na₂SO₄, filtered and concentrated under reduced pressure to obtain 5-nitroindan-2-ol (7.4 g, 41.32 mmol, 56.27% yield) as a black solid. ¹H NMR (400 MHz, CDCl₃) δ=8.07-8.04 (m, 2H, Ar), 7.36 (d, J=8.4 Hz, 1H, Ar), 4.82-4.78 (m, 1H, CH), 3.46 (s, 1H, OH), 3.31-3.23 (m, 2H, CH₂), 3.03-2.98 (m, 2H, CH₂)

Step 2: 5-Nitro-1H-indene; 6-Nitro-1H-indene

A mixture of 5-nitroindan-2-ol (2 g, 11.16 mmol, 1 eq) and H₂SO₄ (9 M, 80.00 ml, 64.50 eq) was stirred at 130° C. for 2 h. TLC showed the starting material remained and two new spots were detected. The mixture was extracted with AcOEt (50 ml×3). The organic phase was dried over Na₂SO₄, filtered and concentrated under reduced pressure to obtain the residue. The residue was purified by column chromatography (SiO₂, Petroleum ether/AcOEt=1/0 to 50/1) to obtain a mixture of 5-nitro-1H-indene and 6-nitro-1H-indene (750 mg, 4.65 mmol, 41.69% yield) as a white solid.

Step 3: (1aR,6aS)-4-nitro-6,6a-dihydro-1aH-indeno [1,2-b]oxirene and (1aS,6aR)-3-nitro-6,6a-dihydro-1aH-indeno[1,2-b]oxirene To a solution of 5-nitro-1H-indene and 6-nitro-1H-indene (1.80 g, 11.17 mmol, 1 eq) in DCM (40 ml) was added m-CPBA (4.82 g, 22.34 mmol, 80% purity, 2 eq). The mixture was stirred at 25° C. for 16 h. TLC showed the reaction was completed. The mixture was diluted with DCM (150 ml) and washed with saturated Na₂SO₃ solution (3×50 ml) and washed with saturated NaHCO₃ solution (80 ml). The organic phase was dried over Na₂SO₄, filtered and concentrated under reduced pressure to obtain a mixture cis-4-nitro-6,6a-dihydro-1aH-indeno[1,2-b]oxirene and cis-3-nitro-6,6a-dihydro-1 aH-indeno[1,2-b]oxirene (2 g, 10.73 mmol, 96% yield, 95% purity) as a yellow oil.

¹H NMR (400 MHz, CDCl₃) δ=8.36 (d, J=2.0 Hz, 1H, Ar), 8.18 (dd, J=2.0, 8.0 Hz, 1H, Ar), 8.13-8.11 (m, 2H, Ar), 7.65 (d, J=8.0 Hz, 1H, Ar), 7.39 (d, J=8.0 Hz, 1H, Ar), 4.37-4.33 (m, 2H, CHCH), 4.26-4.22 (m, 2H, CHCH), 3.33 (d, J=18.4 Hz, 2H, CH₂), 3.12-3.05 (m, 2H, CH₂).

Step 4: Trans-5-nitro-1-((3-(trifluoromethyl)phenyl) amino)-2,3-dihydro-1H-inden-2-ol and Trans-6-nitro-1-((3-(trifluoromethyl)phenyl)amino)-2,3-dihydro-1H-inden-2-ol

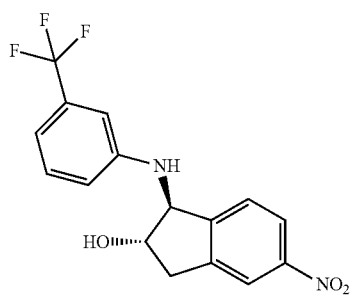

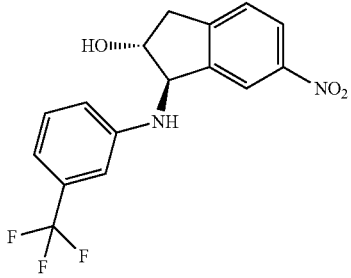

To a solution of 3-(trifluoromethyl)aniline (1.48 g, 9.19 mmol, 1.15 ml, 1 eq) in pentan-1-ol (80 ml) was added cis-4-nitro-6,6a-dihydro-1aH-indeno[1,2-b]oxirene and cis-3-nitro-6,6a-dihydro-1aH-indeno[1,2-b]oxirene (1.98 g, 11.18 mmol, 1.22 eq). The mixture was stirred at 140° C. for 6 h. LCMS showed the reaction was completed. The mixture was concentrated under reduced pressure to obtain the residue. The residue was purified by column chromatography (SiO₂, Petroleum ether/AcOEt=1/0 to 9/1) to obtain trans-5-nitro-1-((3-(trifluoromethyl)phenyl)amino)-2,3-dihydro-1H-inden-2-ol (990 mg, 2.93 mmol, 31.85% yield) as a yellow solid and trans-6-nitro-1-((3-(trifluoro-methyl)phenyl)amino)-2,3-dihydro-1H-inden-2-ol (540 mg, 1.60 mmol, 17.37% yield) as a yellow solid.

Trans-5-nitro-1-((3-(trifluoromethyl)phenyl)amino)-2,3-dihydro-1H-inden-2-ol. ¹HNMR (400 MHz, DMSO-d₆) δ=8.12-8.08 (m, 2H, Ar), 7.49-7.44 (m, 1H, Ar), 7.32 (t, J=8.0 Hz, 1H, Ar), 7.04-7.02 (m, 2H, Ar), 6.87 (d, J=7.6 Hz, 1H, Ar), 6.58 (d, J=8.4 Hz, 1H, NH), 5.55 (d, J=5.2 Hz, 1H, OH), 4.82-4.79 (m, 1H, CH), 4.31-4.27 (m, 1H, CH), 3.27 (d, J=6.8 Hz, 1H, CH₂), 2.85 (dd, J=6.0, 16.0 Hz, 1H, CH₂)

Trans-6-nitro-1-((3-(trifluoromethyl)phenyl)amino)-2,3-dihydro-1H-inden-2-ol. ¹HNMR (400 MHz, DMSO-d₆) δ=8.16 (dd, J=2.0, 8.0 Hz, 1H), 8.04 (d, J=1.6 Hz, 1H, Ar), 7.55 (d, J=8.4 Hz, 1H, Ar), 7.33 (t, J=7.6 Hz, 1H, Ar), 7.07-7.05 (m, 2H, Ar), 6.88 (d, J=8.0 Hz, 1H, Ar), 6.56 (d, J=8.0 Hz, 1H, NH), 5.56 (d, J=4.8 Hz, 1H, OH), 4.83-4.80 (m, 1H, CH), 4.31-4.25 (m, 1H, CH), 3.28 (d, J=6.4 Hz, 1H, CH₂), 2.86 (dd, J=5.6, 16.8 Hz, 1H, CH₂)

Step 5: Trans-5-amino-1-((3-(trifluoromethyl)phenyl)amino)-2,3-dihydro-1H-inden-2-ol To a solution of trans-5-nitro-1-((3-(trifluoromethyl)phenyl)amino)-2,3-dihydro-11H-inden-2-ol (370.00 mg, 1.09 mmol, 1 eq) in MeOH (10 ml) was added Pd/C (37 mg, 10%/C) and Et₃N (72.70 mg, 718.46 μmol, 0.1 ml, 0.66 eq). The mixture was degassed with H₂ (15 psi) and stirred at 25° C. under H₂ (15 psi) for 30 mins. TLC showed trace starting material remained and one new spot was detected. The mixture was filtered and concentrated under reduced pressure to obtain trans-5-amino-1-((3-(trifluoromethyl)phenyl) amino)-2,3-dihydro-1H-inden-2-ol (370 mg, crude) as a yellow oil.

¹H NMR (400 MHz, DMSO-d6) δ=7.26 (t, J=8.0 Hz, 1H, Ar), 7.00-6.97 (m, 2H, Ar), 6.87 (d, J=7.6 Hz, 1H, Ar), 6.79 (d, J=7.6 Hz, 1H, Ar), 6.42-6.38 (m, 2H, Ar), 6.23 (d, J=7.6 Hz, 1H, NH), 5.20 (d, J=4.8 Hz, 1H, OH), 4.99 (s, 2H, NH₂), 4.46-4.42 (m, 1H, CH), 4.10-4.08 (m, 1H, CH), 3.03 (dd, J=6.4, 16.0 Hz, 1H, CH₂), 2.59 (d, J=4.8 Hz, 1H, CH₂).

Step 6: Trans-N-(2-hydroxy-1-((3-(trifluoromethyl) phenyl)amino)-2,3-dihydro-1H-inden-5-yl)acrylamide To a solution of trans-5-amino-1-((3-(trifluoromethyl) phenyl)amino)-2,3-dihydro-1H-inden-2-al (280 mg, 908.2

µmol, 1 eq) and DIEA (234.76 mg, 1.82 mmol, 316.39 µl, 2 eq) in DCM (6 ml) were added a solution of acryloyl chloride (82.20 mg, 908.21 µmol, 74.05 µl, 1 eq) in DCM (0.5 ml) at 0° C. The mixture was stirred at 25° C. for 1 h. LCMS showed the reaction was completed. The mixture was diluted with DCM (10 ml) and washed with water (5 ml). The organic phase was dried over $Na_2SO_4$, filtered and concentrated under reduced pressure to obtain the residue, which was purified by prep-HPLC (column: Unisil 3-100 C18 ultra 150*50 mm*3 um; mobile phase: [water (0.225% FA)-MeCN]; B %: 40%-60%, 10 min) to obtain trans-N-(2-hydroxy-1-((3-(trifluoromethyl)phenyl)amino)-2,3-dihydro-1H-inden-5-yl)-acrylamide (116.6 mg, 321.9 µmol, 35.44% yield, 100% purity) as an off-white solid.

$^1$H NMR (400 MHz, DMSO-$d_6$) δ=10.11 (s, 1H, CONH), 7.64 (s, 1H, Ar), 7.40 (dd, J=1.6, 8.4 Hz, 1H, Ar), 7.29 (t, J=8.0 Hz, 1H, Ar), 7.18 (d, J=8.0 Hz, 1H, Ar), 7.02-7.00 (m, 2H, Ar), 6.82 (d, J=7.6 Hz, 1H, Ar), 6.47-6.38 (m, 2H, CHCH$_2$, NH), 6.27-6.22 (m, 1H, CHCH$_2$), 5.74 (dd, J=2.0, 10.0 Hz, 1H, CHCH$_2$), 5.34 (d, J=4.8 Hz, 1H, OH), 4.62-5.91 (m, 1H, CH), 4.21-4.16 (m, 1H, CH), 3.17 (dd, J=6.8, 16.4 Hz, 1H, CH$_2$), 2.72 (dd, J=5.6, 16.0 Hz, 1H, CH$_2$).

EXAMPLE 96

N-[rac-(2R,3R)-2-hydroxy-3-[3-(trifluoromethyl) anilino]-2,3-dihydro-1H-inden-5-yl]acrylamide

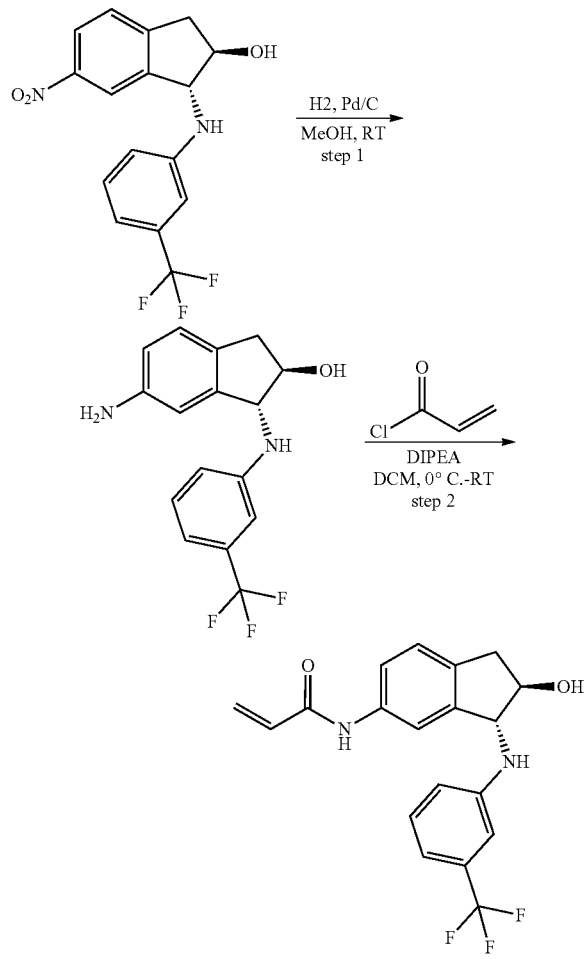

Step 1: Trans-6-amino-1-((3-(trifluoromethyl)phenyl) amino)-2,3-dihydro-1H-inden-2-ol To a solution of trans-6-nitro-1-((3-(trifluoromethyl)phenyl)amino)-2,3-dihydro-1H-inden-2-ol (300.00 mg, 886.84 µmol, 1 eq) in MeOH (10 ml) was added Pd/C (30 mg, 10% purity). The mixture was degassed with H$_2$ (15 psi) and stirred at 25° C. under H$_2$ (15 psi) for 4 h. LCMS showed the reaction was completed. The mixture was filtered and concentrated under reduced pressure to obtain trans-6-amino-1-((3-(trifluoromethyl)phenyl)amino)-2,3-dihydro-1H-inden-2-ol (200 mg, 648.72 µmol, 73.15% yield) as a yellow solid.

$^1$H NMR (400 MHz, DMSO-$d_6$) δ=7.27 (t, J=8.0 Hz, 1H, Ar), 7.01-6.97 (m, 2H, Ar), 6.86-6.78 (m, 2H, Ar), 6.45-6.39 (m, 3H, Ar, NH), 5.22 (d, J=5.6 Hz, 1H, OH), 4.89 (s, 2H, NH$_2$), 4.54-4.51 (m, 1H, CH), 4.15-4.09 (m, 1H, CH), 2.98 (dd, J=6.8, 15.2 Hz, 1H, CH$_2$), 2.59-2.54 (m, 1H, CH$_2$).

Step 2: Trans-N-(2-hydroxy-3-((3-(trifluoromethyl) phenyl)amino)-2,3-dihydro-1H-inden-5-yl)acrylamide To a solution of trans-6-amino-1-((3-(trifluoromethyl) phenyl)amino)-2,3-dihydro-1H-inden-2-ol (170 mg, 551.42 µmol, 1 eq) and DIPEA (142.53 mg, 1.10 mmol, 192.09 µl, 2 eq) in DCM (10 ml) were added a solution of acryloyl chloride (69.9 mg, 772 µmol, 63 µl, 1.4 eq) in DCM (0.5 ml) at 0° C. The mixture was stirred at 25° C. for 1 h. LCMS showed the reaction was completed. The mixture was diluted with DCM (10 ml) and washed with water (5 ml). The organic phase was dried over $Na_2SO_4$, filtered and concentrated under reduced pressure to obtain the residue. The residue was purified by prep-TLC (Petroleum ether/AcOEt=1/1) and prep-HPLC (column: Unisil 3-100 C18 ultra 150*50 mm*3 um; mobile phase: [water (0.225% FA)-MeCN]; B %: 38%-58%, 10 min) to obtain trans-N-(2-hydroxy-3-((3-(trifluoromethyl)phenyl)amino)-2,3-dihydro-1H-inden-5-yl)acrylamide (89.7 mg, 248 µmol, 45% yield, 100% purity) as a white solid.

$^1$H NMR (400 MHz, DMSO-d6) δ=10.07 (s, 1H, CONH), 7.60 (dd, J=1.2, 8.0 Hz, 1H, Ar), 7.50 (s, 1H, Ar), 7.30 (t, J=8.0 Hz, 1H, Ar), 7.18 (d, J=8.4 Hz, 1H, Ar), 7.02-7.00 (m, 2H, Ar), 6.83 (d, J=7.6 Hz, 1H, Ar), 6.49 (d, J=8.0 Hz, 1H, NH), 6.39 (dd, J=10.0, 17.2 Hz, 1H, CHCH$_2$), 6.21 (dd, J=1.6, 16.8 Hz, 1H, CHCH$_2$), 5.71 (dd, J=2.0, 10.0 Hz, 1H, CHCH$_2$), 5.36 (d, J=5.2 Hz, 1H, OH), 4.68-4.65 (m, 1H, CH), 4.22-4.18 (m, 1H, CH), 3.11 (dd, J=6.8, 15.6 Hz, 1H, CH$_2$), 2.69 (dd, J=6.0, 15.6 Hz, 1H, CH$_2$).

The table herein below illustrates the chemical structures and physical properties of a number of compounds of formula (I).

In the table:

the proton magnetic resonance spectra ($^1$H NMR), as described below, are recorded at 400 MHz in DMSO-$d_6$, using the DMSO-$d_6$ peak as reference. The chemical shifts δ are expressed in parts per million (ppm). The signals observed are expressed as follows: s=singlet; d=doublet; t=triplet; m=multiplet or br s=broad singlet; br m=broad multiplet the LCMS characteristics, as described below, successively indicated the high-performance liquid chromatography analytical method used and detailed below (A and B), the [M+H]$^+$ or [M−H]$^−$ peak identified by mass spectrometry and the retention time (Tr) of the compound, expressed in minutes.

Method A

Column: Acquity UPLC/SQD CORTECS C18+2.1×50 mm 1.6 μm (Waters)
Gradient: MeCN/H₂O with 0.1%. FA from 2 to 100% during 3 min, 1 ml/min Method B Column: Acquity UPLC/SQD CORTECS C18+2.1×50 mm 1.6 μm (Waters)
Gradient: MeCN/H₂O with 0.1%. FA from 2 to 100% during 10 min, 1 ml/min Method C Column: Kinetex EVO C18 2.1×30 mm, 5 μm
Gradient: 0.0 min 5% B→0.8 min 95% B→1.2 min 95% B→1.21 min 5% B→1.55 min 5% B, 1.5 ml/min, mobile phase: A: 0.0375% TFA in water (v/v), B: 0.01875% TFA in Acetonitrile (v/v)

Method D

Column: Acquity UPLC/SQD CSH C18 2.1×50 mm 1.7 μm (Waters)
Gradient: MeCN/H₂O with 0.1% FA from 5 to 100% during 2.5 min, 1 ml/min Compounds of formula (I) underwent biochemical studies in order to determine their capacity to inhibit YAP1/TAZ-TEAD or TEAD-dependent gene transcription.

| Example No | IUPAC name | NMR Description | Obs Ion(s) type | Obs Ion(s) mass | Tr (min) | Analytical method |
|---|---|---|---|---|---|---|
| 1 | N-(1-((3-(trifluoro-methyl)phenyl)-amino)-2,3-dihydro-1H-inden-5-yl)-acrylamide | 1H NMR (400 MHz, DMSO-d6) δ ppm 1.72-1.88 (m, 1 H) 2.41-2.46 (m, 1 H) 2.77-2.88 (m, 1 H) 2.89-3.01 (m, 1 H) 4.99 (q, J = 7.03 Hz, 1 H) 5.73 (dd, J = 9.99, 2.03 Hz, 1 H) 6.24 (dd, J = 16.95, 2.03 Hz, 1 H) 6.34-6.50 (m, 2 H) 6.82 (d, J = 7.53 Hz, 1 H) 6.94-7.03 (m, 2 H) 7.21 (d, J = 8.28 Hz, 1 H) 7.29 (t, J = 8.16 Hz, 1 H) 7.40 (dd, J = 8.28, 1.64 Hz, 1 H) 7.67 (s, 1 H) 10.09 (s, 1 H) | [M − H]− | 344 | 1.43 | A |
| 2 | N-(1-((3-(trifluoro-methyl)phenyl)-amino)-2,3-dihydro-1H-inden-5-yl)-acrylamide Enantiomer 1 | 1H NMR (400 MHz, DMSO-d6) δ ppm 1.78 (m, 1 H) 2.52 (m partially hidden, 1 H) 2.82 (m, 1 H) 2.95 (m, 1 H) 4.99 (m, 1 H) 5.74 (dd, J = 2.1 et 10.1 Hz, 1 H) 6.24 (dd, J = 2.1 et 17.1 Hz, 1 H) 6.41 (d, partially hidden, 1 H) 6.43 (dd, J = 10.1 et 17.1 Hz, 1 H) 6.82 (d, J = 8.1 Hz, 1 H) 6.97 (m, 2 H) 7.21 (d, J = 8.1 Hz, 1 H) 7.29 (t, J = 8.1 Hz, 1 H) 7.40 (dd, J = 2.1 et 8.1 Hz, 1 H) 7.68 (d, J = 2.1 Hz, 1 H) 10.10 (s, 1 H) | [M − H]− | 344 | 1.85 | A |
| 3 | N-(1-((3-(trifluoromethyl)-phenyl)amino)-2,3-dihydro-1H-inden-5-yl)-acrylamide Enantiomer 2 | 1H NMR (400 MHz, DMSO-d6) δ ppm: 1.78 (m, 1 H) 2.52 (m partially hidden, 1 H) 2.82 (m, 1 H) 2.95 (m, 1 H) 4.99 (m, 1 H) 5.74 (dd, J = 2.1 et 10.1 Hz, 1 H) 6.24 (dd, J = 2.1 et 17.1 Hz, 1 H) 6.41 (d, partially hidden, 1 H) 6.43 (dd, J = 10.1 et 17.1 Hz, 1 H) 6.82 (d, J = 8.1 Hz, 1 H) 6.97 (m, 2 H) 7.21 (d, J = 8.1 Hz, 1 H) 7.29 (t, J = 8.1 Hz, 1 H) 7.40 (dd, J = 2.1 et 8.1 Hz, 1 H) 7.68 (d, J = 2.1 Hz, 1 H) 10.10 (s, 1 H) | [M − H]− | 344 | 1.85 | A |
| 4 | N-methyl-N-(1-((3-(trifluoro-methyl)phenyl)-amino)-2,3-dihydro-1H-inden-5-yl)-acrylamide | 1H NMR (400 MHz, DMSO-d6) δ ppm 1.76-1.90 (m, 1 H) 2.53-2.61 (m, 1 H) 2.80-2.92 (m, 1 H) 2.93-3.04 (m, 1 H) 3.23 (s, 3 H) 5.07 (q, J = 7.53 Hz, 1 H) 5.53-5.62 (m, 1 H) 6.00-6.21 (m, 2 H) 6.48 (d, J = 8.28 Hz, 1 H) 6.84 (m, J = 7.53 Hz, 1 H) 6.96-7.04 (m, 2 H) 7.08 (dd, J = 7.78, 2.01 Hz, 1 H) 7.20 (s, 1 H) 7.28-7.35 (m, 2 H) | [M + H]+ | 361 | 4.74 | B |
| 5 | N-(1-((4-fluoro-phenyl)-amino)-2,3-dihydro-1H-inden-5-yl)-acrylamide | 1H NMR (400 MHz, DMSO-d6) δ ppm 1.70-1.84 (m, 1 H) 2.41-2.46 (m, 1 H) 2.74- | [M − H]− | 295 | 1.46 | A |

| Example No | IUPAC name | NMR Description | Obs Ion(s) type | Obs Ion(s) mass | Tr (min) | Analytical method |
|---|---|---|---|---|---|---|
| | | 2.85 (m, 1 H) 2.88-3.00 (m, 1 H) 4.87 (q, J = 7.19 Hz, 1 H) 5.69-5.79 (m, 2 H) 6.24 (dd, J = 16.89, 2.00 Hz, 1 H) 6.43 (dd, J = 16.89, 10.23 Hz, 1 H) 6.65-6.74 (m, 2 H) 6.88-6.97 (m, 2 H) 7.21 (d, J = 8.03 Hz, 1 H) 7.39 (dd, J = 8.03, 1.51 Hz, 1 H) 7.65 (s, 1 H) 10.06 (s, 1 H) | | | | |
| 6 | N-(1-((4-fluoro-phenyl)-amino)-2,3-dihydro-1H-inden-5-yl)-acrylamide Enantiomer 1 | 1H NMR (400 MHz, DMSO-d6) δ ppm: 1.76 (m, 1 H) 2.46 (m, 1 H) 2.80 (m, 1 H) 2.93 (m, 1 H) 4.87 (m, 1 H) 5.73 (dd, J = 2.1 et 10.1 Hz, 1 H) 5.77 (d, J = 8.5 Hz, 1 H) 6.24 (dd, J = 2.1 et 17.0 Hz, 1 H) 6.43 (dd, J = 10.1 et 17.0 Hz, 1 H) 6.69 (dd, J = 4.6 et 9.1 Hz, 2 H) 6.92 (t, J = 9.1 Hz, 2 H) 7.21 (d, J = 8.1 Hz, 1 H) 7.39 (dd, J = 2.1 et 8.1 Hz, 1 H) 7.66 (d, J = 2.1 Hz, 1 H) 10.08 (s, 1 H) | [M − H]− | 294 | 1.46 | A |
| 7 | N-(1-((4-fluoro-phenyl)-amino)-2,3-dihydro-1H-inden-5-yl)-acrylamide Enantiomer 2 | 1H NMR (400 MHz, DMSO-d6) δ ppm: 1.76 (m, 1 H) 2.46 (m, 1 H) 2.80 (m, 1 H) 2.93 (m, 1 H) 4.87 (m, 1 H) 5.73 (dd, J = 2.1 et 10.1 Hz, 1 H) 5.77 (d, J = 8.5 Hz, 1 H) 6.24 (dd, J = 2.1 et 17.0 Hz, 1 H) 6.43 (dd, J = 10.1 et 17.0 Hz, 1 H) 6.69 (dd, J = 4.6 et 9.1 Hz, 2 H) 6.92 (t, J = 9.1 Hz, 2 H) 7.21 (d, J = 8.1 Hz, 1 H) 7.39 (dd, J = 2.1 et 8.1 Hz, 1 H) 7.66 (d, J = 2.1 Hz, 1 H) 10.08 (s, 1 H) | [M − H]− | 294 | 1.45 | A |
| 8 | N-(1-((3-fluoro-phenyl)-amino)-2,3-dihydro-1H-inden-5-yl)-acrylamide | 1H NMR (400 MHz, DMSO-d6) δ ppm 1.71-1.88 (m, 1 H) 2.43-2.50 (m, 1 H) 2.75-2.88 (m, 1 H) 2.89-3.02 (m, 1 H) 4.92 (q, J = 7.28 Hz, 1 H) 5.73 (dd, J = 10.04, 2.01 Hz, 1 H) 6.16-6.34 (m, 3 H) 6.38-6.61 (m, 3 H) 7.03-7.13 (m, 1 H) 7.21 (d, J = 8.03 Hz, 1 H) 7.40 (dd, J = 8.03, 1.38 Hz, 1 H) 7.66 (s, 1 H) 10.07 (s, 1 H) | [M − H]− | 295 | 1.27 | A |
| 9 | N-(1-((3,5-difluorophenyl)-amino)-2,3-dihydro-1H-inden-5-yl)-acrylamide | 1H NMR (400 MHz, DMSO-d6) δ ppm 1.70-1.84 (m, 1 H) 2.52-2.57 (m, 1 H) 2.74-2.87 (m, 1 H) 2.89-3.00 (m, 1 H) 4.93 (q, J = 7.28 Hz, 1 H) 5.74 (dd, J = 10.16, 2.13 Hz, 1 H) 6.16-6.28 (m, 2 H) 6.31-6.50 (m, 3 H) 6.57 (d, J = 8.03 Hz, 1 H) 7.21 (d, J = 8.03 Hz, 1 H) 7.41 (dd, J = 8.03, 1.51 Hz, 1 H) 7.67 (s, 1 H) 10.08 (s, 1 H) | [M − H]− | 313 | 4.94 | B |
| 10 | N-(1-((4-(trifluoromethyl)-phenyl)amino)-2,3-dihydro-1H-inden-5-yl)-acrylamide | 1H NMR (400 MHz, DMSO-d6) δ ppm 1.74-1.90 (m, 1 H) 2.52-2.56 (m, 1 H) 2.76-2.88 (m, 1 H) 2.90-3.02 (m, 1 H) 5.00 (q, J = 7.28 Hz, 1 H) 5.73 (dd, J = 10.06, 2.03 Hz, 1 H) 6.24 (dd, J = 16.94, 2.03 Hz, 1 H) 6.43 (dd, J = 16.94, 10.06 Hz, 1 H) 6.64 (d, J = 8.03 Hz, 1 H) 6.82 (d, J = 8.53 Hz, 2 H) 7.21 (d, J = 8.03 Hz, 1 H) 7.39 (br d, J = 8.53 Hz, 3 H) 7.68 (s, 1 H) 10.08 (s, 1 H) | [M − H]− | 345 | 1.43 | A |
| 11 | N-(3-((3-(trifluoromethyl)-phenyl)amino)-2,3-dihydro-1H-inden-5-yl)-acrylamide | 1H NMR (400 MHz, DMSO-d6) δ ppm 1.70-1.88 (m, 1 H) 2.53-2.58 (m, 1 H) 2.72-2.96 (m, 2 H) 5.03 (q, J = 7.61 Hz, 1 H) 5.70 (dd, J = 10.10, 2.08 Hz, 1 H) 6.21 (dd, J = 16.90, 2.08 Hz, 1 H) 6.34-6.55 (m, 2 H) 6.82 (d, J = 7.53 Hz, 1 H) 6.93-7.04 (m, 2 H) 7.21 (d, J = 8.03 Hz, 1 H) 7.30 (t, J = 8.28 Hz, 1 H) 7.53-7.64 (m, 2 H) 10.05 (s, 1 H) | [M + H]+ | 347 | 1.43 | A |
| 12 | N-(3-((4-(trifluoromethyl)-phenyl)amino)-2,3-dihydro-1H-inden-5-yl)-acrylamide | 1H NMR (400 MHz, DMSO-d6) δ ppm 1.74-1.88 (m, 1 H) 2.52-2.58 (m, 1 H) 2.74-2.84 (m, 1 H) 2.86-2.98 (m, 1 H) 5.04 (q, J = 7.70 Hz, 1 H) 5.70 (dd, J = 10.16, 2.13 Hz, 1 H) 6.21 (dd, J = 16.88, 2.130 Hz, 1 H) 6.40 (dd, J = 16.88, 10.16 Hz, 1 H) 6.72 (d, J = 8.53 Hz, 1 H) 6.83 (d, J = 8.78 Hz, 2 H) 7.22 (d, J = 8.28 Hz, 1 H) 7.39 (d, J = 8.78 Hz, 2 H) 7.54 (s, 1 H) 7.62 (dd, J = 8.28, 1.76 Hz, 1 H) 10.05 (s, 1 H) | [M − H]− | 345 | 1.48 | A |
| 13 | N-(3-((3,4-difluorophenyl)-amino)-2,3-dihydro-1H-inden-5-yl)-acrylamide | 1H NMR (400 MHz, DMSO-d6) δ ppm 1.68-1.81 (m, 1 H) 2.44-2.48 (m, 1 H) 2.70-2.82 (m, 1 H) 2.83-2.94 (m, 1 H) 4.92 (q, J = 7.53 Hz, 1 H) 5.71 (dd, J = 10.26, 2.18 Hz, 1 H) 6.15 (d, J = 8.53 Hz, 1 H) 6.22 (dd, J = 17.03, 2.18 Hz, 1 H) 6.40 (dd, J = 17.03, 10.26 Hz, 1 H) 6.45-6.52 (m, 1 H) 6.64- | [M − H]− | 313 | 1.35 | A |

| Example No | IUPAC name | NMR Description | Obs Ion(s) type | Obs Ion(s) mass | Tr (min) | Analytical method |
|---|---|---|---|---|---|---|
| | | 6.72 (m, 1 H) 7.07-7.17 (m, 1 H) 7.20 (d, J = 8.78 Hz, 1 H) 7.50-7.66 (m, 2 H) 10.04 (s, 1 H) | | | | |
| 14 | N-(3-((3-fluoro-phenyl)amino)-2,3-dihydro-1H-inden-5-yl)-acrylamide | 1H NMR (400 MHz, DMSO-d6) δ ppm 1.71-1.84 (m, 1 H) 2.52-2.56 (m, 1 H) 2.72-2.82 (m, 1 H) 2.84-2.96 (m, 1 H) 4.96 (q, J = 7.53 Hz, 1 H) 5.71 (dd, J = 10.16, 2.15 Hz, 1 H) 6.21 (dd, J = 16.81, 2.15 Hz, 1 H) 6.26-6.33 (m, 2 H) 6.40 (dd, J = 16.81, 10.16 Hz, 1 H) 6.46-6.58 (m, 2 H) 7.03-7.13 (m, 1 H) 7.20 (d, J = 8.03 Hz, 1 H) 7.54-7.66 (m, 2 H) 10.05 (s, 1 H) | [M + H]+ | 297 | 1.32 | A |
| 15 | N-(3-((4-fluoro-phenyl)amino)-2,3-dihydro-1H-inden-5-yl)-acrylamide | 1H NMR (400 MHz, DMSO-d6) δ ppm 1.68-1.82 (m, 1 H) 2.43-2.47 (m, 1 H) 2.70-2.82 (m, 1 H) 2.83-2.97 (m, 1 H) 4.90 (q, J = 7.61 Hz, 1 H) 5.70 (dd, J = 10.02, 2.05 Hz, 1 H) 5.82 (d, J = 8.53 Hz, 1 H) 6.21 (dd, J = 16.93, 2.05 Hz, 1 H) 6.40 (dd, J = 16.93, 10.02 Hz, 1 H) 6.62-6.80 (m, 2 H) 6.84-6.98 (m, 2 H) 7.20 (d, J = 8.78 Hz, 1 H) 7.51-7.68 (m, 2 H) 10.03 (s, 1 H) | [M + H]+ | 297 | 1.13 | A |
| 16 | N-(1-((3,4-difluorophenyl)-amino)-2,3-dihydro-1H-inden-5-yl)-acrylamide | 1H NMR (400 MHz, DMSO-d6) δ ppm 1.68-1.83 (m, 1 H) 2.43-2.47 (m, 1 H) 2.74-2.86 (m, 1 H) 2.88-2.99 (m, 1 H) 4.87 (q, J = 7.28 Hz, 1 H) 5.73 (dd, J = 10.16, 2.13 Hz, 1 H) 6.07 (d, J = 8.28 Hz, 1 H) 6.24 (dd, J = 17.07, 2.13 Hz, 1 H) 6.38-6.53 (m, 2 H) 6.62-6.72 (m, 1 H) 7.05-7.17 (m, 1 H) 7.21 (d, J = 8.28 Hz, 1 H) 7.40 (dd, J = 8.28, 1.51 Hz, 1 H) 7.66 (s, 1 H) 10.08 (s, 1 H) | [M − H]− | 313 | 1.31 | A |
| 17 | N-(1-((3-methoxyphenyl)-amino)-2,3-dihydro-1H-inden-5-yl)-acrylamide | 1H NMR (400 MHz, DMSO-d6) δ ppm 1.71-1.86 (m, 1 H) 2.42-2.46 (m, 1 H) 2.73-2.85 (m, 1 H) 2.88-2.99 (m, 1 H) 3.67 (s, 3 H) 4.90 (q, J = 7.28 Hz, 1 H) 5.73 (dd, J = 10.04, 2.01 Hz, 1 H) 5.83 (d, J = 8.28 Hz, 1 H) 6.13 (dd, J = 8.16, 2.01 Hz, 1 H) 6.21-6.35 (m, 3 H) 6.43 (dd, J = 17.05, 10.04 Hz, 1 H) 6.98 (t, J = 8.16 Hz, 1 H) 7.21 (d, J = 8.03 Hz, 1 H) 7.38 (dd, J = 8.03, 1.63 Hz, 1 H) 7.65 (s, 1 H) 10.06 (s, 1 H) | [M − H]− | 307 | 1.08 | A |
| 18 | N-(1-(m-tolylamino)-2,3-dihydro-1H-inden-5-yl)-acrylamide | 1H NMR (400 MHz, DMSO-d6) δ ppm 1.70-1.84 (m, 1 H) 2.19 (s, 3 H) 2.43-2.49 (m, 1 H) 2.73-2.85 (m, 1 H) 2.87-2.98 (m, 1 H) 4.90 (q, J = 7.28 Hz, 1 H) 5.63-5.81 (m, 2 H) 6.24 (dd, J = 17.06, 2.06 Hz, 1 H) 6.33-6.57 (m, 4 H) 6.96 (t, J = 7.78 Hz, 1 H) 7.20 (d, J = 8.28 Hz, 1 H) 7.38 (dd, J = 8.28, 1.63 Hz, 1 H) 7.65 (s, 1 H) 10.06 (s, 1 H) | [M − H]− | 291 | 1.04 | A |
| 19 | N-(1-((6-fluoropyridin-3-yl)amino)-2,3-dihydro-1H-inden-5-yl)-acrylamide | 1H NMR (400 MHz, DMSO-d6) δ ppm 1.71-1.83 (m, 1 H) 2.53-2.56 (m, 1 H) 2.77-2.87 (m, 1 H) 2.90-3.02 (m, 1 H) 4.92 (q, J = 7.19 Hz, 1 H) 5.74 (dd, J = 10.33, 2.05 Hz, 1 H) 6.06 (d, J = 8.53 Hz, 1 H) 6.24 (dd, J = 16.97, 2.05 Hz, 1 H) 6.43 (dd, J = 16.97, 10.33 Hz, 1 H) 6.90 (dd, J = 8.78, 3.26 Hz, 1 H) 7.22 (d, J = 8.28 Hz, 1 H) 7.24-7.32 (m, 1 H) 7.41 (dd, J = 8.28, 1.51 Hz, 1 H) 7.61 (, 1 H) 7.67 (s, 1 H) 10.08 (s, 1 H) | [M + H]+ | 298 | 1.05 | A |
| 20 | N-(1-((6-(trifluoromethyl)-pyridin-3-yl)-amino)-2,3-dihydro-1H-inden-5-yl)-acrylamide | 1H NMR (400 MHz, DMSO-d6) δ ppm 1.76-1.88 (m, 1 H) 2.53-2.58 (m, 1 H) 2.79-2.90 (m, 1 H) 2.92-3.03 (m, 1 H) 5.05 (q, J = 7.03 Hz, 1 H) 5.74 (dd, J = 9.94, 2.21 Hz, 1 H) 6.24 (dd, J = 16.99, 2.21 Hz, 1 H) 6.43 (dd, J = 16.99, 9.94 Hz, 1 H) 6.95 (d, J = 8.03 Hz, 1 H) 7.14-7.27 (m, 2 H) 7.42 (dd, J = 8.28, 1.51 Hz, 1 H) 7.54 (d, J = 8.78 Hz, 1 H) 7.69 (s, 1 H) 8.16 (d, J = 2.76 Hz, 1 H) 10.10 (s, 1 H) | [M + H]+ | 348 | 1.40 | A |
| 21 | N-(1-((5-fluoropyridin-2-yl)amino)-2,3-dihydro-1H-inden-5-yl)-acrylamide | 1H NMR (400 MHz, DMSO-d6) δ ppm 1.71-1.84 (m, 1 H) 2.42-2.46 (m, 1 H) 2.74-2.85 (m, 1 H) 2.87-2.99 (m, 1 H) 5.36 (q, J = 7.53 Hz, 1 H) 5.73 (dd, J = 10.14, 1.97 Hz, 1 H) 6.23 (dd, J = 17.01, 1.97 Hz, 1 H) 6.42 (dd, J = 17.01, 10.14 Hz, 1 H) 6.55 (dd, J = 8.28, 3.64 Hz, 1 H) 6.79 (d, J = 8.03 Hz, 1 H) 7.17 (d, J = 8.28 Hz, 1 H) 7.31-7.42 (m, 2 | [M + H]+ | 298 | 0.79 | A |

-continued

| Example No | IUPAC name | NMR Description | Obs Ion(s) type | Obs Ion(s) mass | Tr (min) | Analytical method |
|---|---|---|---|---|---|---|
| | | H) 7.64 (s, 1 H) 7.96 (d, J = 3.01 Hz, 1 H) 10.05 (s, 1 H) | | | | |
| 22 | methyl-3-((5-acrylamido-2,3-dihydro-1H-inden-1-yl)-amino)benzoate | 1H NMR (400 MHz, DMSO-d6) δ ppm 1.73-1.85 (m, 1 H) 2.51-2.55 (m, 1 H) 2.77-2.88 (m, 1 H) 2.88-3.00 (m, 1 H) 3.81 (s, 3 H) 4.95 (q, J = 7.11 Hz, 1 H) 5.74 (dd, J = 10.01, 1.83 Hz, 1 H) 6.15-6.31 (m, 2 H) 6.44 (dd, J = 16.64, 10.01 Hz, 1 H) 6.98 (ddd, J = 8.16, 2.380, 1.00 Hz, 1 H) 7.10-7.26 (m, 3 H) 7.28-7.35 (m, 1 H) 7.39 (dd, J = 8.16, 1.63 Hz, 1 H) 7.66 (s, 1 H) 10.07 (s, 1 H) | [M − H]− | 335 | 1.25 | A |
| 23 | N-(3-(benzyl-amino)-2,3-dihydro-1H-inden-5-yl)-acrylamide | 1H NMR (400 MHz, DMSO-d6) δ ppm 1.73-1.85 (m, 1 H) 2.25-2.39 (m, 2 H) 2.62-2.73 (m, 1 H) 2.81-2.93 (m, 1 H) 3.73-3.87 (m, 2 H) 4.10 (br t, J = 6.78 Hz, 1 H) 5.72 (dd, J = 10.04, 2.01 Hz, 1 H) 6.24 (dd, J = 17.00, 2.01 Hz, 1 H) 6.43 (dd, J = 17.00, 10.04 Hz, 1 H) 7.15 (d, J = 8.03 Hz, 1 H) 7.22 (t, J = 7.55 Hz, 1 H) 7.32 (t, J = 7.53 Hz, 2 H) 7.41 (d, J = 7.03 Hz, 2 H) 7.49 (dd, J = 8.03, 1.76 Hz, 1 H) 7.69 (s, 1 H) 10.03 (s, 1 H) | [M + H]+ | 293 | 0.55 | A |
| 24 | N-(1-((3-(trifluoromethyl)-benzyl)amino)-2,3-dihydro-1H-inden-5-yl)-acrylamide | 1H NMR (400 MHz, DMSO-d6) δ ppm 1.75-1.86 (m, 1 H) 2.24-2.35 (m, 1 H) 2.65-2.77 (m, 1 H) 2.87-2.98 (m, 1 H) 3.87 (br s, 2 H) 4.11 (br t, J = 6.15 Hz, 1 H) 5.72 (dd, J = 10.04, 2.01 Hz, 1 H) 6.23 (dd, J = 16.92, 2.01 Hz, 1 H) 6.43 (dd, J = 16.92, 10.04 Hz, 1 H) 7.31 (d, J = 8.03 Hz, 1 H) 7.41 (dd, J = 8.03, 1.63 Hz, 1 H) 7.51-7.62 (m, 4 H) 7.70 (d, J = 7.03 Hz, 1 H) 7.76 (s, 1 H) 10.02 (s, 1 H) | [M + H]+ | 361 | 0.66 | A |
| 25 | N-(1-((4-(trifluoromethyl)-benzyl)amino)-2,3-dihydro-1H-inden-5-yl)acrylamide | 1H NMR (400 MHz, DMSO-d6) δ ppm 1.68-1.93 (m, 1 H) 2.21-2.39 (m, 1 H) 2.55 (br s, 1 H) 2.62-2.79 (m, 1 H) 2.92 (m, 1 H) 3.87 (br s, 2 H) 4.10 (br t, J = 6.15 Hz, 1 H) 5.73 (dd, J = 10.01, 1.92 Hz, 1 H) 6.23 (dd, J = 17.04, 1.92 Hz, 1 H) 6.42 (dd, J = 17.04, 10.01 Hz, 1 H) 7.31 (d, J = 8.28 Hz, 1 H) 7.41 (dd, J = 8.28, 1.38 Hz, 1 H) 7.54-7.77 (m, 5 H) 10.03 (s, 1 H) | [M + H]+ | 361 | 0.66 | A |
| 26 | N-(2-(((cis)-4-(trifluoromethyl)-cyclohexyl)-amino)-2,3-dihydro-1H-inden-5-yl)-acrylamide | 1H NMR (400 MHz, DMSO-d6) δ ppm 1.42-1.58 (m, 4 H) 1.60-1.81 (m, 5 H) 2.14-2.30 (m, 1 H) 2.55-2.69 (m, 2 H) 2.87-2.95 (m, 1 H) 2.96-3.10 (m, 2 H) 3.47-3.60 (m, 1 H) 5.71 (dd, J = 10.16, 2.13 Hz, 1 H) 6.22 (dd, J = 17.00, 2.13 Hz, 1 H) 6.41 (dd, J = 17.00, 10.16 Hz, 1 H) 7.09 (d, J = 8.03 Hz, 1 H) 7.34 (dd, J = 8.03, 1.51 Hz, 1 H) 7.53 (s, 1 H) 9.96 (s, 1 H) | [M + H]+ | 353 | 0.57 | A |
| 27 | N-(2-(((trans)-4-(trifluoromethyl)-cyclohexyl)-amino)-2,3-dihydro-1H-inden-5-yl)-acrylamide | 1H NMR (400 MHz, DMSO-d6) δ ppm 0.96-1.14 (m, 2 H) 1.20-1.38 (m, 2 H) 1.64-2.04 (m, 5 H) 2.10-2.26 (m, 1 H) 2.40-2.48 (m, 1 H) 2.53-2.65 (m, 2 H) 3.93-3.10 (m, 2 H) 3.65 (quin, J = 7.03 Hz, 1 H) 5.71 (dd, J = 9.93, 2.13 Hz, 1 H) 6.22 (dd, J = 16.94, 2.13 Hz, 1 H) 6.41 (dd, J = 16.94, 9.93 Hz, 1 H) 7.09 (d, J = 8.03 Hz, 1 H) 7.34 (dd, J = 8.03, 1.51 Hz, 1 H) 7.52 (s, 1 H) 9.96 (s, 1 H) | [M + H]+ | 353 | 0.62 | A |
| 28 | N-(2-((4,4-difluorocyclo-hexyl)amino)-2,3-dihydro-1H-inden-5-yl)-acrylamide | 1H NMR (400 MHz, DMSO-d6) δ ppm 1.26-1.53 (m, 2 H) 1.65-1.90 (m, 5 H) 1.93-2.15 (m, 2 H) 2.53-2.81 (m, 3 H) 2.95-3.10 (m, 2 H) 3.60 (br s, 1 H) 5.71 (dd, J = 10.05, 2.01 Hz, 1 H) 6.22 (dd, J = 16.77, 2.01 Hz, 1 H) 6.41 (dd, J = 16.77, 10.05 Hz, 1 H) 7.10 (d, J = 8.28 Hz, 1 H) 7.34 (dd, J = 8.28, 1.51 Hz, 1 H) 7.53 (s, 1 H) 9.97 (s, 1 H) | [M + H]+ | 321 | 0.50 | A |
| 29 | N-(2-((4,4,4-trifluorobutyl)-amino)-2,3-dihydro-1H-inden-5-yl)-acrylamide | 1H NMR (400 MHz, DMSO-d6) δ ppm 1.54-l.71 (m, 2 H) 1.93 (br s, 1 H) 2.17-2.38 (m, 2 H) 2.54-2.68 (m, 4 H) 3.01 (ddd, J = 15.75, ll.610, 7.03 Hz, 2 H) 3.47 (quin, J = 6.59 Hz, 1 H) 5.71 (dd, J = 10.04, 2.01 Hz, 1 H) 6.22 (dd, J = 17.33, 2.01 Hz, 1 H) 6.42 (dd, J = 17.33, 10.04 Hz, 1 H) 7.10 (d, J = 8.28 Hz, | [M + H]+ | 313 | 0.49 | A |

-continued

| Example No | IUPAC name | NMR Description | Obs Ion(s) type | Obs Ion(s) mass | Tr (min) | Analytical method |
|---|---|---|---|---|---|---|
| | | 1 H) 7.34 (dd, J = 8.28, 1.51 Hz, 1 H) 7.54 (s, 1 H) 9.96 (s, 1 H) | | | | |
| 30 | N-(2-((3-fluoropropyl)-amino)-2,3-dihydro-1H-inden-5-yl)-acrylamide | 1H NMR (400 MHz, DMSO-d6) δ ppm 1.65-1.87 (m, 2 H) 2.54-2.73 (m, 5 H) 3.02 (ddd, J = 15.69, 11.670, 7.03 Hz, 2 H) 3.49 (quin, J = 6.71 Hz, 1 H) 4.49 (td, J = 47.60, 6.36 Hz, 2 H) 5.71 (dd, J = 10.03, 2.01 Hz, 1 H) 6.22 (dd, J = 17.07, 2.01 Hz, 1 H) 6.41 (dd, J = 17.07, 10.03 Hz, 1 H) 7.10 (d, J = 8.28 Hz, 1 H) 7.34 (dd, J = 8.28, 1.76 Hz, 1 H) 7.54 (s, 1 H) 9.96 (s, 1 H) | [M + H]+ | 263 | 0.36 | A |
| 31 | N-(2-((3-fluorophenyl)-amino)-2,3-dihydro-1H-inden-5-yl)-acrylamide | 1H NMR (400 MHz, DMSO-d6) δ ppm 2.69-2.81 (m, 2 H) 3.20-3.29 (m, 2 H) 4.14-4.28 (m, 1 H) 5.72 (dd, J = 10.06, 2.07 Hz, 1 H) 6.15-6.52 (m, 6 H) 7.07 (q, J = 8.03 Hz, 1 H) 7.16 (d, J = 8.28 Hz, 1 H) 7.40 (dd, J = 8.28, 1.51 Hz, 1 H) 7.59 (s, 1 H) 10.01 (s, 1 H) | [M + H]+ | 297 | 1.24 | A |
| 32 | N-(2-((3-(trifluoromethyl)-phenyl)amino)-2,3-dihydro-1H-inden-5-yl)-acrylamide | 1H NMR (400 MHz, DMSO-d6) δ ppm 2.70-2.82 (m, 2 H) 3.22-3.28 (m, 2 H) 4.20-4.33 (m, 1 H) 5.72 (dd, J = 10.04, 2.01 Hz, 1 H) 6.23 (dd, J = 16.74, 2.01 Hz, 1 H) 6.36-6.48 (m, 2 H) 6.76-6.93 (m, 3 H) 7.17 (d, J = 8.03 Hz, 1 H) 7.29 (t, J = 7.78 Hz, 1 H) 7.40 (dd, J = 8.03, 1.51 Hz, 1 H) 7.60 (s, 1 H) 10.02 (s, 1 H) | [M + H]+ | 347 | 1.39 | A |
| 33 | N-(3-(4,4,4-trifluorobutoxy)-2,3-dihydro-1H-inden-5-yl)-acrylamide | 1H NMR (400 MHz, DMSO-d6) δ ppm 1.65-1.81 (m, 2 H) 1.85-1.99 (m, 1 H) 2.22-2.41 (m, 3 H) 2.65-2.78 (m, 1 H) 2.83-2.99 (m, 1 H) 3.56 (t, J = 6.02 Hz, 2 H) 4.83-4.92 (m, 1 H) 5.73 (dd, J = 10.14, 2.11 Hz, 1 H) 6.23 (dd, J = 16.99, 2.11 Hz, 1 H) 6.42 (dd, J = 16.99, 10.14 Hz, 1 H) 7.20 (d, J = 8.16 Hz, 1 H) 7.52 (dd, J = 8.16, 1.88 Hz, 1 H) 7.71 (d, J = 1.88 Hz, 1 H) 10.07 (s, 1 H) | [M + H]+ | 314 | 1.28 | A |
| 34 | N-(3-(4-fluorobutoxy)-2,3-dihydro-1H-inden-5-yl)-acrylamide | 1H NMR (400 MHz, DMSO-d6) δ ppm 1.54-1.81 (m, 4 H) 1.84-1.98 (m, 1 H) 2.26-2.39 (m, 1 H) 2.62-2.76 (m, 1 H) 2.80-2.99 (m, 1 H) 3.48-3.59 (m, 2 H) 4.45 (td, J = 47.72, 6.21 Hz, 2 H) 4.81-4.88 (m, 1 H) 5.73 (dd, J = 10.05, 2.04 Hz, 1 H) 6.24 (dd, J = 16.89, 2.04 Hz, 1 H) 6.42 (dd, J = 16.89, 10.05 Hz, 1 H) 7.19 (d, J = 8.03 Hz, 1 H) 7.51 (dd, J = 8.03, 2.01 Hz, 1 H) 7.71 (d, J = 2.01 Hz, 1 H) 10.07 (s, 1 H) | [M + H]+ | 278 | 1.13 | A |
| 35 | N-(3-((4,4-difluorocyclo-hexyl)oxy)-2,3-dihydro-1H-inden-5-yl)-acrylamide | 1H NMR (400 MHz, DMSO-d6) δ ppm 1.65-2.14 (m, 9 H) 2.31-2.43 (m, 1 H) 2.64-2.76 (m, 1 H) 2.83-2.96 (m, 1 H) 3.72-3.82 (m, 1 H) 5.00 (t, J = 6.15 Hz, 1 H) 5.73 (dd, J = 10.01, 1.98 Hz, 1 H) 6.24 (dd, J = 16.85, 1.98 Hz, 1 H) 6.42 (dd, J = 16.85, 10.01 Hz, 1 H) 7.18 (d, J = 8.28 Hz, 1 H) 7.53 (dd, J = 8.28, 1.76 Hz, 1 H) 7.65 (s, 1 H) 10.06 (s, 1 H) | [M + H]+ | 322 | 1.28 | A |
| 36 | N-(3-(((trans)-4-(trifluoro-methyl)cyclo-hexyl)oxy)-2,3-dihydro-1H-inden-5-yl)-acrylamide | 1H NMR (400 MHz, DMSO-d6) δ ppm 1.19-1.44 (m, 4 H) 1.77-1.96 (m, 3 H) 2.02-2.18 (m, 2 H) 2.20-2.43 (m, 2 H) 2.62-2.74 (m, 1 H) 2.79-2.95 (m, 1 H) 3.41-3.55 (m, 1 H) 5.01 (t, J = 6.15 Hz, 1 H) 5.73 (dd, J = 10.14, 2.15 Hz, 1 H) 6.23 (dd, J = 16.95, 2.15 Hz, 1 H) 6.42 (dd, J = 16.95, 10.14 Hz, 1 H) 7.17 (d, J = 8.28 Hz, 1 H) 7.50 (dd, J = 8.28, 1.76 Hz, 1 H) 7.66 (d, J = 1.76 Hz, 1 H) 10.05 (s, 1 H) | [M + H]+ | 354 | 1.41 | A |
| 37 | N-(3-(4-(trifluoromethyl)-phenoxy)-2,3-dihydro-1H-inden-5-yl)-acrylamide | 1H NMR (400 MHz, DMSO-d6) δ ppm 1.97-2.10 (m, 1 H) 2.57-2.71 (m, 1 H) 2.80-2.92 (m, 1 H) 2.94-3.07 (m, 1 H) 5.73 (dd, J = 10.09, 1.93 Hz, 1 H) 5.94-6.00 (m, 1 H) 6.23 (dd, J = 17.00, 1.93 Hz, 1 H) 6.41 (dd, J = 17.00, 10.09 Hz, 1 H) 7.23 (d, J = 8.53 Hz, 2 H) 7.28 (d, J = 8.28 Hz, 1 H) 7.60 (dd, J = 8.28, 1.88 Hz, 1 H) 7.68 (d, J = 8.53 Hz, 2 H) 7.77 (d, J = 1.88 Hz, 1 H) 10.12 (s, 1 H) | [M + H]+ [M + H]+ | 348 280 | 1.63 1.28 | A A |
| 38 | N-(3-phenoxy-2,3-dihydro-1H-inden-5-yl)-acrylamide | 1H NMR (400 MHz, DMSO-d6) δ ppm 1.95-2.08 (m, 1 H) 2.53-2.64 (m, 1 H) 2.78-2.91 (m, 1 H) 2.93-3.06 (m, 1 H) 5.73 (dd, | | | | |

-continued

| Example No | IUPAC name | NMR Description | Obs Ion(s) type | Obs Ion(s) mass | Tr (min) | Analytical method |
|---|---|---|---|---|---|---|
| | | J = 10.19, 2.10 Hz, 1 H) 5.79-5.86 (m, 1 H) 6.23 (dd, J = 17.06, 2.10 Hz, 1 H) 6.41 (dd, J = 17.06, 10.19 Hz, 1 H) 6.96 (t, J = 7.28 Hz, 1 H) 7.03 (d, J = 7.86 Hz, 2 H) 7.23-7.38 (m, 3 H) 7.58 (dd, J = 7.86, 1.88 Hz, 1 H) 7.74 (s, 1 H) 10.11 (s, 1 H) | | | | |
| 39 | N-(3-(3-(trifluoromethyl)-phenoxy)-2,3-dihydro-1H-inden-5-yl)-acrylamide | 1H NMR (400 MHz, DMSO-d6) δ ppm 1.97-2.09 (m, 1 H) 2.56-2.65 (m, 1 H) 2.78-2.91 (m, 1 H) 2.93-3.06 (m, 1 H) 5.73 (dd, J = 10.04, 2.12 Hz, 1 H) 5.95-6.01 (m, 1 H) 6.23 (dd, J = 16.96, 2.12 Hz, 1 H) 6.41 (dd, J = 16.96, 10.04 Hz, 1 H) 7.18-7.46 (m, 4 H) 7.50-7.65 (m, 2 H) 7.77 (d, J = 1.51 Hz, 1 H) 10.11 (s, 1 H) | [M + H]+ | 348 | 1.47 | A |
| 40 | N-(3-(3,4-difluorophenoxy)-2,3-dihydro-1H-inden-5-yl)-acrylamide | 1H NMR (400 MHz, DMSO-d6) δ ppm 1.94-2.07 (m, 1 H) 2.53-2.63 (m, 1 H) 2.76-2.89 (m, 1 H) 2.92-3.08 (m, 1 H) 5.73 (dd, J = 10.14, 2.16 Hz, 1 H) 5.81-5.88 (m, 1 H) 6.22 (dd, J = 16.83, 2.16 Hz, 1 H) 6.41 (dd, J = 16.83, 10.14 Hz, 1 H) 6.80-6.92 (m, 1 H) 7.12-7.23 (m, 1 H) 7.27 (d, J = 8.28 Hz, 1 H) 7.32-7.43 (m, 1 H) 7.58 (dd, J = 8.28, 1.88 Hz, 1 H) 7.75 (d, J = 1.88 Hz, 1 H) 10.10 (s, 1 H) | [M + H]+ | 316 | 1.67 | A |
| 41 | N-(3-(3-fluorophenoxy)-2,3-dihydro-1H-inden-5-yl)-acrylamide | 1H NMR (400 MHz, DMSO-d6) δ ppm 1.95-2.06 (m, 1 H) 2.54-2.65 (m, 1 H) 2.78-2.90 (m, 1 H) 2.93-3.05 (m, 1 H) 5.73 (dd, J = 10.04, 2.01 Hz, 1 H) 5.85-5.91 (m, 1 H) 6.23 (dd, J = 16.94, 2.02 Hz, 1 H) 6.41 (dd, J = 16.94, 10.04 Hz, 1 H) 6.73-6.83 (m, 1 H) 6.85-6.97 (m, 2 H) 7.27 (d, J = 8.28 Hz, 1 H) 7.30-7.38 (m, 1 H) 7.59 (dd, J = 8.28, 1.88 Hz, 1 H) 7.75 (d, J = 1.88 Hz, 1 H) 10.11 (s, 1 H) | [M + H]+ | 298 | 1.33 | A |
| 42 | N-(3-(4-fluorophenoxy)-2,3-dihydro-1H-inden-5-yl)-acrylamide | 1H NMR (400 MHz, DMSO-d6) δ ppm 1.94-2.06 (m, 1 H) 2.53-2.62 (m, 1 H) 2.77-2.89 (m, 1 H) 2.93-3.06 (m, 1 H) 5.73 (dd, J = 10.06, 2.02 Hz, 1 H) 5.76-5.82 (m, 1 H) 6.23 (dd, J = 16.93, 2.02 Hz, 1 H) 6.41 (dd, J = 16.93, 10.06 Hz, 1 H) 7.01-7.08 (m, 2 H) 7.11-7.20 (m, 2 H) 7.26 (d, J = 8.28 Hz, 1 H) 7.57 (dd, J = 8.28, 1.88 Hz, 1 H) 7.74 (d, J = 1.88 Hz, 1 H) 10.10 (s, 1 H) | [M − H]− | 296 | 1.32 | A |
| 43 | N-(3-(3,5-difluorophenoxy)-2,3-dihydro-1H-inden-5-yl)-acrylamide | 1H NMR (400 MHz, DMSO-d6) δ ppm 1.95-2.06 (m, 1 H) 2.53-2.65 (m, 1 H) 2.78-2.89 (m, 1 H) 2.92-3.07 (m, 1 H) 5.73 (dd, J = 10.06, 1.98 Hz, 1 H) 5.89-5.95 (m, 1 H) 6.23 (dd, J = 17.03, 1.98 Hz, 1 H) 6.41 (dd, J = 17.03, 10.06 Hz, 1 H) 6.70-6.92 (m, 3 H) 7.27 (d, J = 8.03 Hz, 1 H) 7.58 (dd, J = 8.03, 2.01 Hz, 1 H) 7.76 (d, J = 2.01 Hz, 1 H) 10.12 (s, 1 H) | [M + H]+ | 316 | 1.37 | A |
| 44 | N-(3-(2,4-difluorophenoxy)-2,3-dihydro-1H-inden-5-yl)-acrylamide | 1H NMR (400 MHz, DMSO-d6) δ ppm 2.01-2.13 (m, 1 H) 2.53-2.59 (m, 1 H) 2.77-2.89 (m, 1 H) 2.96-3.07 (m, 1 H) 5.73 (dd, J = 10.04, 2.01 Hz, 1 H) 5.78-5.84 (m, 1 H) 6.23 (dd, J = 17.02, 2.01 Hz, 1 H) 6.41 (dd, J = 17.02, 10.04 Hz, 1 H) 6.99-7.11 (m, 1 H) 7.22-7.43 (m, 3 H) 7.59 (dd, J = 8.28, 1.76 Hz, 1 H) 7.74 (d, J = 1.76 Hz, 1 H) 10.11 (s, 1 H) | [M + H]+ | 316 | 1.31 | A |
| 45 | N-(1-(3-(trifluoromethyl)-phenoxy)-2,3-dihydro-1H-inden-5-yl)-acrylamide | 1H NMR (400 MHz, DMSO-d6) δ ppm 1.98-2.13 (m, 1 H) 2.54-2.63 (m, 1 H) 2.84-2.94 (m, 1 H) 2.99-3.11 (m, 1 H) 5.76 (dd, J = 9.66, 2.38 Hz, 1 H) 5.89-5.96 (m, 1 H) 6.26 (dd, J = 2.38, 17.04 Hz, 1 H) 6.44 (dd, J = 17.04, 9.66 Hz, 1 H) 7.25-7.39 (m, 4 H) 7.46 (dd, J = 8.28, 1.76 Hz, 1 H) 7.55 (t, J = 8.09 Hz, 1 H) 7.73 (s, 1 H) 10.16 (s, 1 H) | [M + H]+ | 348 | 1.44 | A |
| 46 | N-(1-(3-(trifluoro-methoxy)-phenoxy)-2,3-dihydro-1H-inden-5-yl)-acrylamide | 1H NMR (400 MHz, DMSO-d6) δ ppm 2.04 (dddd, J = 13.55, 8.530, 4.770, 3.76 Hz, 1 H) 2.52-2.61 (m, 1 H) 2.87 (dddd, J = 16.12, 8.720, 4.77 Hz, 1 H) 2.96-3.12 (m, 1 H) 5.76 (dd, J = 10.03, 2.02 Hz, 1 H) 5.87 (dd, J = 6.53, 3.51 Hz, 1 H) 6.26 (dd, J = 16.87, 2.02 Hz, 1 H) 6.44 (dd, J = 16.87, 10.03 Hz, 1 H) 6.94 (dt, J = 8.28, 1.00 Hz, 1 H) 7.01 (s, 1 H) 7.06-7.16 (m, 1 H) 7.34 (d, J = 8.28 Hz, 1 | [M + H]+ | 364 | 1.48 | A |

-continued

| Example No | IUPAC name | NMR Description | Obs Ion(s) type | Obs Ion(s) mass | Tr (min) | Analytical method |
|---|---|---|---|---|---|---|
| 47 | methyl 3-[6-(prop-2-enoyl-amino)-2,3-dihydro-1H-inden-1-yl]-oxybenzoate | H) 7.39-7.51 (m, 2 H) 7.73 (s, 1 H) 10.15 (s, 1 H)<br>1H NMR (400 MHz, DMSO-d6) δ ppm 1.97-2.11 (m, 1 H) 2.55-2.65 (m, 1 H) 2.79-2.92 (m, 1 H) 2.95-3.07 (m, 1 H) 3.86 (s, 3 H) 5.73 (dd, J = 10.23, 2.12 Hz, 1 H) 5.92 (dd, J = 6.57, 4.57 Hz, 1 H) 6.23 (dd, J = 17.05, 2.12 Hz, 1 H) 6.41 (dd, J = 17.05, 10.23 Hz, 1 H) 7.28 (d, J = 8.25 Hz, 1 H) 7.34 (ddd, J = 8.25, 2.720, 1.06 Hz, 1 H) 7.48 (t, J = 7.88 Hz, 1 H) 7.53-7.64 (m, 3 H) 7.75 (d, J = 1.63 Hz, 1 H) 10.12 (s, 1 H) | [M + H]+ | 338 | 1.29 | A |
| 48 | N-(2-((3-fluorophenyl)amino)-2,3-dihydro-1H-inden-5-yl)acrylamide Enantiomer 1 | 1H NMR (400 MHz, DMSO-d6) δ ppm 2.70-2.80 (m, 2 H), 3.20-3.29 (m, 2 H), 4.20 (sxt, J = 6 Hz, 1 H), 5.73 (d, J = 10 Hz, 1 H), 6.20-6.46 (m, 6 H), 7.07 (q, J = 8 Hz, 1 H), 7.17 (d, J = 8 Hz, 1 H), 7.40 (d, J = 8 Hz, 1 H), 7.60 (s, 1 H), 10.04(s, 1 H) | [M + H]+ | 297 | 1.63 | D |
| 49 | N-(2-((3-fluorophenyl)amino)-2,3-dihydro-1H-inden-5-yl)acrylamide Enantiomer 2 | 1H NMR (400 MHz, DMSO-d6) δ ppm 2.69-2.81 (m, 2 H), 3.20-3.30 (m, 2 H), 4.20 (sxt, J = 6 Hz, 1 H), 5.73 (d, J = 10 Hz, 1 H), 6.21-6.46 (m, 6 H), 7.07 (q, J = 8 Hz, 1 H), 7.17 (d, J = 8 Hz, 1 H), 7.40 (d, J = 8 Hz, 1 H), 7.60 (s, 1 H), 10.04(s, 1 H) | [M + H]+ | 297 | 1.63 | D |
| 50 | N-(2-((3-(trifluoromethyl)phenyl)amino)-2,3-dihydro-1H-inden-5-yl)acrylamide Enantiomer 1 | 1H NMR (400 MHz, DMSO-d6) δ ppm 2.77 (m, 2 H), 3.28 (m, 2 H), 4.27 (ddt, J = 12, 7, 6, 6 Hz, 1 H), 5.73 (dd, J = 10, 2 Hz, 1 H), 6.24 (dd, J = 17, 2 Hz, 1 H), 6.42 (m, 2 H), 6.76-6.95 (m, 3 H), 7.18 (d, J = 8 Hz, 1 H), 7.30 (t, J = 8 Hz, 1 H), 7.41 (d, J = 8 Hz, 1 H), 7.61 (s, 1 H), 10.05 (s, 1 H) | [M + H]+ | 347 | 1.80 | D |
| 51 | N-(2-((3-(trifluoromethyl)phenyl)amino)-2,3-dihydro-1H-inden-5-yl)acrylamide Enantiomer 2 | 1H NMR (500 MHz, DMSO-d6) δ ppm 2.76 (td, J = 17, 5 Hz, 2 H), 3.21-3.37 (m, 2 H), 4.27 (dquin, J = 7, 6, 6, 6, 6 Hz, 1 H), 5.73 (dd, J = 10, 2 Hz, 1 H), 6.23 (dd, J = 17, 2 Hz, 1 H), 6.37-6.50 (m, 2 H), 6.81 (d, J = 8 Hz, 1 H), 6.84-6.93 (m, 2 H), 7.17 (d, J = 8 Hz, 1 H), 7.29 (t, J = 8 Hz, 1 H), 7.40 (d, J = 8 Hz, 1 H), 7.60 (s, 1 H), 10.03 (s, 1 H) | [M + H]+ | 347 | 1.85 | D |
| 52 | N-[2-4-(trifluoromethyl)anilino]-2,3-dihydro-1H-inden-5-yl]acrylamide | 1H NMR (500 MHz, DMSO-d6) δ ppm 2.79 (td, J = 16, 5 Hz, 2 H), 3.28 (m, 2 H), 4.28 (m, 1 H), 5.73 (d, J = 10 Hz, 1 H), 6.24 (d, J = 17 Hz, 1 H), 6.42 (dd, J = 17, 10 Hz, 1 H), 6.63 (d, J = 6 Hz, 1 H), 6.73 (d, J = 8 Hz, 2 H), 7.18 (d, J = 8 Hz, 1 H), 7.39 (m, 3 H), 7.61 (s, 1 H), 10.03 (s, 1 H) | [M + H]+ | 347 | 1.38 | A |
| 53 | N-(3-((3,5-difluorophenyl)amino)-2,3-dihydro-1H-inden-5-yl)acrylamide | 1H NMR (400 MHz, DMSO-d6) δ ppm 1.76 (m, 1 H), 2.41 (m, 1 H), 2.77 (m, 1 H), 2.89 (m, 1 H), 4.98 (m, 1 H), 5.71 (dd, J = 10, 2 Hz, 1 H), 6.18-6.27 (m, 2 H), 6.32-6.44 (m, 3 H), 6.63 (br s, 1 H), 7.21 (d, J = 8 Hz, 1 H), 7.58 (m, 2 H), 10.06 (s, 1 H) | [M − H]− | 313 | 1.35 | A |
| 54 | N-(1-((3-(pentafluoro-l6-sulfanyl)phenyl)amino)-2,3-dihydro-1H-inden-5-yl)acrylamide | 1H NMR (400 MHz, DMSO-d6) δ ppm 1.79 (m, 1 H), 2.55 (m hidden, 1 H), 2.80-3.0 (m, 2 H), 4.98 (q, J = 7 Hz, 1 H), 5.75 (d, J = 11 Hz, 1 H), 6.26 (m, 1 H), 6.47 (m, 2 H), 6.97 (m, 2 H), 7.16 (br s, 1 H), 7.22 (d, J = 8 Hz, 1 H), 7.31 (t, J = 8 Hz, 1 H), 7.42 (d, J = 8 Hz, 1 H), 7.68 (s, 1 H), 10.10 (s, 1 H) | [M − H]− | 403 | 1.47 | A |
| 55 | N-(1-((4-(trifluoromethyl)phenyl)amino)-2,3-dihydro-1H-inden-5-yl)acrylamide Enantiomer 1 | 1H NMR (400 MHz, DMSO-d6) δ ppm 1.81 (m, 1 H), 2.54 (m, 1 H), 2.83 (dt, J = 16, 8 Hz, 1 H), 2.95 (ddd, J = 16, 9, 4 Hz, 1 H), 5.00 (q, J = 7 Hz, 1 H), 5.74 (dd, J = 10, 2 Hz, 1 H), 6.24 (dd, J = 17, 2 Hz, 1 H), 6.43 (dd, J = 17, 10 Hz, 1 H), 6.67 (d, J = 8 Hz, 1 H), 6.82 (d, J = 9 Hz, 2 H), 7.21 (d, J = 8 Hz, 1 H), 7.39 (m, 3 H), 7.69 (s, 1 H), 10.11 (s, 1 H) | [M + H]+ | 347 | 1.84 | D |
| 56 | N-(1-((4-(trifluoromethyl)phenyl)amino)-2,3-dihydro-1H-inden-5-yl)acrylamide Enantiomer 2 | 1H NMR (400 MHz, DMSO-d6) δ ppm 1.81 (m, 1 H), 2.54 (m, 1 H), 2.83 (dt, J = 16, 8 Hz, 1 H), 2.95 (ddd, J = 16, 9, 4 Hz, 1 H), 5.00 (q, J = 7 Hz, 1 H), 5.74 (dd, J = 10, 2 Hz, 1 H), 6.25 (dd, J = 17, 2 Hz, 1 H), 6.43 (dd, J = 17, 10 Hz, 1 H), 6.67 (d, J = 8 Hz, 1 H), 6.82 (d, J = 9 Hz, 2 H), 7.21 (d, J = 8 Hz, 1 H), 7.39 (m, 3 H), 7.69 (s, 1 H), 10.11 (s, 1 H) | [M + H]+ | 347 | 1.84 | D |

-continued

| Example No | IUPAC name | NMR Description | Obs Ion(s) type | Obs Ion(s) mass | Tr (min) | Analytical method |
|---|---|---|---|---|---|---|
| 57 | N-[(1S)-1-[[4-(trifluoromethyl)pyridin-2-yl]amino]-2,3-dihydro-1H-inden-5-yl]acrylamide | 1H NMR (500 MHz, DMSO-d6) δ ppm 1.82 (dq, J = 13, 8 Hz, 1 H), 2.55 (m hidden, 1 H), 2.83 (dt, J = 16, 8 Hz, 1 H), 2.95 (ddd, J = 16, 9, 4 Hz, 1 H), 5.50 (q, J = 7 Hz, 1 H), 5.74 (dd, J = 10, 2 Hz, 1 H), 6.25 (dd, J = 17, 2 Hz, 1 H), 6.44 (dd, J = 17, 10 Hz, 1 H), 6.75 (d, J = 5 Hz, 1 H), 6.81 (s, 1 H), 7.20 (d, J = 8 Hz, 1 H), 7.40 (m, 2 H), 7.68 (s, 1 H), 8.24 (d, J = 5 Hz, 1 H), 10.09 (s, 1 H) | [M + H]+ | 348 | 1.53 | D |
| 58 | N-[(1 R)-1-[[4-(trifluoromethyl)pyridin-2-yl]amino]-2,3-dihydro-1H-inden-5-yl]acrylamide | 1H NMR (500 MHz, DMSO-d6) δ ppm 1.82 (dq, J = 13, 8 Hz, 1 H), 2.55 (m hidden, 1 H), 2.83 (dt, J = 16, 8 Hz, 1 H), 2.95 (ddd, J = 16, 9, 4 Hz, 1 H), 5.50 (q, J = 7 Hz, 1 H), 5.74 (dd, J = 10, 2 Hz, 1 H), 6.25 (dd, J = 17, 2 Hz, 1 H), 6.44 (dd, J = 17, 10 Hz, 1 H), 6.75 (d, J = 5 Hz, 1 H), 6.81 (s, 1 H), 7.20 (d, J = 8 Hz, 1 H), 7.40 (m, 2 H), 7.68 (s, 1 H), 8.24 (d, J = 5 Hz, 1 H), 10.09 (s, 1 H) | [M + H]+ | 348 | 1.53 | D |
| 59 | N-(1-((4-(trifluoromethyl)pyridin-2-yl)amino)-2,3-dihydro-1H-inden-5-yl)acrylamide 2,2,2-trifluoroacetate | 1H NMR (400 MHz, DMSO-d6) δ ppm 1.83(m, 1 H), 2.57 (m, 1 H), 2.83 (dt, J = 16, 8 Hz, 1 H), 2.96 (ddd, J = 16, 9, 4 Hz, 1 H), 5.48 (t, J = 6 Hz, 1 H), 5.74 (dd, J = 10, 2 Hz, 1 H), 6.25 (dd, J = 17, 2 Hz, 1 H), 6.44 (dd, J = 17, 10 Hz, 1 H), 6.79 (d, J = 5 Hz, 1 H), 6.88 (s, 1 H), 7.21 (d, J = 8 Hz, 1 H), 7.41 (br d, J = 7 Hz, 1 H), 7.61 (br s, 1 H), 7.68 (s, 1 H), 8.24 (d, J = 5 Hz, 1 H), 10.09 (s, 1 H) | [M + H]+ | 348 | 1.14 | A |
| 60 | N-(1-((6-(trifluoromethyl)pyridin-2-yl)amino)-2,3-dihydro-1H-inden-5-yl)acrylamide | 1H NMR (400 MHz, DMSO-d6) δ ppm 1.84 (m, 1 H), 2.55 (m hidden, 1 H), 2.83 (m, 1 H), 2.95 (m, 1 H), 5.41 (q, J = 7 Hz, 1 H), 5.73 (dd, J = 10, 2 Hz, 1 H), 6.24 (dd, J = 17, 2 Hz, 1 H), 6.43 (dd, J = 17, 10 Hz, 1 H), 6.78 (d, J = 9 Hz, 1 H), 6.93 (d, J = 7 Hz, 1 H), 7.19 (d, J = 8 Hz, 1 H), 7.39 (t, J = 9 Hz, 2 H), 7.58 (t, J = 8 Hz, 1 H), 7.65 (s, 1 H), 10.06 (s, 1 H) | [M + H]+ | 348 | 1.35 | A |
| 61 | N-(1-((5-(trifluoromethyl)pyridin-3-yl)amino)-2,3-dihydro-1H-inden-5-yl)acrylamide | 1H NMR (400 MHz, DMSO-d6) δ ppm 1.79 (m, 1 H), 2.56 (m, 1 H), 2.84 (m, 1 H), 2.96 (m, 1 H), 5.08 (q, J = 7 Hz, 1 H), 5.74 (dd, J = 10, 2 Hz, 1 H), 6.25 (dd, J = 17, 2 Hz, 1 H), 6.44 (dd, J = 17, 10 Hz, 1 H), 6.71 (d, J = 8 Hz, 1 H), 7.22 (d, J = 8 Hz, 1 H), 7.31 (t, J = 2 Hz, 1 H), 7.43 (d, J = 8 Hz, 1 H), 7.69 (s, 1 H), 8.08 (s, 1 H), 8.33 (d, J = 2 Hz, 1 H), 10.10 (s, 1 H) | [M + H]+ | 348 | 1.12 | A |
| 62 | N-(1-(methyl(3-(trifluoromethyl)phenyl)amino)-2,3-dihydro-1H-inden-5-yl)acrylamide | 1H NMR (400 MHz, DMSO-d6) δ ppm 1.90 (dq, J = 13, 8 Hz, 1 H), 2.40 (m, 1 H), 2.61 (s, 3 H), 2.77-3.01 (m, 2 H), 5.60 (t, J = 8 Hz, 1 H), 5.74 (dd, J = 10, 2 Hz, 1 H), 6.25 (dd, J = 17, 2 Hz, 1 H), 6.44 (dd, J = 17, 10 Hz, 1 H), 6.96 (d, J = 8 Hz, 1 H), 7.04 (d, J = 8 Hz, 1 H), 7.10 (s, 1 H), 7.21 (dd, J = 8, 2 Hz, 1 H), 7.42 (m, 2 H), 7.69 (s, 1 H), 10.10 (s, 1 H) | [M − H]− | 359 | 1.51 | A |
| 63 | N-(1-(methyl(phenyl)amino)-2,3-dihydro-1H-inden-5-yl)acrylamide | 1H NMR (400 MHz, DMSO-d6) δ ppm 1.88 (m, 1 H), 2.37 (m, 1 H), 2.54 (s, 3 H), 2.78-2.99 (m, 2 H), 5.51 (t, J = 8 Hz, 1 H), 5.74 (dd, J = 10, 2 Hz, 1 H), 6.24 (dd, J = 17, 2 Hz, 1 H), 6.44 (dd, J = 17, 10 Hz, 1 H), 6.66 (t, J = 7 Hz, 1 H), 6.92 (d, J = 8 Hz, 2 H), 7.04 (d, J = 8 Hz, 1 H), 7.20 (dd, J = 9, 7 Hz, 2 H), 7.42 (d, J = 8 Hz, 1 H), 7.68 (s, 1 H), 10.08 (s, 1 H) | [M − H]− | 291 | 2.96 | B |
| 64 | N-(1-(methyl(4-(trifluoromethyl)phenyl)amino)-2,3-dihydro-1H-inden-5-yl)acrylamide | 1H NMR (400 MHz, DMSO-d6) δ ppm 1.91 (m, 1 H), 2.42 (m, 1 H), 2.62 (s, 3 H), 2.86 (m, 1 H), 2.98 (m, 1 H), 5.62 (t, J = 8 Hz, 1 H), 5.74 (dd, J = 10, 2 Hz, 1 H), 6.25 (dd, J = 17, 2 Hz, 1 H), 6.44 (dd, J = 17, 10 Hz, 1 H), 6.99-7.08 (m, 3 H), 7.43 (br d, J = 8 Hz, 1 H), 7.49 (d, J = 9 Hz, 2 H), 7.70 (s, 1 H), 10.10 (s, 1 H) | [M − H]− | 359 | 1.52 | A |
| 65 | N-(3,3-dimethyl-1-((3-(trifluoromethyl)phenyl)amino)-2,3-dihydro-1H-inden-5-yl)acrylamide | 1H NMR (400 MHz, DMSO-d6) δ ppm 1.23 (s, 3 H), 1.33 (s, 3 H), 1.72 (dd, J = 12, 7 Hz, 1 H), 2.40 (dd, J = 12, 7 Hz, 1 H), 5.05 (q, J = 7 Hz, 1 H), 5.74 (dd, J = 10, 2 Hz, 1 H), 6.24 (dd, J = 17, 2 Hz, 1 H), 6.33-6.49 (m, 2 H), 6.82 (d, J = 8 Hz, 1 H), 6.98 (t, J = 2 Hz, 2 | [M − H]− | 373 | 1.54 | A |

| Example No | IUPAC name | NMR Description | Obs Ion(s) type | Obs Ion(s) mass | Tr (min) | Analytical method |
|---|---|---|---|---|---|---|
| | | H), 7.17 (d, J = 8 Hz, 1 H), 7.29 (t, J = 8 Hz, 1 H), 7.45 (d, J = 8 Hz, 1 H), 7.60 (s, 1 H), 10.12 (s, 1 H) | | | | |
| 66 | N-(3,3-dimethyl-1-((4-(trifluoromethyl)phenyl)amino)-2,3-dihydro-1H-inden-5-yl)acrylamide | 1H NMR (400 MHz, DMSO-d6) δ ppm 1.23 (s, 3 H), 1.33 (s, 3 H), 1.74 (dd, J = 12, 8 Hz, 1 H), 2.40 (dd, J = 12, 7 Hz, 1 H), 5.06 (q, J = 7 Hz, 1 H), 5.74 (dd, J = 10, 2 Hz, 1 H), 6.24 (dd, J = 17, 2 Hz, 1 H), 6.43 (dd, J = 17, 10 Hz, 1 H), 6.64 (d, J = 8 Hz, 1 H), 6.83 (d, J = 9 Hz, 2 H), 7.16 (d, J = 8 Hz, 1 H), 7.39 (d, J = 9 Hz, 2 H), 7.44 (dd, J = 8, 1 Hz, 1 H), 7.61 (s, 1 H), 10.12 (s, 1 H) | [M − H]− | 373 | 1.53 | A |
| 67 | N-[7-fluoro-1-[3-(trifluoromethyl)anilino]-2,3-dihydro-1H-inden-5-yl]acrylamide | 1H NMR (400 MHz, DMSO-d6) δ ppm 1.93 (m, 1 H), 2.41 (m, 1 H), 2.85 (ddd, J = 16, 9, 5 Hz, 1 H), 3.06 (dt, J = 16, 8 Hz, 1 H), 5.14 (td, J = 8, 4 Hz, 1 H), 5.78 (dd, J = 10, 2 Hz, 1 H), 6.27 (dd, J = 17, 2 Hz, 1 H), 6.42 (dd, J = 17, 10 Hz, 2 H), 6.81 (d, J = 8 Hz, 1 H), 6.92 (m, 2 H), 7.28 (t, J = 8 Hz, 1 H), 7.37 (d, J = 2 Hz, 1 H), 7.42 (dd, J = 12, 2 Hz, 1 H), 10.29 (s, 1 H) | [M − H]− | 363 | 1.44 | A |
| 68 | N-[4-fluoro-1-[4-(trifluoromethyl)anilino]-2,3-dihydro-1H-inden-5-yl]acrylamide | 1H NMR (400 MHz, DMSO-d6) δ ppm 1.88 (m, 1 H), 2.57 (m, 1 H), 2.87 (m, 1 H), 3.03 (m, 1 H), 5.09 (q, J = 7 Hz, 1 H), 5.76 (dd, J = 10, 2 Hz, 1 H), 6.25 (dd, J = 17, 2 Hz, 1 H), 6.58 (dd, J = 17, 10 Hz, 1 H), 6.72 (d, J = 8 Hz, 1 H), 6.83 (d, J = 9 Hz, 2 H), 7.06 (d, J = 8 Hz, 1 H), 7.40 (d, J = 9 Hz, 2 H), 7.71 (t, J = 8 Hz, 1 H), 9.88 (s, 1 H) | [M − H]− | 363 | 1.43 | A |
| 69 | N-methyl-N-(1-((4-(trifluoromethyl)phenyl)amino)-2,3-dihydro-1H-inden-5-yl)acrylamide | 1H NMR (400 MHz, DMSO-d6) δ ppm 1.85 (m, 1 H), 2.59 (m, 1 H), 2.81-3.07 (m, 2 H), 3.23 (s, 3 H), 5.08 (q, J = 7 Hz, 1 H), 5.57 (m, 1 H), 6.04-6.22 (m, 2 H), 6.72 (d, J = 8 Hz, 1 H), 6.85 (d, J = 9 Hz, 2 H), 7.08 (d, J = 8 Hz, 1 H), 7.21 (s, 1 H), 7.32 (d, J = 8 Hz, 1 H), 7.40 (d, J = 9 Hz, 2 H) | [M + H]+ | 361 | 1.48 | A |
| 70 | N-(3-((4,4-difluorocyclohexyl)amino)-2,3-dihydro-1H-inden-5-yl)acrylamide | 1H NMR (400 MHz, DMSO-d6) δ ppm 1.43-1.55 (m, 2 H), 1.60-1.94 (m, 6 H), 1.99-2.15 (m, 2 H), 2.37 (m, 1 H), 2.66 (m, 1 H), 2.79-2.90 (m, 2 H), 4.17 (q, J = 7 Hz, 1 H), 5.72 (dd, J = 10, 2 Hz, 1 H), 6.23 (dd, J = 17, 2 Hz, 1 H), 6.42 (dd, J = 17, 10 Hz, 1 H), 7.13 (d, J = 8 Hz, 1 H), 7.52 (br d, J = 8 Hz, 1 H), 7.59 (s, 1 H), 10.02 (s, 1 H) | [M + H]+ | 321 | 0.52 | A |
| 71 | N-(3-((3-(trifluoromethyl)cyclopentyl)oxy)-2,3-dihydro-1H-inden-5-yl)acrylamide | 1H NMR (400 MHz, DMSO-d6) δ ppm 1.59 (m, 1 H), 1.70-1.91 (m, 5 H), 2.24 (m, 1 H), 2.35 (m, 1 H), 2.68 (m, 1 H), 2.77-2.92 (m, 2 H), 4.17 (m, 1 H), 4.92 (t, J = 6 Hz, 1 H), 5.73 (dd, J = 10, 2 Hz, 1 H), 6.24 (dd, J = 17, 2 Hz, 1 H), 6.42 (dd, J = 17, 10 Hz, 1 H), 7.18 (d, J = 8 Hz, 1 H), 7.53 (dd, J = 8, 2 Hz, 1 H), 7.64 (dd, J = 5, 2 Hz, 1 H), 10.07 (br s, 1 H) | [M + H]+ | 340 | 1.34 | A |
| 72 | N-(3-((5,5,5-trifluoropentyl)oxy)-2,3-dihydro-1H-inden-5-yl)acrylamide | 1H NMR (400 MHz, DMSO-d6) δ ppm 1.48-1.66 (m, 4 H), 1.92 (m, 1 H), 2.18-2.38 (m, 3 H), 2.69 (m, 1 H), 2.89 (m, 1 H), 3.53 (t, J = 6 Hz, 2 H), 4.85 (t, J = 6 Hz, 1 H), 5.73 (dd, J = 10, 2 Hz, 1 H), 6.24 (dd, J = 17, 2 Hz, 1 H), 6.42 (dd, J = 17, 10 Hz, 1 H), 7.19 (d, J = 8 Hz, 1 H), 7.49 (dd, J = 9, 2 Hz, 1 H), 7.72 (s, 1 H), 10.07 (s, 1 H) | [M + H]+ | 328 | 1.32 | A |
| 73 | N-(3-(4,4-difluorobutoxy)-2,3-dihydro-1H-inden-5-yl)acrylamide | 1H NMR (400 MHz, DMSO-d6) δ ppm 1.54-1.74 (m, 2 H), 1.78-1.99 (m, 3 H), 2.33 (m, 1 H), 2.70 (m, 1 H), 2.89 (m, 1 H), 3.50-3.60 (m, 2 H), 4.86 (t, J = 6 Hz, 1 H), 5.73 (dd, J = 10, 2 Hz, 1 H), 6.09 (tt, J = 56, 4 Hz, 1 H), 6.24 (dd, J = 17, 2 Hz, 1 H), 6.42 (dd, J = 17, 10 Hz, 1 H), 7.20 (d, J = 8 Hz, 1 H), 7.51 (d, J = 7 Hz, 1 H), 7.71 (s, 1 H), 10.07 (s, 1 H) | [M + H]+ | 296 | 1.17 | A |
| 74 | N-(3-(2,2,2-trifluoroethoxy)-2,3-dihydro-1H-inden-5-yl)acrylamide | 1H NMR (400 MHz, DMSO-d6) δ ppm 1.99 (m, 1 H), 2.36 (m, 1 H), 2.72 (m, 1 H), 2.92 (m, 1 H), 4.07-4.21 (m, 2 H), 5.09 (dd, J = 6, 5 Hz, 1 H), 5.74 (dd, J = 10, 2 Hz, 1 H), 6.25 (dd, J = 17, 2 Hz, 1 H), 6.42 (dd, J = 17, 10 Hz, 1 H), 7.23 (d, J = 8 Hz, 1 H), 7.55 (dd, J = 8, 2 Hz, 1 H), 7.75 (s, 1 H), 10.11 (s, 1 H) | [M + H]+ | 286 | 1.14 | A |

| Example No | IUPAC name | NMR Description | Obs Ion(s) type | Obs Ion(s) mass | Tr (min) | Analytical method |
|---|---|---|---|---|---|---|
| 75 | N-(3-(3,3,3-trifluoropropoxy)-2,3-dihydro-1H-inden-5-yl)acrylamide | 1H NMR (400 MHz, DMSO-d6) δ ppm 1.92 (m, 1 H), 2.33 (m, 1 H), 2.52-2.61 (m, 2 H), 2.71 (m, 1 H), 2.90 (m, 1 H), 3.72 (m, 2 H), 4.92 (dd, J = 6, 5 Hz, 1 H), 5.73 (dd, J = 10, 2 Hz, 1 H), 6.24 (dd, J = 17, 2 Hz, 1 H), 6.43 (dd, J = 17, 10 Hz, 1 H), 7.20 (d, J = 8 Hz, 1 H), 7.52 (dd, J = 8, 2 Hz, 1 H), 7.72 (s, 1 H), 10.09 (s, 1 H) | [M + H]+ | 300 | 1.18 | A |
| 76 | N-methyl-N-(1-((4-(trifluoromethyl)cyclohexyl)oxy)-2,3-dihydro-1H-inden-5-yl)acrylamide | 1H NMR (400 MHz, DMSO-d6) δ ppm 1.31 (m, 1 H), 1.48-1.69 (m, 4 H) 1.74-2.21 (m, 4 H) 2.24-2.46 (m, 2 H), 2.78 (m, 1 H), 2.96 (m, 1 H), 3.24 (s, 3 H), 3.86 (br s, 1 H), 4.99 (br t, J = 6 Hz, 1 H), 5.56 (br d, J = 12 Hz, 1 H), 6.13 (m, 2 H), 7.13 (m, 2 H), 7.36 (m, 1 H) | [M + H]+ | 368 | 1.56 1.52 | A |
| 77 | N-(3-(4-chlorophenoxy)-2,3-dihydro-1H-inden-5-yl)acrylamide | 1H NMR (400 MHz, DMSO-d6) δ ppm 2.00 (m, 1 H), 2.57 (m, 1 H), 2.83 (m, 1 H), 2.98 (m, 1 H), 5.73 (dd, J = 10, 2 Hz, 1 H), 5.84 (dd, J = 7, 5 Hz, 1 H), 6.23 (dd, J = 17, 2 Hz, 1 H), 6.41 (dd, J = 17, 10 Hz, 1 H), 7.07 (d, J = 9 Hz, 2 H), 7.27 (d, J = 8 Hz, 1 H), 7.36 (dd, J = 10, 1 Hz, 2 H), 7.58 (dd, J = 8, 2 Hz, 1 H), 7.74 (s, 1 H), 10.11 (s, 1 H) | [M − H]− | 312 | 1.40 | A |
| 78 | N-(3-(3-chlorophenoxy)-2,3-dihydro-1H-inden-5-yl)acrylamide | 1H NMR (400 MHz, DMSO-d6) δ ppm 2.00 (m, 1 H), 2.59 (m, 1 H), 2.84 (m, 1 H), 2.98 (m, 1 H), 5.73 (dd, J = 10, 2 Hz, 1 H), 5.90 (dd, J = 6, 5 Hz, 1 H), 6.23 (dd, J = 17, 2 Hz, 1 H), 6.41 (dd, J = 17, 10 Hz, 1 H), 7.02 (dd, J = 8, 2 Hz, 2 H), 7.12 (t, J = 2 Hz, 1 H), 7.27 (d, J = 8 Hz, 1 H), 7.34 (t, J = 8 Hz, 1 H), 7.58 (d, J = 8 Hz, 1 H), 7.75 (s, 1 H), 10.12 (s, 1 H) | [M + H]+ | 314 | 1.39 | A |
| 79 | N-(3-(m-tolyloxy)-2,3-dihydro-1H-inden-5-yl)acrylamide | 1H NMR (400 MHz, DMSO-d6) δ ppm 1.84 (m, 1 H), 2.27 (s, 3 H), 2.44 (m, 1 H), 2.68 (m, 1 H), 2.75-3.00 (m, 2 H), 5.68 (dd, J = 10, 2 Hz, 1 H), 6.18 (dd, J = 17, 2 Hz, 1 H), 6.36 (dd, J = 17, 10 Hz, 1 H), 6.50 (dd, J = 8, 2 Hz, 1 H), 6.61 (d, J = 3 Hz, 1 H), 6.67 (d, J = 8 Hz, 1 H), 7.16 (s, 1 H), 7.21 (d, J = 8 Hz, 1 H), 7.50 (d, J = 8 Hz, 1 H), 7.63 (m, 1 H), 9.95 (s, 1 H) | [M + H]+ | 294 | 1.19 | A |
| 80 | N-(3-(3-(methylthio)phenoxy)-2,3-dihydro-1H-inden-5-yl)acrylamide | 1H NMR (400 MHz, DMSO-d6) δ ppm 2.01 (m, 1 H), 2.47 (s, 3 H), 2.57 (m, 1 H), 2.83 (m, 1 H), 2.98 (m, 1 H), 5.73 (dd, J = 10, 3 Hz, 1 H), 5.87 (dd, J = 7, 4 Hz, 1 H), 6.23 (dd, J = 17, 2 Hz, 1 H), 6.41 (dd, J = 17, 10 Hz, 1 H), 6.85 (m, 3 H), 7.25 (m, 2 H), 7.58 (dd, J = 8, 2 Hz, 1 H), 0.00 (d, J = 9 Hz, 1 H), 10.11 (s, 1 H) | [M + H]+ | 326 | 1.38 | A |
| 81 | N-(3-(3-cyclopropylphenoxy)-2,3-dihydro-1H-inden-5-yl)acrylamide | 1H NMR (400 MHz, DMSO-d6) δ ppm 0.68 (m, 2 H), 0.93 (m, 2 H), 1.84-2.05 (m, 2 H), 2.60 (m, 1 H), 2.82 (m hidden, 1 H), 2.97 (m, 1 H), 5.73 (dd, J = 10, 2 Hz, 1 H), 5.82 (t, J = 6 Hz, 1 H), 6.23 (dd, J = 17, 2 Hz, 1 H), 6.41 (dd, J = 17, 10 Hz, 1 H), 6.63-6.74 (m, 2 H), 6.74-6.87 (m, 1 H), 7.17 (t, J = 8 Hz, 1 H), 7.26 (d, J = 8 Hz, 1 H), 7.50-7.69 (m, 1 H), 7.73 (s, 1 H), 10.10 (s, 1 H) | [M + H]+ | 320 | 1.44 | A |
| 82 | N-(1-(4-(trifluoromethyl)phenoxy)-2,3-dihydro-1H-inden-5-yl)acrylamide | 1H NMR (400 MHz, DMSO-d6) δ ppm 2.06 (ddt, J = 13, 9, 4, 4 Hz, 1 H), 2.59 (m, 1 H), 2.90 (m, 1 H), 3.05 (m, 1 H), 5.76 (dd, J = 10, 2 Hz, 1 H), 5.93 (dd, J = 6, 3 Hz, 1 H), 6.27 (dd, J = 17, 2 Hz, 1 H), 6.45 (dd, J = 17, 10 Hz, 1 H), 7.22 (d, J = 9 Hz, 2 H), 7.36 (d, J = 8 Hz, 1 H), 7.47 (d, J = 8 Hz, 1 H), 7.67 (m, J = 9 Hz, 2 H), 7.75 (s, 1 H), 10.17 (s, 1 H) | [M + H]+ | 348 | 1.43 | A |
| 83 | N-methyl-N-(1-(4-(trifluoromethyl)phenoxy)-2,3-dihydro-1H-inden-5-yl)acrylamide | 1H NMR (400 MHz, DMSO-d6) δ ppm 2.09 (m, 1 H), 2.65 (m, 1 H), 2.93 (m, 1 H), 3.06 (dd, J = 8, 6 Hz, 1 H), 3.25 (s, 3 H), 5.58 (m, 1 H), 5.99 (dd, J = 7, 4 Hz, 1 H), 6.05-6.22 (m, 2 H), 7.14 (dd, J = 8, 2 Hz, 1 H), 7.25 (d, J = 9 Hz, 2 H), 7.27 (d, J = 2 Hz, 1 H), 7.48 (d, J = 8 Hz, 1 H), 7.68 (d, J = 8 Hz, 2 H) | [M + H]+ | 362 | 1.52 | A |
| 84 | N-(1-(3-(trifluoromethyl)phenoxy)-2,3-dihydro-1H-inden-5-yl)acrylamide Enantiomer 1 | 1H NMR (400 MHz, DMSO-d6) δ ppm 2.04 (qd, J = 9, 5 Hz, 1 H), 2.57 (m, 1 H), 2.88 (m, 1 H), 3.05 (dt, J = 15, 8 Hz, 1 H), 5.76 (dd, J = 10, 2 Hz, 1 H), 5.94 (dd, J = 7, 3 Hz, 1 H), | [M + H]+ | 348 | 1.85 | D |

-continued

| Example No | IUPAC name | NMR Description | Obs Ion(s) type | Obs Ion(s) mass | Tr (min) | Analytical method |
|---|---|---|---|---|---|---|
| | | 6.26 (dd, J = 17, 2 Hz, 1 H), 6.45 (dd, J = 17, 10 Hz, 1 H), 7.33 (m, 4 H), 7.46 (d, J = 8 Hz, 1 H), 7.55 (t, J = 8 Hz, 1 H), 7.74 (s, 1 H), 10.18 (s, 1 H) | | | | |
| 85 | N-(1-(3-(trifluoromethyl)phenoxy)-2,3-dihydro-1H-inden-5-yl)acrylamide Enantiomer 2 | 1H NMR (400 MHz, DMSO-d6) δ ppm 2.04 (ddt, J = 13, 9, 4, 4 Hz, 1 H), 2.58 (m, 1 H), 2.88 (m, 1 H), 3.04 (m, 1 H), 5.76 (dd, J = 10, 2 Hz, 1 H), 5.94 (dd, J = 6, 3 Hz, 1 H), 6.26 (dd, J = 17, 2 Hz, 1 H), 6.45 (dd, J = 17, 10 Hz, 1 H), 7.28-7.38 (m, 4 H), 7.46 (d, J = 8 Hz, 1 H), 7.55 (t, J = 8 Hz, 1 H), 7.74 (s, 1 H), 10.18 (s, 1 H) | [M + H]+ | 348 | 1.85 | D |
| 86 | N-(3-(4-(trifluoromethyl)phenoxy)-2,3-dihydro-1H-inden-5-yl)acrylamide Enantiomer 1 | 1H NMR (400 MHz, DMSO-d6) δ ppm 2.03 (m, 1 H), 2.63 (m, 1 H), 2.86 (m, 1 H), 3.00 (m, 1 H), 5.73 (dd, J = 10, 2 Hz, 1 H), 5.97 (dd, J = 6, 4 Hz, 1 H), 6.23 (dd, J = 17, 2 Hz, 1 H), 6.41 (dd, J = 17, 10 Hz, 1 H), 7.23 (d, J = 9 Hz, 2 H), 7.28 (d, J = 8 Hz, 1 H), 7.60 (dd, J = 8, 2 Hz, 1 H), 7.68 (d, J = 9 Hz, 2 H), 7.76 (s, 1 H), 10.12 (s, 1 H) | [M + H]+ | 348 | 1.46 | A |
| 87 | N-(3-(4-(trifluoromethyl)phenoxy)-2,3-dihydro-1H-inden-5-yl)acrylamide Enantiomer 2 | 1H NMR (400 MHz, DMSO-d6) δ ppm 2.03 (m, 1 H), 2.64 (m, 1 H), 2.86 (m, 1 H), 3.00 (m, 1 H), 5.73 (dd, J = 10, 2 Hz, 1 H), 5.97 (dd, J = 7, 4 Hz, 1 H), 6.23 (dd, J = 17, 2 Hz, 1 H), 6.41 (dd, J = 17, 10 Hz, 1 H), 7.23 (d, J = 9 Hz, 2 H), 7.28 (d, J = 8 Hz, 1 H), 7.60 (dd, J = 8, 2 Hz, 1 H), 7.68 (d, J = 9 Hz, 2 H), 7.76 (s, 1 H), 10.12 (s, 1 H) | [M + H]+ | 348 | 1.45 | A |
| 88 | N-[3-[5-(trifluoromethyl)pyridin-2-yl]oxyindan-5-yl]prop-2-enamide | 1H NMR (500 MHz, DMSO-d6) δ ppm 2.10 (m, 1 H), 2.61 (m, 1 H), 2.86 (m, 1 H), 3.02 (m, 1 H), 5.72 (m, 1 H), 6.22 (d, J = 17, 2 Hz, 1 H), 6.40 (dd, J = 17, 10 Hz, 1 H), 6.56 (dd, J = 7, 4 Hz, 1 H), 7.00 (d, J = 9 Hz, 1 H), 7.28 (d, J = 8 Hz, 1 H), 7.61 (dd, J = 8, 2 Hz, 1 H), 7.75 (s, 1 H), 8.08 (dd, J = 9, 3 Hz, 1 H), 8.66 (m, 1 H), 10.07 (s, 1 H) | [M + H]+ | 349 | 1.41 | A |
| 89 | N-methyl-N-(1-(3-(trifluoromethyl)phenoxy)-2,3-dihydro-1H-inden-5-yl)acrylamide | 1H NMR (400 MHz, DMSO-d6) δ ppm 2.08 (qd, J = 9, 5 Hz, 1 H), 2.64 (m, 1 H), 2.93 (m, 1 H), 3.07 (m, 1 H), 3.25 (s, 3 H), 5.58 (m, 1 H), 6.00 (dd, J = 6, 4 Hz, 1 H), 6.14 (m, 2 H), 7.14 (d, J = 8 Hz, 1 H), 7.27 (s, 1 H), 7.33 (m, 2 H), 7.38 (d, J = 8 Hz, 1 H), 7.47 (d, J = 8 Hz, 1 H), 7.57 (t, J = 7 Hz, 1 H) | [M + H]+ | 362 | 1.53 | A |
| 90 | N-[2-fluoro-3-[4-(trifluoromethyl)anilino]-2,3-dihydro-1H-inden-5-yl]acrylamide | 1H NMR (400 MHz, DMSO-d6) δ ppm 3.11 (m, 2 H), 5.25 (ddd, J = 25, 9, 4 Hz, 1 H), 5.48 (dt, J = 55, 4 Hz, 1 H), 5.73 (dd, J = 10, 2 Hz, 1 H), 6.23 (dd, J = 17, 2 Hz, 1 H), 6.41 (dd, J = 17, 10 Hz, 1 H), 6.79 (d, J = 10 Hz, 1 H), 7.01 (d, J = 9 Hz, 2 H), 7.28 (d, J = 8 Hz, 1 H), 7.44 (d, J = 9 Hz, 2 H), 7.59 (s, 1 H), 7.66 (d, J = 8 Hz, 1 H), 10.13 (s, 1 H) | [M + H]+ | 365 | 1.34 | A |
| 91 | N-(2-fluoro-3-((3-(trifluoromethyl)phenyl)amino)-2,3-dihydro-1H-inden-5-yl)acrylamide | 1H NMR (400 MHz, DMSO-d6) δ ppm 3.09 (m, 1 H), 3.23 (m, 1 H), 5.26 (ddd, J = 25, 10, 4 Hz, 1 H), 5.46 (dt, J = 55, 4 Hz, 1 H), 5.72 (dd, J = 10, 2 Hz, 1 H), 6.22 (dd, J = 17, 2 Hz, 1 H), 6.41 (dd, J = 17, 10 Hz, 1 H), 6.56 (d, J = 10 Hz, 1 H), 6.88 (d, J = 8 Hz, 1 H), 7.15 (d, J = 8 Hz, 1 H), 7.19 (s, 1 H), 7.26 (d, J = 8 Hz, 1 H), 7.33 (t, J = 8 Hz, 1 H), 7.60 (s, 1 H), 7.64 (d, J = 8 Hz, 1 H), 10.11 (s, 1 H) | [M + H]+ | 556 | 1.09 | A |
| 92 | N-[2-fluoro-3-[4-(trifluoromethyl)phenoxy]-2,3-dihydro-1H-inden-5-yl]acrylamide | 1H NMR (400 MHz, DMSO-d6) δ ppm 3.06 (m, 2 H), 5.45 (m, 1 H), 5.73 (dd, J = 10, 2 Hz, 1 H), 6.12 (m, 1 H), 6.23 (dd, J = 17, 2 Hz, 1 H), 6.39 (dd, J = 17, 10 Hz, 1 H), 7.31 (dd, J = 8, 4 Hz, 3 H), 7.66 (m, 1 H), 7.74 (m, 3 H), 10.16 (s, 1 H) | [M + H]+ | 366 | 1.41 | A |
| 93 | N-methyl-N-(2-methyl-1-((3-(trifluoromethyl)phenyl)amino)-2,3-dihydro-1H-inden-5-yl)acrylamide | 1H NMR (400 MHz, DMSO-d6) δ ppm 0.81 (d, J = 7 Hz, 3 H), 2.64 (dd, J = 16, 4 Hz, 1 H), 2.92 (ddt, J = 10, 7, 4 Hz, 1 H), 3.08 (dd, J = 16, 7 Hz, 1 H), 3.24 (s, 3 H), 5.10 (dd, J = 9, 7 Hz, 1 H), 5.58 (m, 1 H), 6.07 (m, 1 H), 6.14 (dd, J = 3, 1 H), 6.44 (d, J = 9 Hz, 1 H), 6.84 (d, J = 8 Hz, 1 H), 7.08 (m, 2 H), 7.11 (dd, J = 8, 2 Hz, 1 H), 7.20 (d, J = 2 Hz, 1 H), 7.31 (br t, J = 8 Hz, 1 H), 7.36 (d, J = 8 Hz, 1 H) | [M + H]+ | 375 | 1.55 | A |

| Example No | IUPAC name | NMR Description | Obs Ion(s) type | Obs Ion(s) mass | Tr (min) | Analytical method |
| --- | --- | --- | --- | --- | --- | --- |
| 94 | N-[(cis)-3-methoxy-1-[3-(trifluoromethyl)anilino]-2,3-dihydro-1H-inden-5-yl]acrylamide | 1H NMR (400 MHz, DMSO-d6) δ = 10.19 (s, 1H, CONH), 7.84 (s, 1H, Ar), 7.52 (dd, J = 1.6, 8.4 Hz, 1H, Ar), 7.33-7.27 (m, 1H, Ar), 7.23 (d, J = 8.0 Hz, 1H, Ar), 7.00 (s, 1H, ArNH), 7.00-6.95 (m, 1H, Ar), 6.84 (d, J = 7.6 Hz, 1H, Ar), 6.51 (d, J = 8.4 Hz, 1H, Ar), 6.48-6.38 (m, 1H, CH2CH), 6.31-6.21 (m, 1H, CHCH2), 5.75 (dd, J = 2.0, 10.0 Hz, 1H, CHCH2), 4.89 (q, J = 7.6 Hz, 1H, CH), 4.77 (t, J = 6.8 Hz, 1H, CH), 3.39 (s, 3H, CH3), 3.01 (td, J = 6.8, 12.4 Hz, 1H, CH2), 1.63 (td, J = 7.6, 12.4 Hz, 1H, CH2). | [M+Na]+ | 399 | 0.95 | C |
| 95 | N-[(trans)-2-hydroxy-1-[3-(trifluoromethyl)anilino]-2,3-dihydro-1H-inden-5-yl]acrylamide | 1H NMR (400 MHz, DMSO-d6) δ = 10.11 (s, 1H, CONH), 7.64 (s, 1H, Ar), 7.40 (dd, J = 1.6, 8.4 Hz, 1H, Ar), 7.29 (t, J = 8.0 Hz, 1 H, Ar), 7.18 (d, J = 8.0 Hz, 1 H, Ar), 7.02-7.00 (m, 2H, Ar), 6.82 (d, J = 7.6 Hz, 1H, Ar), 6.47-6.38 (m, 2H, CHCH2, NH), 6.27-6.22 (m, 1H, CHCH2), 5.74 (dd, J = 2.0, 10.0 Hz, 1H, CHCH2), 5.34 (d, J = 4.8 Hz, 1H, OH), 4.62-5.91 (m, 1H, CH), 4.21-4.16 (m, 1H, CH), 3.17 (dd, J = 6.8, 16.4 Hz, 1H, CH2), 2.72 (dd, J = 5.6, 16.0 Hz, 1H, CH2) | [M+Na]+ | 385 | 0.86 | C |
| 96 | N-[rac-(2R,3R)-2-hydroxy-3-[3-(trifluoromethyl)anilino]-2,3-dihydro-1H-inden-5-yl]acrylamide | 1H NMR (400 MHz, DMSO-d6) δ = 10.07 (s, 1H, CONH), 7.60 (dd, J = 1.2, 8.0 Hz, 1 H, Ar), 7.50 (s, 1H, Ar), 7.30 (t, J = 8.0 Hz, 1H, Ar), 7.18 (d, J = 8.4 Hz, 1H, Ar), 7.02-7.00 (m, 2H, Ar), 6.83 (d, J = 7.6 Hz, 1H, Ar), 6.49 (d, J = 8.0 Hz, 1 H, NH), 6.39 (dd, J = 10.0, 17.2 Hz, 1H, CHCH2), 6.21 (dd, J = 1.6, 16.8 Hz, 1H, CHCH2), 5.71 (dd, J = 2.0, 10.0 Hz, 1H, CHCH2), 5.36 (d, J = 5.2 Hz, 1H, OH), 4.68-4.65 (m, 1H, CH), 4.22-4.18 (m, 1H, CH), 3.11 (dd, J = 6.8, 15.6 Hz, 1H, CH2), 2.69 (dd, J = 6.0, 15.6 Hz, 1H, CH2) | [M + H]+ | 363 | 0.86 | C |

TEAD-Luciferase Reporter Assay

Luciferase-based gene reporter assays were used, employing the TEAD responsive promoter element that are stably integrated to different human tumor cell lines in order to monitor YAP1-TEAD and TAZ-TEAD activity and to study YAP1/TAZ-TEAD activity modulation by small molecule compounds. Luciferase-based gene reporter assays employing the GAPDH promoter element and stably integrated to different human tumor cell lines are used as counter screen control cell lines.

Tumor cell lines with stable integration of the 8XGTIIC-Luciferase construct (Dupont et al., Nature 2011) or the GAPDH-Luciferase control plasmid, are seeded in culture medium in 96-well plates at a density of 8000 cells/well. Following an overnight incubation in a 37° C., 5% CO2 growth chamber, cells are treated with compounds described above at 10 doses ranging between 1 and 10000 nM for 48 hrs. After compound incubation, cells are lysed with Bright-Glo Luciferase Assay System (Promega E2620) and luciferase activity is measured using a luminescent plate reader.

The inhibitory activity of the compounds with respect to luciferase activity is given by the concentration which inhibits 50% of activity of non-treated cells. IC50s are determined with a nonlinear regression model on XLfit software analysis (IDBS, UK).

The IC50 values for the compounds of the invention were generally less than 1 μM, more particularly between 1 and 550 nM and even more particularly between 1 and 100 nM, as indicated in the table below:

| example No | TEAD IC50 (nM) |
| --- | --- |
| 1 | 72 |
| 2 | 38 |
| 3 | 109 |
| 4 | 142 |
| 5 | 29 |
| 6 | 31 |
| 7 | 28 |
| 8 | 132 |
| 9 | 167 |
| 10 | 44 |
| 11 | 37 |
| 12 | 55 |
| 13 | 37 |
| 14 | 54 |
| 15 | 48 |
| 16 | 38 |
| 17 | >10000 |
| 18 | 213 |
| 19 | 503 |
| 20 | 358 |
| 21 | 262 |
| 22 | >10000 |
| 23 | 9527 |
| 24 | 8040 |
| 25 | 8236 |
| 26 | >10000 |
| 27 | >10000 |
| 28 | 4021 |
| 29 | >10000 |
| 30 | >10000 |
| 31 | 20 |
| 32 | 64 |
| 33 | 170 |
| 34 | 2526 |

-continued

| example No | TEAD IC50 (nM) |
|---|---|
| 35 | 583 |
| 36 | 99 |
| 37 | 24 |
| 38 | 74 |
| 39 | 53 |
| 40 | 15 |
| 41 | 87 |
| 42 | 29 |
| 43 | 140 |
| 44 | 38 |
| 45 | 12 |
| 46 | 4564 |
| 47 | 4347 |
| 48 | 69 |
| 49 | 105 |
| 50 | 76 |
| 51 | 4334 |
| 52 | 2822 |
| 53 | 57 |
| 54 | 388 |
| 55 | 38 |
| 56 | 44 |
| 57 | 134 |
| 58 | 216 |
| 59 | 60 |
| 60 | 346 |
| 61 | 178 |
| 62 | 70 |
| 63 | 144 |
| 64 | 806 |
| 65 | 1849 |
| 66 | 863 |
| 67 | 53 |
| 68 | 290 |
| 69 | 349 |
| 70 | 5259 |
| 71 | 820 |
| 72 | 861 |
| 73 | 1313 |
| 74 | 3687 |
| 75 | 4717 |
| 76 | 777 |
| 77 | 56 |
| 78 | 52 |
| 79 | 8670 |
| 80 | 300 |
| 81 | 117 |
| 82 | 31 |
| 83 | 109 |
| 84 | 153 |
| 85 | 42 |
| 86 | 134 |
| 87 | 28 |
| 88 | 51 |
| 89 | 1056 |
| 90 | 84 |
| 91 | 209 |
| 92 | 95 |
| 93 | 513 |
| 94 | 395 |
| 95 | 653 |
| 96 | 1977 |

It is therefore apparent that the compounds of formula (I), in particular of formula (I'), have an inhibitory activity of YAP1/TAZ-TEAD or TEAD-dependent gene transcription.

The compounds of formula (I), in particular of formula (I'), may thus be used as inhibitors of YAP1/TAZ-TEAD or TEAD-dependent gene transcription.

The compounds of formula (I), in particular of formula (I'), may thus be used as medicaments, especially medicaments which are inhibitors of YAP1/TAZ-TEAD or TEAD-dependent gene transcription.

Thus, according to another of its aspects, a subject of the invention is medicaments that comprise a compound of formula (I), in particular of formula (I'), or an addition salt thereof with a pharmaceutically acceptable acid.

These medicaments are employed therapeutically in the treatment of cancer, in particular in the treatment of breast, ovarian, uterine, prostate, lung, gastric, colorectal, bladder, pancreatic and liver cancers, sarcomas, esophageal, head and neck cancers, uveal melanoma, or glioma.

According to another of its aspects, the present invention relates to pharmaceutical compositions comprising as active principle, a compound of formula (I), in particular of formula (I'). These pharmaceutical compositions contain an effective dose of at least one compound of formula (I), in particular of formula (I'), or a pharmaceutically acceptable salt of the said compound.

These pharmaceutical compositions may also contain at least one pharmaceutically acceptable excipient.

The said excipients are chosen, according to the pharmaceutical form and the desired mode of administration, from the usual excipients known to those skilled in the art.

The compounds of formula (I), in particular of formula (I'), may be used in the treatment of pathologies involving YAP1/TAZ-TEAD or TEAD-dependent gene transcription inhibitors.

In particular, the compounds of formula (I), in particular of formula (I'), may be used as an anticancer agent, in particular for use in the treatment of breast, ovarian, uterine, prostate, lung, gastric, colorectal, bladder, pancreatic and liver cancers, sarcomas, esophageal, head and neck cancers, uveal melanoma, or glioma.

The compounds of formula (I), in particular of formula (I'), may also be used in the treatment of a patient who has exhibited resistance to prior anti-cancer therapy.

The present invention, according to another of its aspects, also provides a method of treating the pathologies indicated above.

Thus, described is also a method of treating cancer, in particular breast, ovarian, uterine, prostate, lung, gastric, colorectal, bladder, pancreatic and liver cancers, sarcomas, esophageal, head and neck cancers, uveal melanoma, or glioma, including administering to a subject in need thereof a therapeutically effective amount of at least one compound of formula (I), in particular of formula (I'), or a pharmaceutically acceptable salt thereof.

The compounds of formula (I), in particular of formula (I'), may also be used in a method if treating cancer in a patient who has exhibited resistance to prior anti-cancer therapy.

These compounds may be used in monotherapy or combination with radiotherapy or chemotherapy.

The invention claimed is:

1. A compound of formula (I)

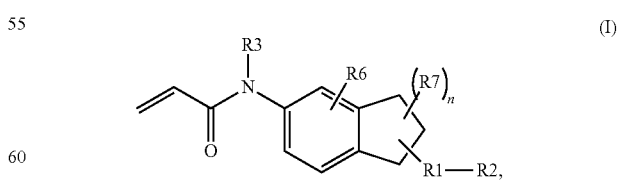

wherein
R1 is chosen from:
  an oxygen atom, and
  a group —N(H)— or a group —N(R8)-,
    wherein R8 is a (C1-C4) alkyl group;

R2 is chosen from:
- a phenyl group unsubstituted or substituted with one or more R4 groups;
- a benzyl group unsubstituted or substituted with one or more R5 groups;
- a (C4-C8) cycloalkyl group unsubstituted or substituted with one or more R5 groups;
- a heteroaryl group unsubstituted or substituted with one or more R5 groups; and
- a (C1-C6) alkyl group substituted with one or more fluorine atoms;

R4 is chosen from:
- a halogen atom;
- a (C1-C4) alkyl group unsubstituted or substituted with one or more fluorine atoms;
- a (C1-C4) alkoxy group unsubstituted or substituted with one or more fluorine atoms;
- a C(O)—O—(C1-C4) alkyl group;
- a (C3-C6) cycloalkyl group;
- a (C1-C4) alkylthio group; and
- a pentafluorosulfanyl group;

R5 is chosen from:
- a halogen atom; and
- a (C1-C4) alkyl group unsubstituted or substituted with one or more fluorine atoms;

R3 is chosen from:
- a hydrogen atom, and
- a (C1-C4) alkyl group;

R6 is chosen from a hydrogen atom or a halogen atom;
R7 is independently chosen from:
- a halogen atom;
- a (C1-C4) alkyl group;
- a hydroxy group; and
- a (C1-C4) alkoxy group; and n is 0, 1 or 2;
or a pharmaceutically acceptable salt thereof.

2. The compound according to claim 1, having formula (Ia)

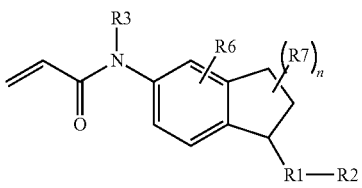

(Ia)

or a pharmaceutically acceptable salt thereof.

3. The compound according to claim 1, wherein R3 is a hydrogen atom, or a pharmaceutically acceptable salt thereof.

4. The compound according to claim 1, wherein:
R1 is an oxygen atom and R2 is chosen from:
- a phenyl group unsubstituted or substituted with one or more R4 groups;
- a (C4-C8) cycloalkyl group unsubstituted or substituted with one or more R5 groups; and
- a (C1-C5) alkyl group substituted with one or more fluorine atoms;
or R1 is —N(H)— and R2 is chosen from:
- a phenyl group unsubstituted or substituted with one or more R4 groups; and
- a heteroaryl group unsubstituted or substituted with one or more R5 groups;
or a pharmaceutically acceptable salt thereof.

5. The compound according to claim 4, wherein:
R2 is chosen from:
- a phenyl group unsubstituted or substituted with one or more R4 groups;
- a (C4-C8) cycloalkyl group substituted with one or more R5 groups, provided that R1 is an oxygen atom; and
- a (C1-C5) alkyl group substituted with one or more fluorine atoms, provided that R1 is an oxygen atom;
or a pharmaceutically acceptable salt thereof.

6. The compound according to claim 5, wherein R2 is a phenyl group substituted with one or more R4 groups;
or a pharmaceutically acceptable salt thereof.

7. The compound according to claim 4, wherein R4 is chosen from
- a halogen atom; and
- a (C1-C4) alkyl group unsubstituted or substituted with one or more fluorine atoms;
or a pharmaceutically acceptable salt thereof.

8. The compound according to claim 4, wherein R4 is chosen from a fluorine atom and a trifluoromethyl group, or a pharmaceutically acceptable salt thereof.

9. The compound according to claim 4, wherein the R4 group(s) is(are) in the meta and/or para position(s) of the R2 phenyl group,
or a pharmaceutically acceptable salt thereof.

10. The compound according to claim 4, wherein R5 is chosen from a fluorine atom and a trifluoromethyl group, or a pharmaceutically acceptable salt thereof.

11. A compound selected from:
N-(1-((3-(trifluoromethyl)phenyl)amino)-2,3-dihydro-1H-inden-5-yl)acrylamide;
(R)—N-(1-((3-(trifluoromethyl)phenyl)amino)-2,3-dihydro-1H-inden-5-yl)acrylamide;
(S)—N-(1-((3-(trifluoromethyl)phenyl)amino)-2,3-dihydro-1H-inden-5-yl)acrylamide;
N-methyl-N-(1-((3-(trifluoromethyl)phenyl)amino)-2,3-dihydro-1H-inden-5-yl)acrylamide;
N-(1-((4-fluorophenyl)amino)-2,3-dihydro-1H-inden-5-yl)acrylamide;
(S)—N-(1-((4-fluorophenyl)amino)-2,3-dihydro-1H-inden-5-yl)acrylamide;
(R)—N-(1-((4-fluorophenyl)amino)-2,3-dihydro-1H-inden-5-yl)acrylamide;
N-(1-((3-fluorophenyl)amino)-2,3-dihydro-1H-inden-5-yl)acrylamide;
N-(1-((3,5-difluorophenyl)amino)-2,3-dihydro-1H-inden-5-yl)acrylamide;
N-(1-((4-(trifluoromethyl)phenyl)amino)-2,3-dihydro-1H-inden-5-yl)acrylamide;
N-(3-((3-(trifluoromethyl)phenyl)amino)-2,3-dihydro-1H-inden-5-yl)acrylamide;
N-(3-((4-(trifluoromethyl)phenyl)amino)-2,3-dihydro-1H-inden-5-yl)acrylamide;
N-(3-((3,4-difluorophenyl)amino)-2,3-dihydro-1H-inden-5-yl)acrylamide;
N-(3-((3-fluorophenyl)amino)-2,3-dihydro-1H-inden-5-yl)acrylamide;
N-(3-((4-fluorophenyl)amino)-2,3-dihydro-1H-inden-5-yl)acrylamide;
N-(1-((3,4-difluorophenyl)amino)-2,3-dihydro-1H-inden-5-yl)acrylamide;
N-(1-((3-methoxyphenyl)amino)-2,3-dihydro-1H-inden-5-yl)acrylamide;
N-(1-(m-tolylamino)-2,3-dihydro-1H-inden-5-yl)acrylamide;

N-(1-((6-fluoropyridin-3-yl)amino)-2,3-dihydro-1H-inden-5-yl)acrylamide;
N-(1-((6-(trifluoromethyl)pyridin-3-yl)amino)-2,3-dihydro-1H-inden-5-yl)acrylamide;
N-(1-((5-fluoropyridin-2-yl)amino)-2,3-dihydro-1H-inden-5-yl)acrylamide;
methyl-3-((5-acrylamido-2,3-dihydro-1H-inden-1-yl)amino)benzoate;
N-(3-(benzylamino)-2,3-dihydro-1H-inden-5-yl)acrylamide;
N-(1-((3-(trifluoromethyl)benzyl)amino)-2,3-dihydro-1H-inden-5-yl)acrylamide;
N-(1-((4-(trifluoromethyl)benzyl)amino)-2,3-dihydro-1H-inden-5-yl)acrylamide;
N-(2-(((cis)-4-(trifluoromethyl)cyclohexyl)amino)-2,3-dihydro-1H-inden-5-yl)acrylamide;
N-(2-(((trans)-4-(trifluoromethyl)cyclohexyl)amino)-2,3-dihydro-1H-inden-5-yl)acrylamide;
N-(2-((4,4-difluorocyclohexyl)amino)-2,3-dihydro-1H-inden-5-yl)acrylamide;
N-(2-((4,4,4-trifluorobutyl)amino)-2,3-dihydro-1H-inden-5-yl)acrylamide;
N-(2-((3-fluoropropyl)amino)-2,3-dihydro-1H-inden-5-yl)acrylamide;
N-(2-((3-fluorophenyl)amino)-2,3-dihydro-1H-inden-5-yl)acrylamide;
N-(2-((3-(trifluoromethyl)phenyl)amino)-2,3-dihydro-1H-inden-5-yl)acrylamide;
N-(3-(4,4,4-trifluorobutoxy)-2,3-dihydro-1H-inden-5-yl)acrylamide;
N-(3-(4-fluorobutoxy)-2,3-dihydro-1H-inden-5-yl)acrylamide;
N-(3-((4,4-difluorocyclohexyl)oxy)-2,3-dihydro-1H-inden-5-yl)acrylamide;
N-(3-(((trans)-4-(trifluoromethyl)cyclohexyl)oxy)-2,3-dihydro-1H-inden-5-yl)acrylamide;
N-(3-(4-(trifluoromethyl)phenoxy)-2,3-dihydro-1H-inden-5-yl)acrylamide;
N-(3-phenoxy-2,3-dihydro-1H-inden-5-yl)acrylamide;
N-(3-(3-(trifluoromethyl)phenoxy)-2,3-dihydro-1H-inden-5-yl)acrylamide;
N-(3-(3,4-difluorophenoxy)-2,3-dihydro-1H-inden-5-yl)acrylamide;
N-(3-(3-fluorophenoxy)-2,3-dihydro-1H-inden-5-yl)acrylamide;
N-(3-(4-fluorophenoxy)-2,3-dihydro-1H-inden-5-yl)acrylamide;
N-(3-(3,5-difluorophenoxy)-2,3-dihydro-1H-inden-5-yl)acrylamide;
N-(3-(2,4-difluorophenoxy)-2,3-dihydro-1H-inden-5-yl)acrylamide;
N-(1-(3-(trifluoromethyl)phenoxy)-2,3-dihydro-1H-inden-5-yl)acrylamide;
N-(1-(3-(trifluoromethoxy)phenoxy)-2,3-dihydro-1H-inden-5-yl)acrylamide;
methyl 3-[6-(prop-2-enoylamino)-2,3-dihydro-1H-1-yl]oxybenzoate;
(S)—N-(2-((3-fluorophenyl)amino)-2,3-dihydro-1H-inden-5-yl)acrylamide;
(R)—N-(2-((3-fluorophenyl)amino)-2,3-dihydro-1H-inden-5-yl)acrylamide;
(R)—N-(2-((3-(trifluoromethyl)phenyl)amino)-2,3-dihydro-1H-inden-5-yl)acrylamide;
(S)—N-(2-((3-(trifluoromethyl)phenyl)amino)-2,3-dihydro-1H-inden-5-yl)acrylamide;
N-[2-[4-(trifluoromethyl)anilino]-2,3-dihydro-1H-inden-5-yl]acrylamide;
N-(3-((3,5-difluorophenyl)amino)-2,3-dihydro-1H-inden-5-yl)acrylamide;
N-(1-((3-(pentafluoro-16-sulfanyl)phenyl)amino)-2,3-dihydro-1H-inden-5-yl)acrylamide;
(R)—N-(1-((4-(trifluoromethyl)phenyl)amino)-2,3-dihydro-1H-inden-5-yl)acrylamide;
(S)—N-(1-((4-(trifluoromethyl)phenyl)amino)-2,3-dihydro-1H-inden-5-yl)acrylamide;
N-[(1S)-1-[[4-(trifluoromethyl)pyridine-2-yl]amino]-2,3-dihydro-1H-inden-5-yl]acrylamide;
N-[(1R)-1-[[4-(trifluoromethyl)pyridin-2-yl]amino]-2,3-dihydro-1H-inden-5-yl]acrylamide;
N-(1-((4-(trifluoromethyl)pyridin-2-yl)amino)-2,3-dihydro-1H-inden-5-yl)acrylamide 2,2,2-trifluoroacetate;
N-(1-((6-(trifluoromethyl)pyridin-2-yl)amino)-2,3-dihydro-1H-inden-5-yl)acrylamide;
N-(1-((5-(trifluoromethyl)pyridin-3-yl)amino)-2,3-dihydro-1H-inden-5-yl)acrylamide;
N-(1-(methyl(3-(trifluoromethyl)phenyl)amino)-2,3-dihydro-1H-inden-5-yl)acrylamide;
N-(1-(methyl(phenyl)amino)-2,3-dihydro-1H-inden-5-yl)acrylamide;
N-(1-(methyl(4-(trifluoromethyl)phenyl)amino)-2,3-dihydro-1H-inden-5-yl)acrylamide;
N-(3,3-dimethyl-1-((3-(trifluoromethyl)phenyl)amino)-2,3-dihydro-1H-inden-5-yl)acrylamide;
N-(3,3-dimethyl-1-((4-(trifluoromethyl)phenyl)amino)-2,3-dihydro-1H-inden-5-yl)acrylamide;
N-[7-fluoro-1-[3-(trifluoromethyl)anilino]-2,3-dihydro-1H-inden-5-yl]acrylamide;
N-[4-fluoro-1-[4-(trifluoromethyl)anilino]-2,3-dihydro-1H-inden-5-yl]acrylamide;
N-methyl-N-(1-((4-(trifluoromethyl)phenyl)amino)-2,3-dihydro-1H-inden-5-yl)acrylamide;
N-(3-((4,4-difluorocyclohexyl)amino)-2,3-dihydro-1H-inden-5-yl)acrylamide;
N-(3-((3-(trifluoromethyl)cyclopentyl)oxy)-2,3-dihydro-1H-inden-5-yl)acrylamide;
N-(3-((5,5,5-trifluoropentyl)oxy)-2,3-dihydro-1H-inden-5-yl)acrylamide;
N-(3-(4,4-difluorobutoxy)-2,3-dihydro-1H-inden-5-yl)acrylamide;
N-(3-(2,2,2-trifluoroethoxy)-2,3-dihydro-1H-inden-5-yl)acrylamide;
N-(3-(3,3,3-trifluoropropoxy)-2,3-dihydro-1H-inden-5-yl)acrylamide;
N-methyl-N-(1-((4-(trifluoromethyl)cyclohexyl)oxy)-2,3-dihydro-1H-inden-5-yl)acrylamide;
N-(3-(4-chlorophenoxy)-2,3-dihydro-1H-inden-5-yl)acrylamide;
N-(3-(3-chlorophenoxy)-2,3-dihydro-1H-inden-5-yl)acrylamide;
N-(3-(m-tolyloxy)-2,3-dihydro-1H-inden-5-yl)acrylamide;
N-(3-(3-(methylthio)phenoxy)-2,3-dihydro-1H-inden-5-yl)acrylamide;
N-(3-(3-cyclopropylphenoxy)-2,3-dihydro-1H-inden-5-yl)acrylamide;
N-(1-(4-(trifluoromethyl)phenoxy)-2,3-dihydro-1H-inden-5-yl)acrylamide;
N-methyl-N-(1-(4-(trifluoromethyl)phenoxy)-2,3-dihydro-1H-inden-5-yl)acrylamide;
(S)—N-(1-(3-(trifluoromethyl)phenoxy)-2,3-dihydro-1H-inden-5-yl)acrylamide;
(R)—N-(1-(3-(trifluoromethyl)phenoxy)-2,3-dihydro-1H-inden-5-yl)acrylamide;

(S)—N-(3-(4-(trifluoromethyl)phenoxy)-2,3-dihydro-1H-inden-5-yl)acrylamide;
(R)—N-(3-(4-(trifluoromethyl)phenoxy)-2,3-dihydro-1H-inden-5-yl)acrylamide;
N-[3-[[5-(trifluoromethyl)pyridin-2-yl]oxy]-2,3-dihydro-1H-inden-5-yl]acrylamide;
N-methyl-N-(1-(3-(trifluoromethyl)phenoxy)-2,3-dihydro-1H-inden-5-yl)acrylamide;
N-[2-fluoro-3-[4-(trifluoromethyl)anilino]-2,3-dihydro-1H-inden-5-yl]acrylamide;
N-(2-fluoro-3-((3-(trifluoromethyl)phenyl)amino)-2,3-dihydro-1H-inden-5-yl)acrylamide;
N-[2-fluoro-3-[4-(trifluoromethyl)phenoxy]-2,3-dihydro-1H-inden-5-yl]acrylamide;
N-methyl-N-(2-methyl-1-((3-(trifluoromethyl)phenyl)amino)-2,3-dihydro-1H-inden-5-yl)acrylamide;
N-[(cis)-3-methoxy-1-[3-(trifluoromethyl)anilino]-2,3-dihydro-1H-inden-5-yl]acrylamide;
N-[(trans)-2-hydroxy-1-[3-(trifluoromethyl)anilino]2,3-dihydro-1H-inden-5-yl]acrylamide;
N-[rac-(2R,3R)-2-hydroxy-3-[3-(trifluoromethyl)anilino]-2,3-dihydro-1H-inden-5-yl]acrylamide;
and the pharmaceutically acceptable salts thereof.

12. A pharmaceutical composition comprising a compound of claim 1, or a pharmaceutically acceptable salt thereof.

13. A method for treating cancer comprising administering a therapeutically effective amount of the compound of claim 1 to a subject in need thereof.

14. The method of claim 13, wherein the cancer is selected from breast, ovarian, uterine, prostate, lung, gastric, colorectal, bladder, pancreatic, liver, sarcomas, esophageal, head, neck, mesothelioma, uveal melanoma, and glioma.

15. A method for treating cancer comprising administering a therapeutically effective amount of the compound of claim 1 to a subject in need thereof, wherein the subject has exhibited resistance to prior anti-cancer therapy.

16. The compound of claim 1, wherein R2 is a cyclohexyl group, a cyclopentyl group, a pyridyl group, a (C1-C4) alkyl group, or a (C2-C3) alkyl group substituted with CF3.

17. The compound of claim 1, wherein R3 is a methyl group.

18. The compound of claim 1, wherein R4 is independently a fluorine atom, a chlorine atom, a methyl group, a trifluoromethyl group, a methoxy group, a trifluoromethoxy group, a cyclopropyl group, a C(O)—O-methyl group, or a methylthio group.

19. The compound of claim 1, wherein R5 is independently a fluorine atom or a trifluoromethyl group.

20. The compound of claim 1, wherein R7 is independently a fluorine atom, a methyl group, or a methoxy group.

* * * * *